(12) United States Patent
Kim et al.

(10) Patent No.: US 10,871,883 B2
(45) Date of Patent: Dec. 22, 2020

(54) ELECTRONIC DEVICE AND METHOD FOR PROVIDING INFORMATION IN RESPONSE TO PRESSURE INPUT OF TOUCH

(71) Applicant: Samsung Electronics Co., Ltd., Gyeonggi-do (KR)

(72) Inventors: So Young Kim, Gyeonggi-do (KR); Kyu Hong Kim, Gyeonggi-do (KR); Seung Min Choi, Gyeonggi-do (KR); Doo Suk Kang, Gyeonggi-do (KR); Yo Han Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/346,010

(22) PCT Filed: Oct. 25, 2017

(86) PCT No.: PCT/KR2017/011857
§ 371 (c)(1),
(2) Date: Apr. 29, 2019

(87) PCT Pub. No.: WO2018/080169
PCT Pub. Date: May 3, 2018

(65) Prior Publication Data
US 2020/0050326 A1    Feb. 13, 2020

(30) Foreign Application Priority Data

Oct. 27, 2016    (KR) .......................... 10-2016-0140766

(51) Int. Cl.
*G06F 3/0488*    (2013.01)
*G06F 3/0482*    (2013.01)
(Continued)

(52) U.S. Cl.
CPC .......... *G06F 3/0482* (2013.01); *G06F 3/0483* (2013.01); *G06F 3/0484* (2013.01); *G06F 3/0488* (2013.01)

(58) Field of Classification Search
CPC ........ G06F 3/041; G06F 3/048; G06F 3/0481; G06F 3/0482; G06F 3/0483; G06F 3/0484; G06F 3/0487; G06F 3/0488
See application file for complete search history.

(56) References Cited

U.S. PATENT DOCUMENTS 6,667,750 B1 *  12/2003  Halstead, Jr. ........... G06T 11/60
                                                             345/619
8,542,205 B1 *  9/2013   Keller ................... G06F 3/0488
                                                             345/173
(Continued)

FOREIGN PATENT DOCUMENTS

KR    1020100035043    4/2010
KR    1020140089224    7/2014
(Continued)

OTHER PUBLICATIONS

PCT/ISA/210 Search Report issued on PCT/KR2017/011857, pp. 5.
PCT/ISA/237 Written Opinion issued on PCT/KR2017/011857, pp. 6.

*Primary Examiner* — Xiomara L Bautista
(74) *Attorney, Agent, or Firm* — The Farrell Law Firm, P.C.

(57) ABSTRACT

An electronic device according to an embodiment includes a display, a touch sensor, a pressure sensor, at least one processor electrically connected with the display, the touch sensor, and the pressure sensor, and a memory electrically connected with the at least one processor. The memory stores instructions that, when executed, cause the processor to display a plurality of items in the display, to select at least one of the plurality of items based on a position of a touch (Continued)

sensed in the touch sensor, to detect a pressure level of the touch by using the pressure sensor, and to display at least one set of information associated with the selected at least one item in the display in response to the detected pressure level of the touch. Moreover, various embodiment found through the disclosure are possible.

15 Claims, 36 Drawing Sheets

(51) Int. Cl.
    *G06F 3/0483* (2013.01)
    *G06F 3/0484* (2013.01)

(56) References Cited

U.S. PATENT DOCUMENTS

| | | | |
|---|---|---|---|
| 8,561,036 B1 * | 10/2013 | Beans | G06F 11/368 717/124 |
| 8,760,408 B2 * | 6/2014 | Heesemans | G06F 3/0414 178/19.04 |
| 9,710,471 B2 | 7/2017 | Yang et al. | |
| 9,990,121 B2 | 6/2018 | Cieplinski et al. | |
| 10,042,542 B2 | 8/2018 | Bernstein et al. | |
| 2008/0204427 A1 * | 8/2008 | Heesemans | G06F 3/0414 345/174 |
| 2010/0077334 A1 * | 3/2010 | Yang | G06F 3/0486 715/769 |
| 2015/0058723 A1 | 2/2015 | Cieplinski et al. | |
| 2015/0067563 A1 | 3/2015 | Bernstein et al. | |
| 2015/0378557 A1 * | 12/2015 | Jeong | G06F 1/1626 715/835 |
| 2017/0068413 A1 * | 3/2017 | Jansky | G06F 3/0488 |
| 2017/0090725 A1 * | 3/2017 | Jansky | G06F 3/04842 |
| 2017/0308529 A1 | 10/2017 | Cho et al. | |

FOREIGN PATENT DOCUMENTS

| | | |
|---|---|---|
| KR | 101474452 | 12/2014 |
| KR | 101660803 | 9/2016 |
| KR | 101669046 | 10/2016 |

* cited by examiner

ELECTRONIC DEVICE AND METHOD FOR PROVIDING INFORMATION IN RESPONSE TO PRESSURE INPUT OF TOUCH

PRIORITY

This application is a National Phase Entry of PCT International Application No. PCT/KR2017/011857 which was filed on Oct. 25, 2017, and claims priority to Korean Patent Application No. 10-2016-0140766, which was filed on Oct. 27, 2016, the content of each of which is incorporated herein by reference.

TECHNICAL FIELD

Embodiments of the disclosure relate to an electronic device and a method for providing information in response to a pressure input of a touch.

BACKGROUND ART

With the development of mobile communication technologies, an electronic device, which is equipped with a display, such as a smartphone, a wearable device, or the like has been widely supplied since the spread of personal computers.

The display of the electronic device may be implemented with a so-called touch screen by additionally including a touch panel. As the display is implemented with the touch screen, the display may perform a role as an input device that receives a user manipulation, in addition to a role as a visual display device.

DISCLOSURE

Technical Problem

To control the electronic device, a user may provide the electronic device with a user input such as a touch or the like. The user should be able to sufficiently expect an operation of the electronic device which will be performed in response to a user input, before providing the user input to the electronic device. The user may need some degree of learning for the purpose of expecting types of user inputs and responses of the electronic device corresponding to the user inputs.

Pressure of a touch on the touch screen may be used as one parameter of a user input. The user may selectively input a conventional touch input and a "pressure input" for the purpose of controlling the electronic device as intended. In the case where an input source of the user making use of a touch includes not one input source but a plurality of input sources, the amount of learning required for the user may increase more and more.

The disclosure may provide an intuitive user interface (UI) or user experience (UX) capable of minimizing learning required for a user upon controlling an electronic device in which a user makes use of a simple touch input with pressure of a touch as a touch input.

Various embodiments of the disclosure may provide an electronic device that includes a pressure sensor capable of detecting pressure of a touch on a touch screen and provides various functions in response to a pressure level of the touch and a method thereof.

Technical Solution

An electronic device according to an embodiment of the disclosure may include a housing that includes a first surface facing in a first direction and a second surface facing in a second direction that is opposite to the first direction, a display that is disposed between the first surface and the second surface and is exposed through the first surface, a touch sensor that is disposed between the first surface and the second surface and detects at least one position of a touch on the display by an external object, a pressure sensor that is disposed between the first surface and the second surface and detects pressure against the display by the external object, at least one processor that is electrically connected with the display, the touch sensor, and the pressure sensor, and a memory that is electrically connected with the at least one processor. The memory may store at least one application program including a user interface configured to display a plurality of items in the display and instructions that, when executed, cause the processor to launch an application program displaying the user interface in the display, to display an array of the plurality of items in the user interface, to receive first data generated from the touch sensor, to receive second data received from the pressure sensor, to select one of the plurality of items based at least on the first data, to select one of a plurality of pressure levels based at least on the second data, and to display one of a plurality of sets of information associated with the selected one of the plurality of items in the display, based at least on the selected one of the plurality of pressure levels.

Also, an electronic device according to an embodiment of the disclosure may include a display, a touch sensor, a pressure sensor, at least one processor electrically connected with the display, the touch sensor, and the pressure sensor, and a memory electrically connected with the at least one processor. The memory may store instructions that, when executed, cause the processor to display a plurality of items in the display, to select at least one of the plurality of items based on a position of a touch sensed in the touch sensor, to detect a pressure level of the touch by using the pressure sensor, and to display at least one set of information associated with the selected at least one item in the display in response to the detected pressure level of the touch.

Also, a method according to an embodiment of the disclosure may include launching an application program displaying a user interface in a display, displaying an array of a plurality of items in the user interface, receiving first data generated from a touch sensor, receiving second data received from a pressure sensor, selecting one of the plurality of items based at least on the first data, selecting one of a plurality of pressure levels based at least on the second data, and displaying one of a plurality of sets of information associated with the selected one of the plurality of items in the display, based at least on the selected one of the plurality of pressure levels.

Also, a method according to an embodiment of the disclosure may include outputting a plurality of items in a display, selecting at least one of the plurality of items based on a position of a touch sensed in a touch sensor, detecting a pressure level of the touch by using a pressure sensor, and displaying at least one set of information associated with the selected at least one item in the display in response to the detected pressure level of the touch.

Also, according to an embodiment of the disclosure, a computer-readable recording medium may store instructions that, when executed by at least one processor, cause the processor to launch an application program displaying a user interface in a display, to display an array of the plurality of items in the user interface, to receive first data generated from a touch sensor, to receive second data received from a pressure sensor, to select one of the plurality of items based at least on the first data, to select one of a plurality of pressure levels based at least on the second data, and to display one of a plurality of sets of information associated with the selected one of the plurality of items in the display, based at least on the selected one of the plurality of pressure levels.

Also, according to an embodiment of the disclosure, a computer-readable recording medium may store instructions that, when executed by at least one processor, cause the processor to output a plurality of items in a display, to select at least one of the plurality of items based on a position of a touch sensed in a touch sensor, to detect a pressure level of the touch by using a pressure sensor, and to display at least one set of information associated with the selected at least one item in the display in response to the detected pressure level of the touch.

Advantageous Effects

According to embodiments of the disclosure, because various functions are provided according to pressure levels of a touch, a wealth of user experience may be provided to the user. Besides, a variety of effects directly or indirectly understood through this disclosure may be provided.

MODE FOR INVENTION

Figure 1:
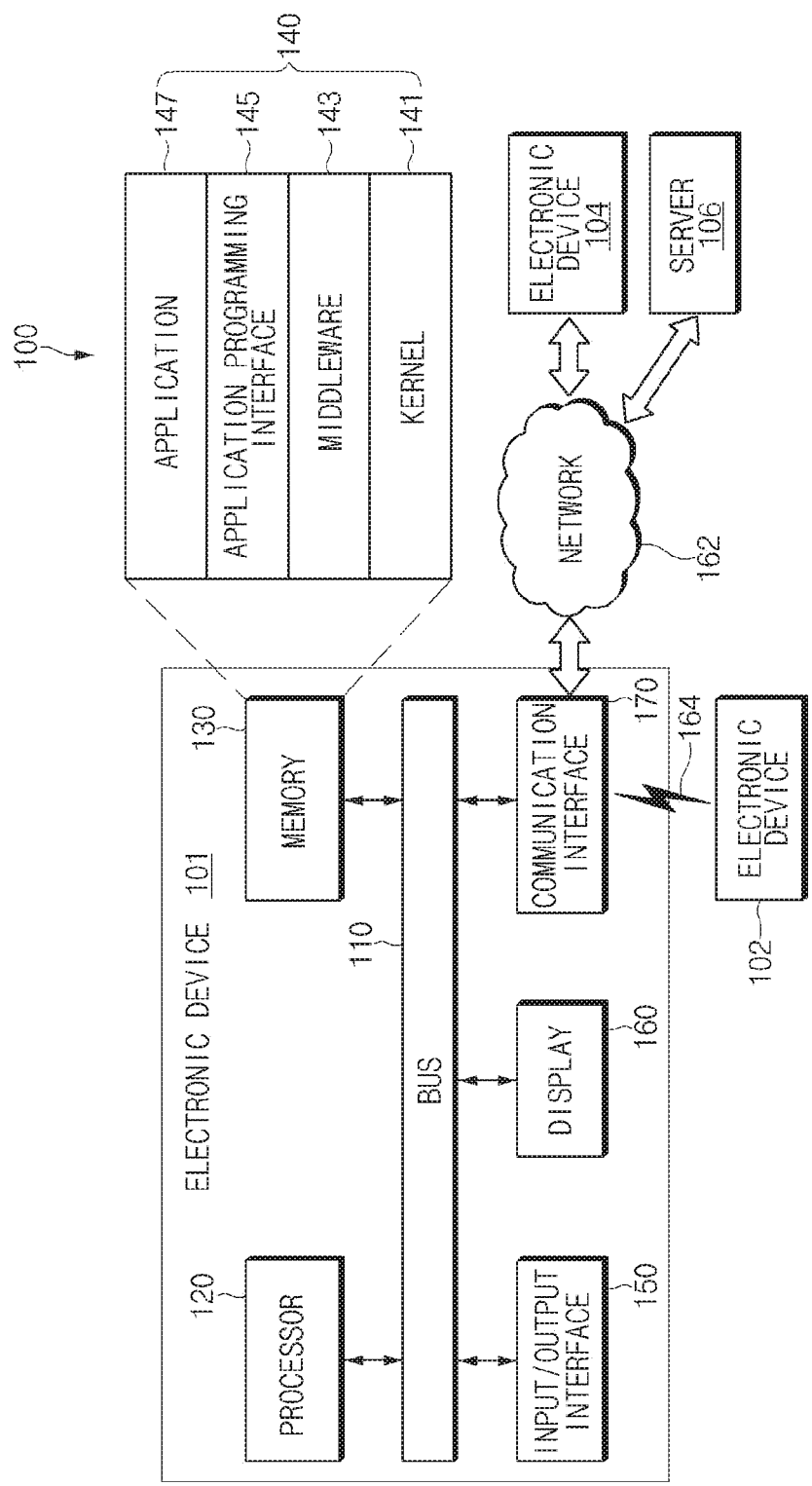
FIG. 1 illustrates an electronic device according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates an electronic device, according to various embodiments.

Referring to FIG. 1, according to various embodiments, an electronic device 101, 102, and 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication which uses at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an environment, the wireless communication may include at least one of wireless fidelity (Wi-Fi), Bluetooth, Bluetooth low energy (BLE), Zigbee, near field communication (NFC), magnetic secure transmission (MST), a radio frequency (RF), a body area network (BAN), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
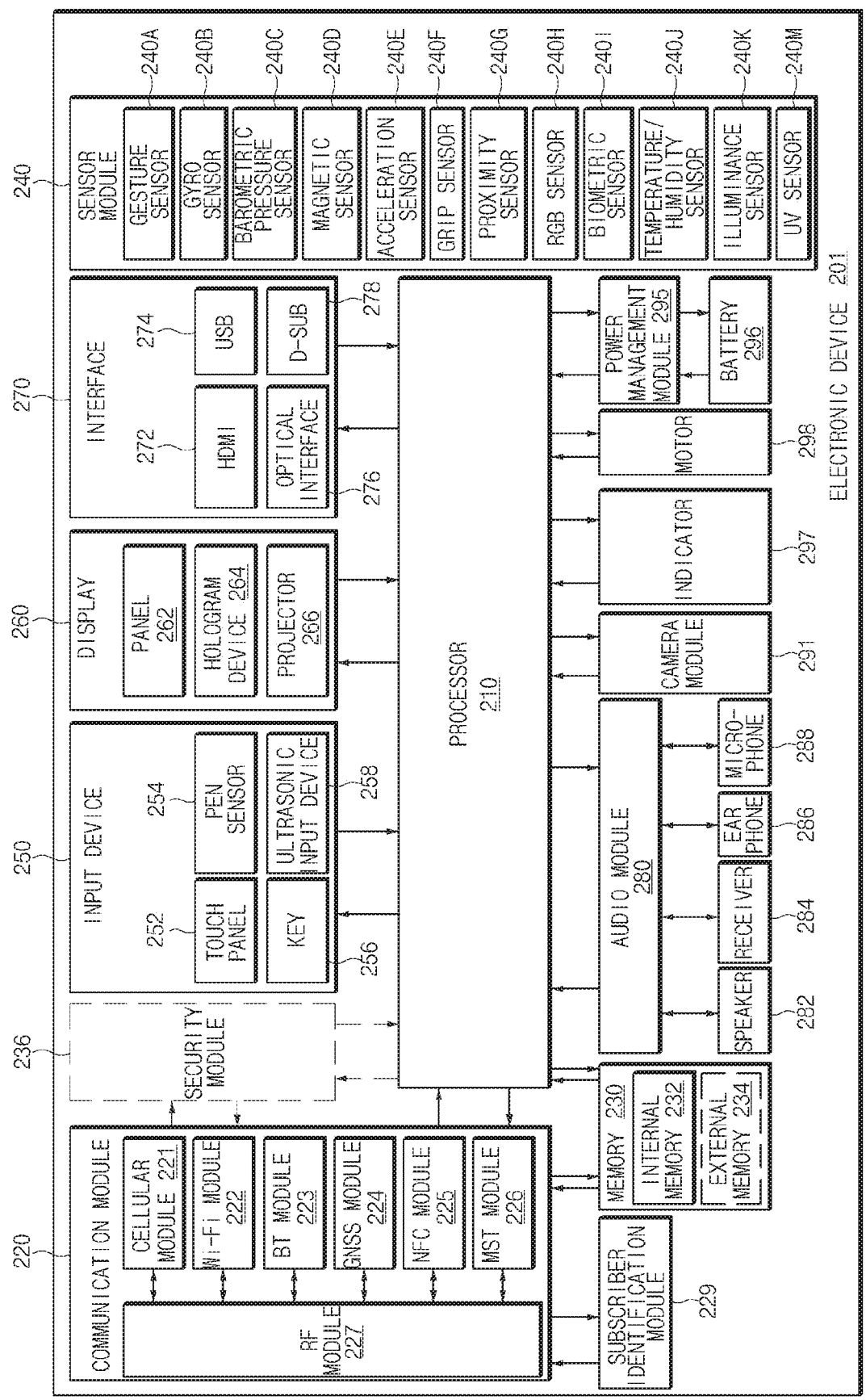
FIG. 2 illustrates a block diagram of an electronic device according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
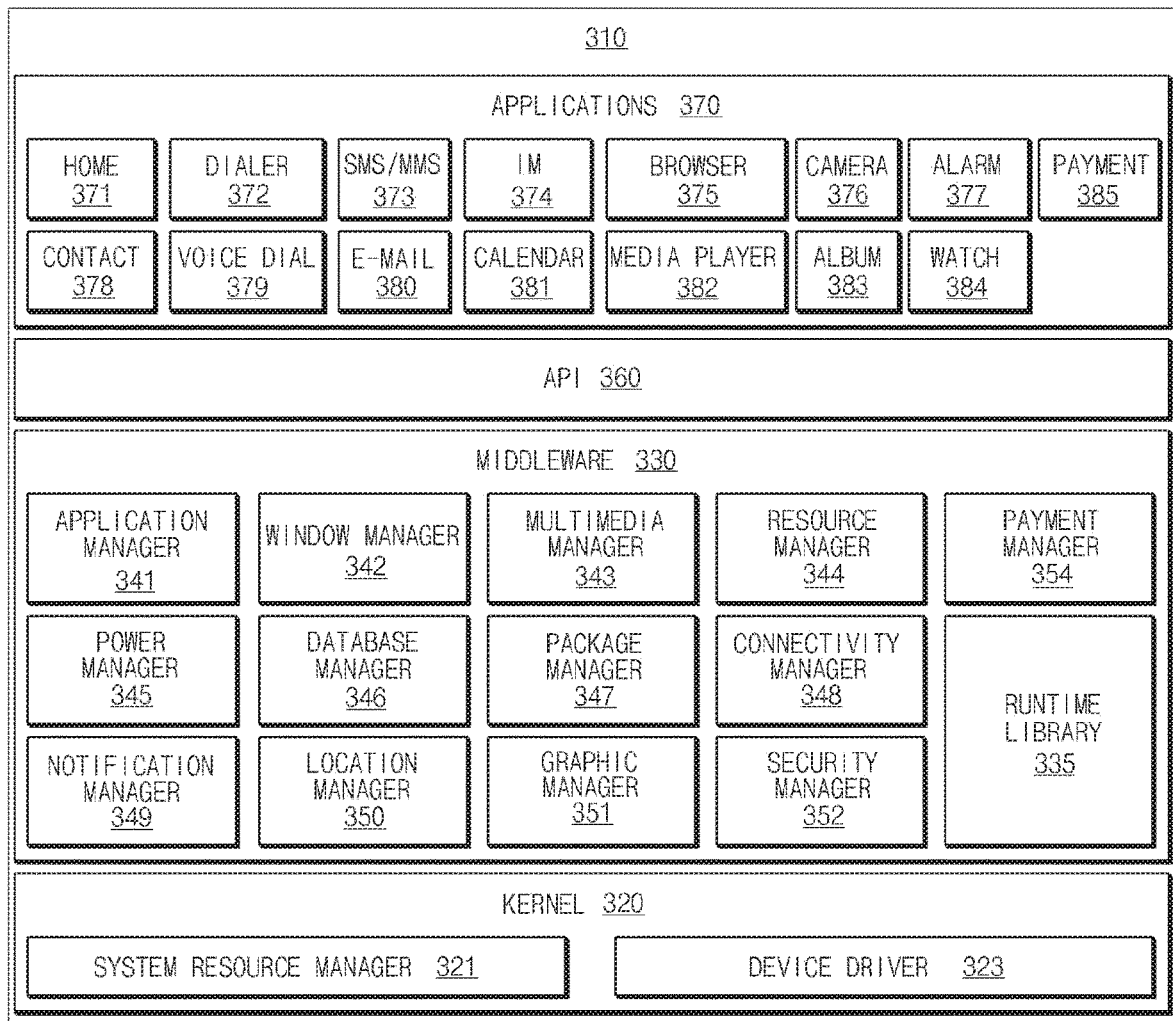
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, Tizen, or Bada.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102, 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, and a payment 385 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
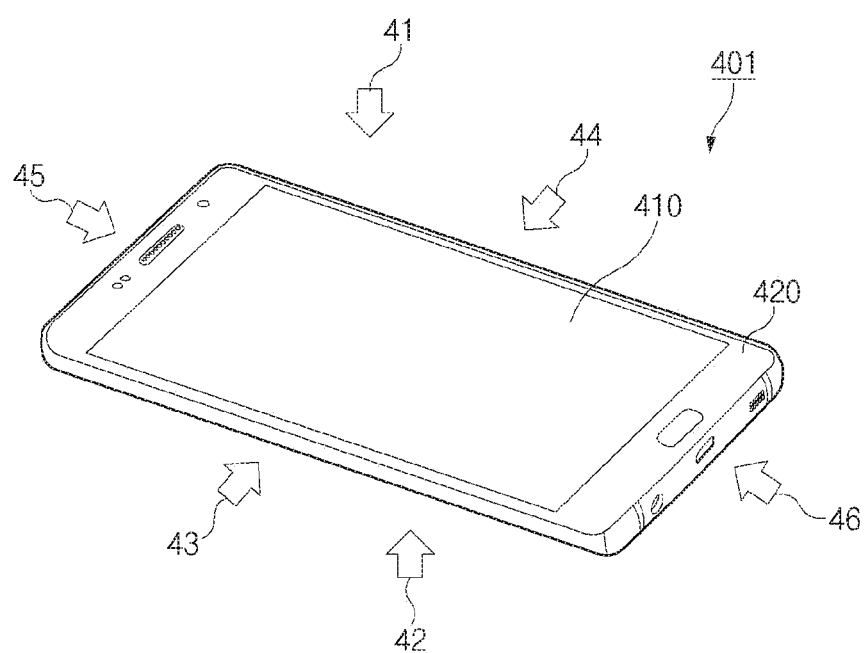
FIG. 4 illustrates the exterior of an electronic device according to an embodiment.

FIG. 4 illustrates the exterior of an electronic device according to an embodiment.

Referring to FIG. 4, an electronic device 401 according to an embodiment may include a display 410 and a housing 420. Various circuits or modules such as a processor, a memory, and the like may be disposed within the electronic device 401 (i.e., within the housing 420).

According to various embodiments, the display 410 may be disposed on a front surface of the electronic device 401. For example, the display 410 may be disposed between a front surface (a first surface) facing an upper direction (a first direction) 41 and a rear surface (a second surface) facing a lower direction (a second direction) 42 and may be exposed to the outside through the front surface.

For example, the display 410 may output a plurality of items (e.g., a text, an image, a video, an icon, a widget, a symbol, or the like) or may receive a touch input (including a touch, a hovering, and a "force touch") from the user. To this end, the display 410 may include a cover glass, a display panel, a touch panel, and/or a pressure sensor, for example. The cover glass, the display panel, the touch panel, and/or the pressure sensor may have the corresponding areas (e.g., substantially the same area) and may be stacked (refer to FIG. 5).

According to various embodiments, the display 410 may be disposed on the front surface of the electronic device 401 and may be further expanded to at least one side surface from the front surface. For example, the display 410 may be expanded in a left-side direction 43 and/or a right-side direction 44. As the display 410 is expanded in the left-side direction 43 and/or the right-side direction 44, the display 410 may be exposed to the outside through left and right side surfaces in addition to the front surface.

According to various embodiments, the housing 420 may form at least a portion of the exterior of the electronic device 401. For example, the housing 420 may include a front surface (a first surface) facing in the first direction 41 and a rear surface (a second surface) facing in the second direction 42 that is opposite to the first direction 41. A side surface of the housing 420, which surrounds the first surface and the second surface, may include a left-side surface facing a left-side direction 43, a right-side surface facing a right-side direction 44, an upper-side surface facing an upper-side direction 45, and a bottom-side surface facing a bottom-side direction 46.

To protect various internal components of an electronic device 400 from external impact or dust, the housing 420 may be formed of a plastic injection-molding material, a conductive material (e.g., metal), or a combinations thereof. According to an embodiment, the housing 420 may be an outer surface of a plurality of components. For example, the front surface of the housing 420 may be a cover glass disposed over the display 410, and the rear surface of the housing 420 may be a back cover of the electronic device 401.

Figure 5:
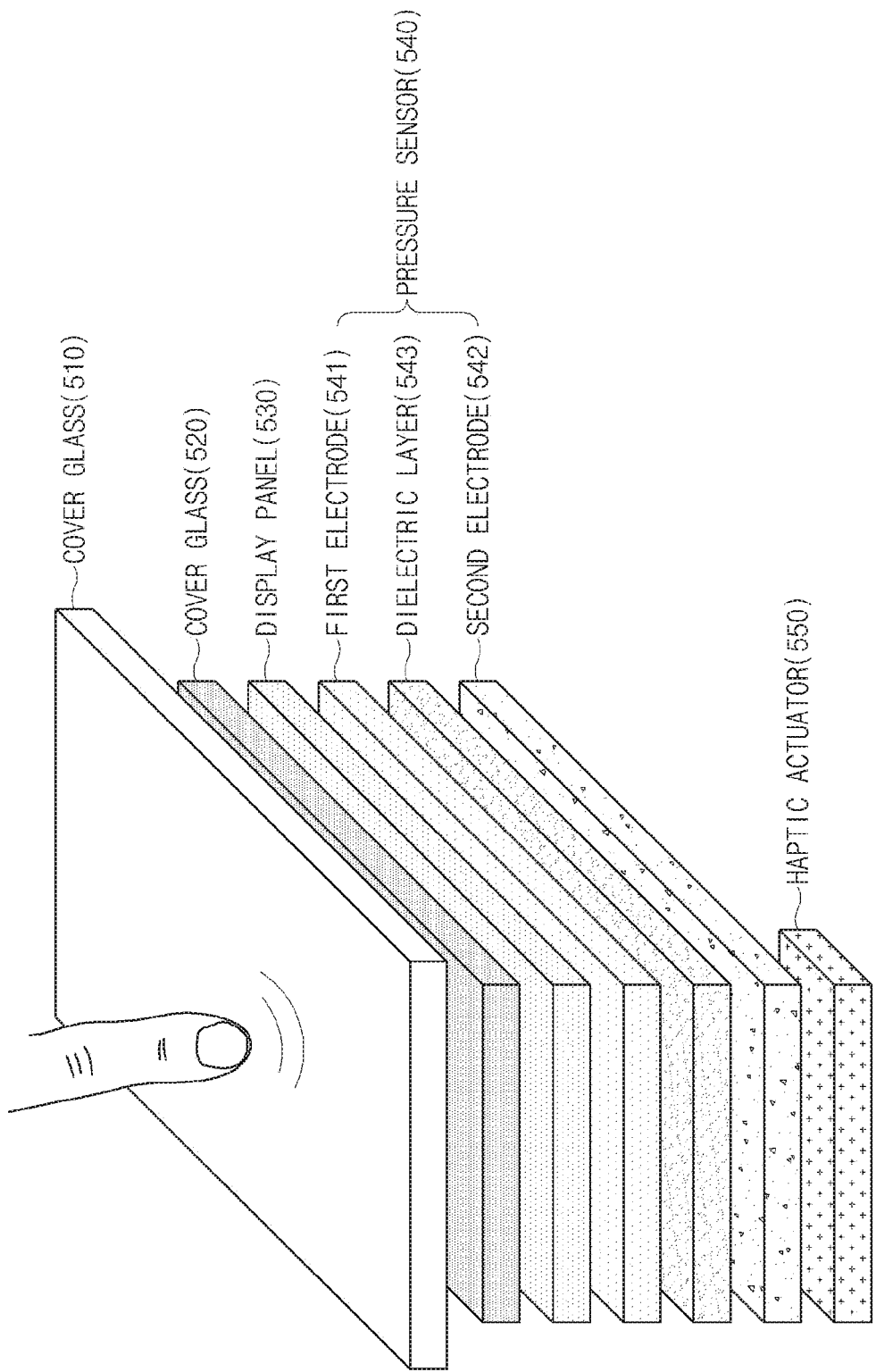
FIG. 5 illustrates a stacked structure of a display according to an embodiment.

FIG. 5 illustrates a stacked structure of a display according to an embodiment.

Referring to FIG. 5, a stacked structure of a display according to an embodiment is illustrated. For example, the stacked structure may be applied to the display 410 illustrated in FIG. 4. Accordingly, components illustrated in FIG. 5 may be interposed between the front surface (the first surface) and the rear surface (the second surface) of the electronic device 401 of FIG. 4.

In the stacked structure of the display according to an embodiment, a cover glass 510 may pass a light generated by a display panel 530. The user may touch a portion (e.g., a finger) of his/her body on the cover glass 510 to perform a "touch" (including a contact using an electronic pen). The cover glass 510 may be form of, for example, tempered glass, reinforced plastic, a flexible polymer material, or the like and may protect the display or an electronic device equipped with the display from an external impact. According to various embodiments, the cover glass 510 may be also referred to as a "glass window" or "cover window".

In a touch sensor 520, a specified physical quantity (e.g., a voltage, the amount of light, a resistance, the amount of charges, or a capacitance) may change due to a contact of an external object (e.g., a finger of the user or an electronic pen). The touch sensor 520 may detect a position of the external object touched on a display (e.g., on a surface of the cover glass 510) based on the change in the specified physical quantity. For example, the touch sensor 520 may include a capacitive touch sensor, a resistive touch sensor, an infrared touch sensor, a piezo touch sensor, or the like. According to various embodiments, the touch sensor 520 may be referred to as various names, such as a touch panel and the like, based on an implementation shape.

The display panel 530 may output at least one content or item (e.g., a text, an image, a video, an icon, a widget, a symbol, or the like). For example, the display panel 530 may include a liquid crystal display (LCD) panel, a light-emitting diode (LED) display panel, an organic LED (OLED) display panel, a microelectromechanical systems (MEMS) display panel, or an electronic paper display panel.

According to various embodiments of the disclosure, the display panel 530 may be integrally implemented with the touch sensor 520. In this case, the display panel 530 may be also referred to as a "touch screen panel (TSP)" or "touch screen display panel".

A pressure sensor 540 may detect pressure (or force) by an external object (e.g., a finger of the user or an electronic pen) touched on the display (e.g., a surface of the cover glass 510). According to an embodiment, the pressure sensor 540 may include a first electrode 541, a second electrode 542, and/or a dielectric layer 543. For example, the pressure sensor 540 may sense the pressure of the touch based on a capacitance between the first electrode 541 and the second electrode 542, which changes due to the touch. A configuration of the pressure sensor 540 will be more fully described with reference to FIG. 6.

When a touch (including a hovering and a "force touch") is input by an external object (e.g., a finger of the user or an electronic pen), a haptic actuator 550 may provide the user with a haptic feedback (e.g., vibration). To this end, the haptic actuator 560 may include a piezoelectric member and/or a vibration plate.

The stacked structure of the display above described with reference to FIG. 5 is an example and is able to be variously changed or modified. For example, the touch sensor 520 may be integrally formed on a back surface of the cover glass 510 (a so-called cover glass integrated touch panel). Alternatively, the touch sensor 520 may be separately manufactured, and may be inserted between the cover glass 510 and the display panel 530 (a so-called add-on touch panel) or may be formed directly on the display panel 530 (a so-called on-cell touch panel). Also, the touch sensor 520 may be included within the display panel 530 (a so-called in-cell touch panel).

According to an embodiment, an area-type fingerprint sensor that is implemented to be transparent or opaque may be additionally included in the stacked structure.

Figure 6:
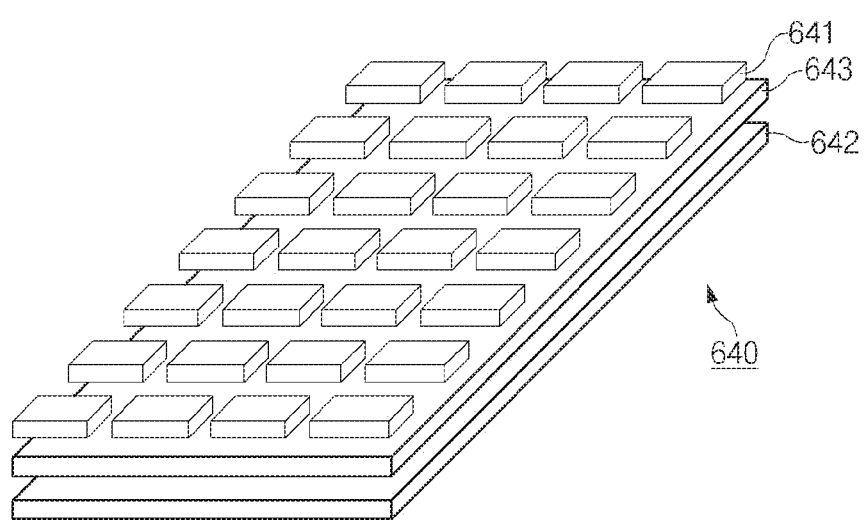
FIG. 6 illustrates a pressure sensor according to an embodiment.

FIG. 6 illustrates a pressure sensor according to an embodiment.

Referring to FIG. 6, a pressure sensor 640 according to an embodiment may include a first electrode 641, a second electrode 642, and a dielectric layer 643. For example, the pressure sensor 640 may correspond to the pressure sensor 540 illustrated in FIG. 5. A configuration of the pressure sensor 640 illustrated in FIG. 6 is exemplary, and embodiments of the disclosure are not limited to the configuration of the pressure sensor 640 illustrated in FIG. 6.

According to an embodiment, the first electrode 641 and/or the second electrode 642 may be implemented to be transparent or opaque. For example, in the case where the first electrode 641 and/or the second electrode 642 is implemented to be opaque, a conductive member (e.g., a conductive patch, a conductive wire, or the like) of the first electrode 641 and/or the second electrode 642 may be formed of copper (Cu), silver (Ag), magnesium (Mg), titanium (Ti), opaque graphene, or the like. Also, in the case where the first electrode 641 and/or the second electrode 642 is implemented to be transparent, the first electrode 641 and/or the second electrode 643 may be formed of indium thin oxide (ITO), indium zinc oxide (IZO), Ag nanowire, a metal mesh, transparent conducting polymer, or transparent graphene.

According to an embodiment, one of the first electrode 641 and/or the second electrode 642 may be implemented with one metal plate that performs a ground (GND) role. The other of the first electrode 641 and/or the second electrode 642 may be formed to have a repeated polygon pattern by using the above-described material (a so-called self-capacitance manner). The first electrodes 641 are illustrated in FIG.

6 as being implemented with square conductive patches arranged in the form of an array. However, embodiments of the disclosure are not limited thereto.

For another example, one (e.g., a transmitter (Tx) terminal) of the first electrode 641 and the second electrode 642 may be implemented with a pattern elongated in a first direction, and the other (e.g., a receiver (Rx) terminal) thereof may be implemented with a pattern elongated in a second direction intersecting the first direction at a specified angle (e.g., a right angle) (a so-called mutual-capacitance manner). According to various embodiments, the first electrode 641 and/or the second electrode 642 may be implemented with a conductive wire that is bent in the form of a strain gage pattern. For example, the first electrode 641 may be formed directly on a back surface of a display panel (e.g., 530 of FIG. 5). Alternatively, the first electrode 641 may be printed on a flexible printed circuit board (FPCB), and the FPCB may be attached to one surface of a display panel.

The dielectric layer 643 may be formed of a dielectric material having specified capacitance, for example, silicon foam, silicon membrane, optical clean adhesive (OCA), sponge, rubber, or polymer (e.g., polycabonate (PC), polyethylene terephthalate (PET), or the like).

Figure 7:
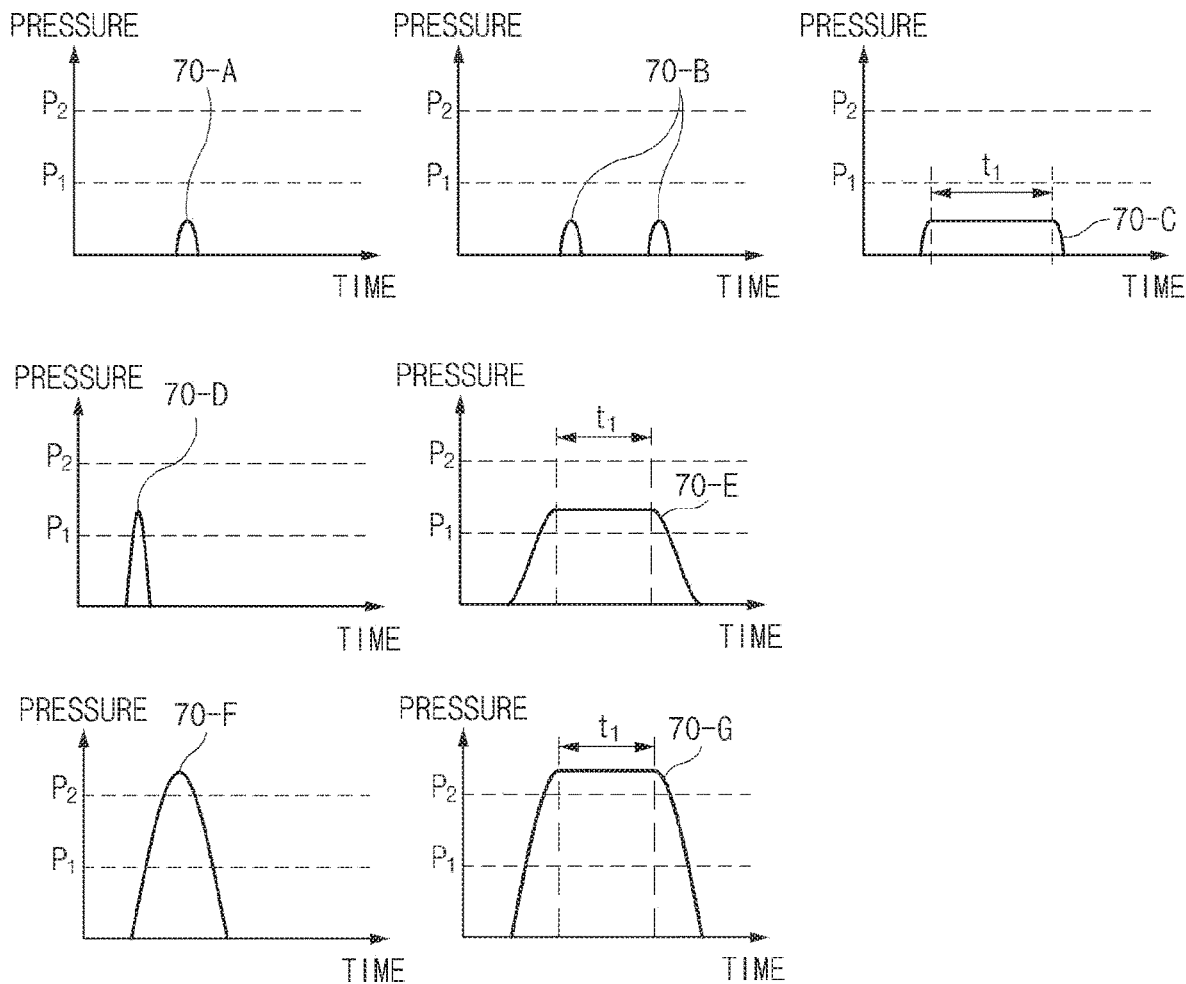
FIG. 7 is a diagram for describing a touch according to various embodiments.

FIG. 7 is a diagram for describing a touch according to various embodiments.

Referring to FIG. 7, a "touch" (e.g., the touch 61 of FIG. 6B) according to various embodiments of the disclosure may be specified based on pressure and/or a time of the touch. The "touch" according to various embodiments may include a "tap", a "double tap", a touch-down of a specified time or more (hereinafter referred to as a "long touch"), a force touch, and the like. Also, according to various embodiments, the force touch may include a "weak force touch", a weak force long touch", a "strong force touch", and a "strong force long touch". Each embodiment of the disclosure will be described by using the terms.

According to various embodiments of the disclosure, referring to a curve 70-A, during a relatively short time, a touch sensor (e.g., 540 of FIG. 5 or 640 of FIG. 6) may detect (or sense) a touch having pressure smaller than discrete pressure P1 (referred to as a "first level" or "first pressure level"). In this case, an electronic device may recognize (or specify) the touch corresponding to the curve 70-A as a simple "tap". According to various embodiments, a pressure level that is selected by the curve 70-A may be understood as a 0-th pressure level (or a default pressure level).

According to various embodiments of the disclosure, referring to a curve 70-B, during a relatively short time, a touch sensor (e.g., 540 of FIG. 5 or 640 of FIG. 6) may detect (or sense) a touch having pressure smaller than discrete pressure P1 two times. In this case, the electronic device may recognize the touch corresponding to the curve 70-B as a "double tap".

According to various embodiments of the disclosure, referring to a curve 70-C, during a time longer than a specified time t1, a touch sensor (e.g., 540 of FIG. 5 or 640 of FIG. 6) may detect (or sense) a touch having pressure smaller than the pressure P1. In this case, the electronic device may recognize the touch corresponding to the curve 70-C as a "long touch".

According to various embodiments of the disclosure, referring to a curve 70-D, during a relatively short time, a touch sensor (e.g., 540 of FIG. 5 or 640 of FIG. 6) may detect (or sense) a touch having pressure that is greater than the discrete pressure P1 and is smaller than discrete pressure P2 (referred to as a "second level" or "second pressure level": P2>P1). In this case, the electronic device may recognize the touch corresponding to the curve 70-D as a "weak force touch". According to various embodiments, a pressure level that is selected by the curve 70-D may be understood as the first pressure level P1.

According to various embodiments of the disclosure, referring to a curve 70-E, during a time longer than the specified time t1, a touch sensor (e.g., 540 of FIG. 5 or 640 of FIG. 6) may detect (or sense) a touch having pressure that is greater than the pressure P1 and is smaller than pressure P2. In this case, the electronic device may recognize the touch corresponding to the curve 70-E as a "weak force long touch".

According to various embodiments of the disclosure, referring to a curve 70-F, during a relatively short time, a touch sensor (e.g., 540 of FIG. 5 or 640 of FIG. 6) may detect (or sense) a touch having pressure greater than the pressure P2 (P2>P1). In this case, the electronic device may recognize the touch corresponding to the curve 70-F as a "strong force touch". According to various embodiments, a pressure level that is selected by the curve 70-F may be understood as the second pressure level P2.

According to various embodiments of the disclosure, referring to a curve 70-G, during a time longer than the specified time t1, a touch sensor (e.g., 540 of FIG. 5 or 640 of FIG. 6) may detect (or sense) a touch having pressure greater than the pressure P2. In this case, the electronic device may recognize the touch corresponding to the curve 70-G as a "strong force long touch".

The "touches" of the above-described types are not limited to the examples described in the curves 70-A to 70-G. For example, the "touches" of the various types may include a so-called "triple touch" including three or more touches. For another example, in the case where the pressure P3 is set to be greater than the pressure P2, a touch that has pressure exceeding the pressure P3 may be recognized as a very strong force touch. Various embodiments of the disclosure may be performed based at least on the "touches" of the various types.

Figure 8:
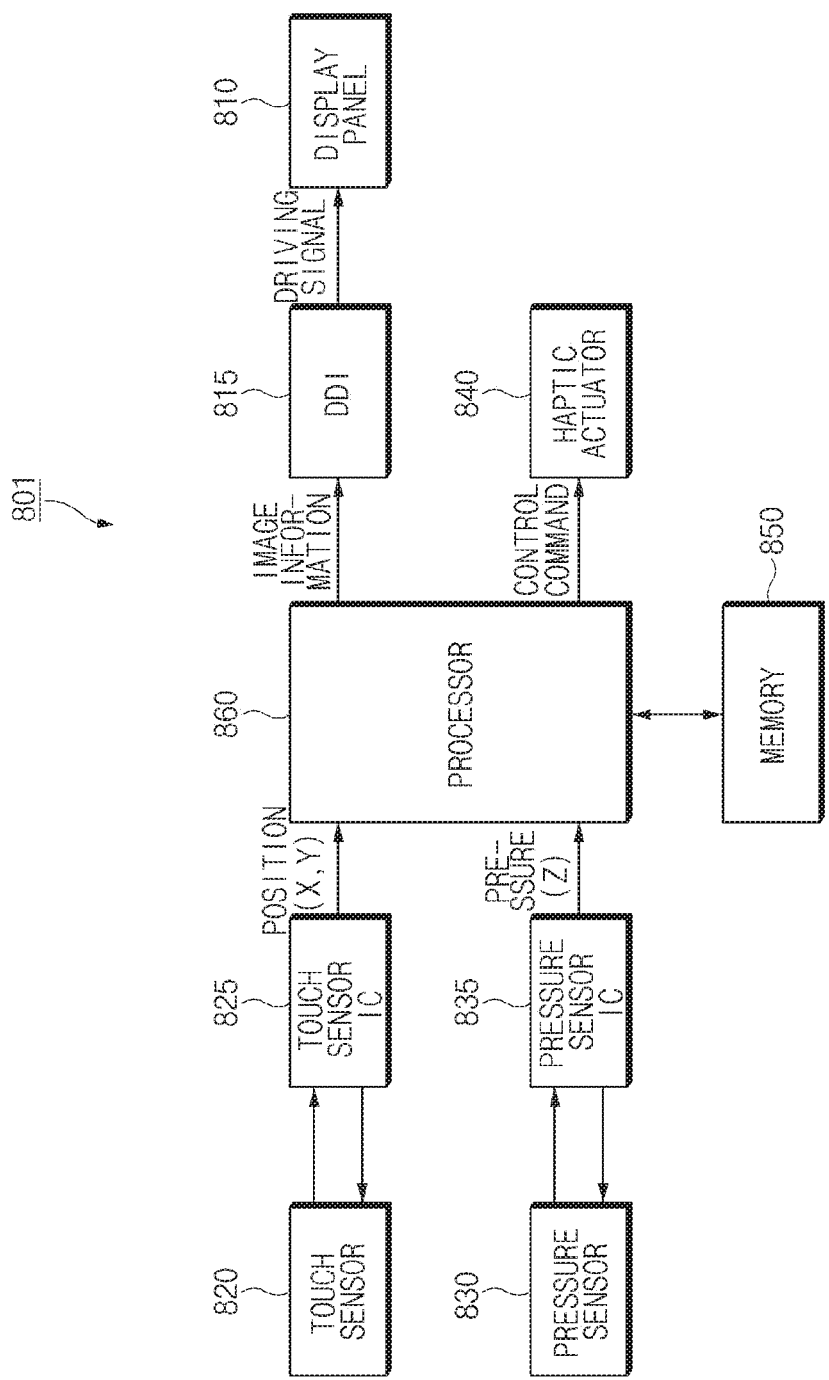
FIG. 8 illustrates a block diagram of an electronic device according to an embodiment.

FIG. 8 illustrates a block diagram of an electronic device according to an embodiment.

Referring to FIG. 8, an electronic device 801 according to an embodiment may include a display panel 810, a display driving integrated circuit (IC) (DDI) 815, a touch sensor 820, a touch sensor IC 825, a pressure sensor 830, a pressure sensor IC 835, a haptic actuator 840, a memory 850, and a processor 860. Descriptions associated with components of FIG. 8 that are the same as the components described with reference to FIGS. 1 to 5 will be omitted.

The display panel 810 may receive an image driving signal supplied from the display driving integrated circuit (DDI) 815. The display panel 810 may display a variety of content and/or item (e.g., a text, an image (object), a video, an icon, a functional object, a symbol, or the like) in response to the image driving signal. In the disclosure, the display panel 810 may be coupled with the touch sensor 820 and/or the pressure sensor 830 so as to be overlaid (e.g., refer to FIG. 5), which is simply referred to as a "display".

The display driving integrated circuit (DDI) 815 may supply the display panel 810 with the image driving signal corresponding to image information received from the processor 860 (a host) at a frame rate that is determined in advance. Although not illustrated in FIG. 8, according to various embodiments, the display driving integrated circuit 815 may include a graphics RAM, an interface module, an image processing unit, a multiplexer, a display timing controller (T-con), a source driver, a gate driver, and/or an oscillator.

The touch sensor 820 may sense a physical quantity (e.g., a voltage, the amount of light, a resistance, the amount of charges, a capacitance, or the like) that changes as the user touches a cover glass (e.g., 510 of FIG. 5). According to an embodiment, the touch sensor 820 may be disposed to be overlaid with the display panel 810.

The touch sensor IC 825 may sense the variation in the physical quantity and may calculate a position (X, Y), at which a touch is made, based on the variation in the physical quantity (e.g., a voltage, a resistance, a capacitance, or the like). The calculated position (or coordinates) may be provided (or reported) to the processor 860.

According to various embodiments of the disclosure, in the case where a portion (e.g., a finger) of a user body, an electronic pen), or the like makes contact with a cover glass (e.g., 510 of FIG. 5) of a display, a coupling voltage between a transmitting terminal Tx and a receiving terminal Rx included in the touch sensor 820 may change. For example, the variation in the coupling voltage may be sensed by the touch sensor IC 825, and the touch sensor IC 825 may provide coordinates (X, Y) of a position, at which the touch is made, to the processor 860. The processor 860 may obtain data associated with the coordinates (X, Y) as an event associated with a user input.

The touch sensor IC 825 may be referred to as a "touch IC", a "touch screen IC", a "touch controller", a "touch screen controller IC", or the like. According to various embodiments, in an electronic device in which the touch sensor IC 825 is not included, the processor 860 may perform a role of the touch sensor IC 825. According to various embodiments, the touch sensor IC 825 and the processor 860 may be implemented with one component (e.g., one-chip).

The pressure sensor 830 may sense pressure (or force) by an external object (e.g., a finger or an electronic pen). According to an embodiment, the pressure sensor 830 may sense the pressure based on the variation in a physical quantity (e.g., a capacitance) between the transmitter (Tx) terminal (e.g., the first electrode 641 of FIG. 6) and the receiver (Rx) terminal (e.g., the second electrode 642 of FIG. 6) due to the touch.

The pressure sensor IC 835 may sense the variation in the physical quantity (e.g., a capacitance or the like) in the pressure sensor 830 and may calculate pressure "Z" applied by a user touch based on the variation in the physical quantity. The pressure "Z" may be provided to the processor 860 together with the position (X, Y) at which the touch is made.

According to various embodiments, the pressure sensor IC 835 may be referred to as a "force touch controller", a "force sensor IC", a "pressure panel IC", or the like. Also, according to various embodiments, the pressure sensor IC 835 may be implemented with one component (e.g., one-chip) together with the touch sensor IC 825.

The haptic actuator 840 may provide the user with a haptic feedback (e.g., vibration) in response to a control command of the processor 860. For example, when a touch input (e.g., including a touch, a hovering, and a "force touch") is received from the user, the haptic actuator 840 may provide the user with the haptic feedback.

The memory 850 may store commands or data associated with operations of components included in the electronic device 801. According to various embodiments of the disclosure, the memory 850 may store at least one application program that includes a user interface configured to display a plurality of items in a display. For example, the memory 850 may store instructions that, when executed, cause the processor 860 to perform various operations (e.g., refer to FIGS. 9A and 9B) disclosed in this specification.

The processor 860 may be electrically connected with the components 810 to 850 included in the electronic device 801, for example. The processor 860 may perform data processing or an operation associated with control and/or communication of the component 810 to 850 included in the electronic device 801.

According to an embodiment, the processor 860 may launch (or execute) an application program (or simply referred to as an "application") that displays a user interface in the display panel 810. The processor 860 may display one or more items in a user interface displayed in the display panel 810 in response to the launching of the application.

The processor 860 may receive first data (data including position coordinates (X, Y) of a touch) generated from the touch sensor 820. Also, the processor 860 may receive second data (data including pressure "Z" of a touch) generated from the pressure sensor 830. The processor may select one of the plurality of items based at least on the first data and may select one of a plurality of discrete pressure levels (e.g., P1 and P2 of FIG. 7) based at least on the second data. The processor 860 may display one of a plurality of sets of information associated with the selected item, based at least on the one pressure level selected from the plurality of pressure levels.

According to various embodiments of the disclosure, when the first level is selected, the processor 860 may display a first set of information among the plurality of sets of information in a display. When the second level is selected, the processor 860 may display a second set of information among the plurality of sets of information in the display. According to various embodiments of the disclosure, the amount of the second set of information may be greater than the amount of the first set of information.

According to an embodiment, the processor 860 may output a plurality of items in the display panel 810. For example, the plurality of items may include an icon, an image object, a text (or a text object), or a functional object for executing a specified operation. The processor 860 may select at least one of the plurality of items based on a position of a touch sensed in the touch sensor 820 and may detect a pressure level of the touch by using the pressure sensor 830. The processor 860 may display at least one set of information associated with the at least one selected item in the display in response to the pressure level of the touch thus detected.

The above-described operations of the processor 860 are, but are not limited to, an example. For example, any other operations of a processor described in this specification should be understood as operations of the processor 860. Also, in this specification, at least a part of operations described as operations of an "electronic device" should be understood as operations of the processor 860.

An electronic device according to an embodiment may include a housing that includes a first surface facing in a first direction and a second surface facing in a second direction that is opposite to the first direction, a display that is disposed between the first surface and the second surface and is exposed through the first surface, a touch sensor that is disposed between the first surface and the second surface and detects at least one position of a touch on the display by an external object, a pressure sensor that is disposed between the first surface and the second surface and detects pressure against the display by the external object, at least one processor that is electrically connected with the display, the touch sensor, and the pressure sensor, and a memory that is electrically connected with the at least one processor. The memory may store at least one application program including a user interface configured to display a plurality of items in the display and instructions that, when executed, cause the processor to launch an application program displaying the user interface in the display, to display an array of the plurality of items in the user interface, to receive first data generated from the touch sensor, to receive second data received from the pressure sensor, to select one of the plurality of items based at least on the first data, to select one of a plurality of pressure levels based at least on the second data, and to display one of a plurality of sets of information associated with the selected one of the plurality of items in the display, based at least on the selected one of the plurality of pressure levels.

According to another embodiment, the plurality of pressure levels may include a discrete first level and a discrete second level higher than the first level. The instructions may include an instruction that causes the processor to display a first set of information of the plurality of sets of information in the display when the first level is selected, and to display a second set of information of the plurality of sets of information in the display when the second level is selected. The amount of the second set of information may be greater than the amount of the first set of information.

An electronic device according to an embodiment may include a display, a touch sensor, a pressure sensor, at least one processor electrically connected with the display, the touch sensor, and the pressure sensor, and a memory electrically connected with the at least one processor. The memory may store instructions that, when executed, cause the processor to display a plurality of items in the display, to select at least one of the plurality of items based on a position of a touch sensed in the touch sensor, to detect a pressure level of the touch by using the pressure sensor, and to display at least one set of information associated with the selected at least one item in the display in response to the detected pressure level of the touch.

According to another embodiment, the plurality of items may include a functional object configured to request an input query and a search result of the input query. The memory may store instructions that cause the processor to select the functional object based on a position of a touch sensed in the touch sensor, to display a first set of information including a first search result of the input query in the display when the detected pressure level of the touch is not greater than a first pressure level, to display a second set of information including a second search result of the input query in the display when the detected pressure level of the touch exceeds the first pressure level, and to display a third set of information including a third search result of the input query in the display when the detected pressure level of the touch exceeds a second pressure level greater than the first pressure level.

For example, the first search result may include a category list including at least one category. For another example, the second search result may include at least one item that belongs to a category having the highest correlation with the input query. For another example, the third search result may include detailed information of one item, which has the highest correlation with the input query, from among at least one item belonging to a category having the highest correlation with the input query.

For example, the first search result may include a search result in which the input query is included with an accuracy of a first level. For another example, the second search result may include a search result in which the input query is included with an accuracy of a second level. For another example, the third search result may include a search result in which the input query is included with an accuracy of a third level. In this case, the accuracy of the second level may be set to be higher than the accuracy of the first level and to be lower than the accuracy of the third level.

According to another embodiment, the plurality of items may include a text. The memory may store instructions that cause the processor to select the text based on a position of a touch sensed in the touch sensor, to display a first set of information including the text in the display when the detected pressure level of the touch exceeds a first pressure level, and to display a second set of information including the text in the display when the detected pressure level of the touch exceeds a second pressure level greater than the first pressure level.

For example, the text may be included in an execution screen of an e-mail application. In this case, the first set of information may include a mail list in which the text is included in a mail title. The second set of information may include a mail list in which the text is included in the mail title or a mail body For another example, the text may be included in an execution screen by a specified application. In this case, the first set of information may include a search result in which the text is included with an accuracy of a first level. The second set of information may include a search result in which the text is included with an accuracy of a second level. The accuracy of the second level may be higher than the accuracy of the first level For another example, the text may be included in an execution screen by a specified application. The first set of information may include a search result of the text obtained in the electronic device, and the second set of information may include a web search result of the text.

According to another embodiment, the plurality of items may include an image object. The memory may store instructions that cause the processor to select the image object based on a position of a touch sensed in the touch sensor, to display a first set of information including an image object similar to the selected image object as much as a first level in the display, when the detected pressure level of the touch exceeds a first pressure level, and to display a second set of information including an image object similar to the selected image object as much as a second level in the display, when the detected pressure level of the touch exceeds a second pressure level greater than the first pressure level. In this case, a similarity of the second level may be set to be higher than a similarity of the first level.

According to another embodiment, the plurality of items may include an icon of a specified application. The memory may store instructions that cause the processor to select the icon based on a position of a touch sensed in the touch sensor, to display an execution screen of the specified application in the display as a first set of information when the detected pressure level of the touch is not greater than a first pressure level, to display a second set of information associated with the specified application in the display when the detected pressure level of the touch exceeds the first pressure level, and to display a third set of information associated with the specified application in the display when the detected pressure level of the touch exceeds a second pressure level greater than the first pressure level. In this case, the amount of the third set of information may be greater than the amount of the second set of information. Also, the second set of information or the third set of information may include notification information of the specified application.

According to another embodiment, the plurality of items may include a specified functional object. The memory may store instructions that cause the processor to select the specified functional object based on a position of a touch sensed in the touch sensor, to display a screen linked to the specified functional object in the display as a first set of information when the detected pressure level of the touch is not greater than a first pressure level, to display a second set of information associated with the specified functional object in the display when the detected pressure level of the touch exceeds a first pressure level, and to display a third set of information associated with the specified functional object in the display when the detected pressure level of the touch exceeds a second pressure level greater than the first pressure level.

According to another embodiment, the plurality of items may include a functional object included in an execution screen of a specified application. The memory may store instructions that cause the processor to select the functional object based on a position of a touch sensed in the touch sensor, to display a first set of information for configuring the execution screen including the functional object so as to correspond to a first layout, in the display, when the detected pressure level of the touch exceeds a first pressure level, and to display a second set of information for configuring the execution screen including the functional object so as to correspond to a second layout, in the display, when the detected pressure level of the touch exceeds a second pressure level greater than the first pressure level.

Figure 9A:
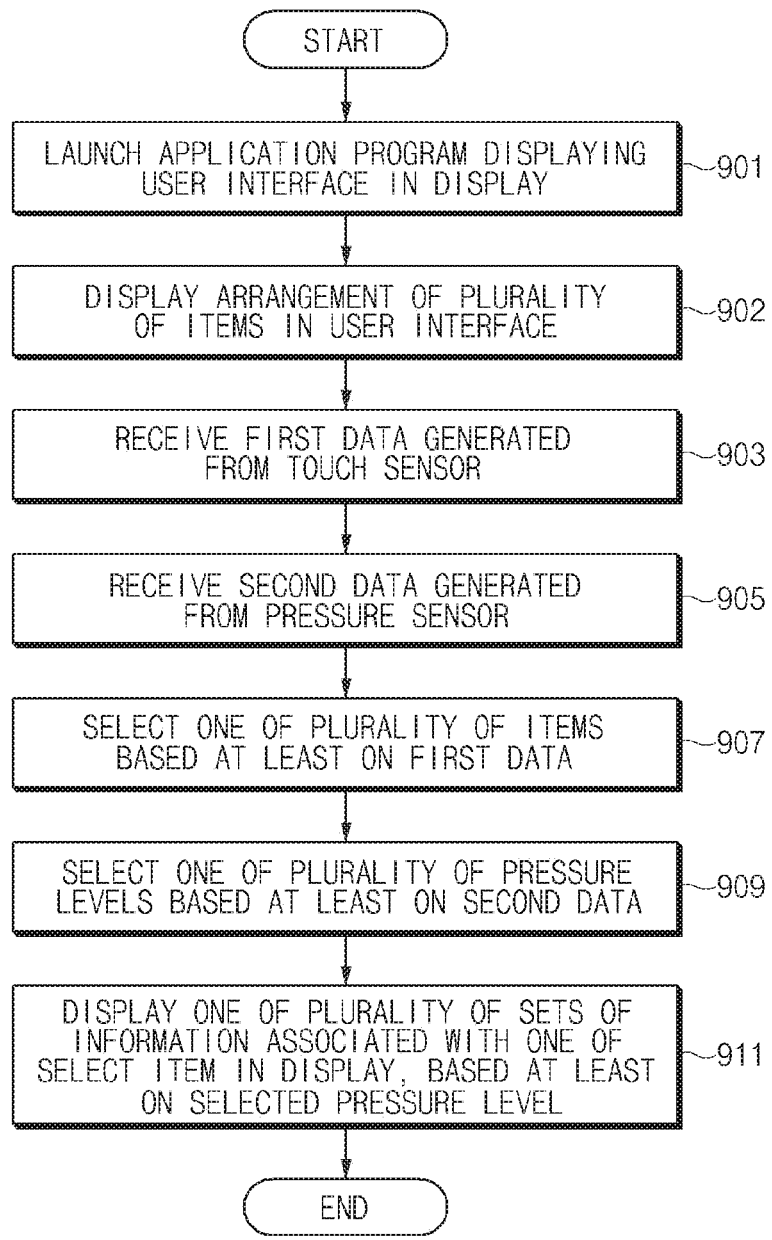
FIGS. 9A and 9B illustrate an information providing method according to an embodiment.

FIG. 9A illustrates an information providing method according to an embodiment.

Referring to FIG. 9A, the information providing method according to an embodiment may include operation 901 to operation 911. Operation 901 to operation 911 may be performed by, for example, the electronic device 801 illustrated in FIG. 8. Operation 901 to operation 911 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 901 to operation 911 will be described by using reference marks/numerals of FIG. 8.

In operation 901, the processor 860 of the electronic device 801 may launch (or execute) an application program that displays a user interface in the display panel 810. For example, the processor 860 may render the user interface in the display panel 810 based on an activity included in the application program.

In operation 902, the processor 860 may display an array of a plurality of items (e.g., an icon, an image (object), a text (object), and a functional object) in the user interface. For example, the plurality of items may be realized at the same time with the user interface.

In operation 903, the processor 860 may receive first data generated from the touch sensor 820. The first data may include position information of a touch by an external object (e.g., a finger of the user or an electronic pen).

In operation 905, the processor 860 may receive second data generated from the pressure sensor 830. The second data may include information about pressure (or force) of the touch by the external object.

According to various embodiments, operation 903 and operation 905 are illustrated as separate operations, but the processor 860 may receive the first data and the second data from the touch sensor 820 and the pressure sensor 830 substantially simultaneously in response to the touch by the external object.

In operation 907, the processor 860 may select one of the plurality of items based on the first data. That is, the processor 860 may select one of the plurality of items displayed in the display panel 810 based at least on information (e.g., coordinates) of a position at which the touch is made by the external object.

In operation 909, the processor 860 may select one of a plurality of items based on the second data. The processor 860 may select one of touches of various types illustrated in FIG. 7, based on pressure of the touch by the external object.

In operation 911, the processor 860 may display one of a plurality of sets of information associated with one of the selected item, based on at least one pressure level selected in operation 909. For example, the processor 860 may display different sets of information in the display panel 810 based on a pressure level (or a strength and weakness) of the touch.

Figure 9B:
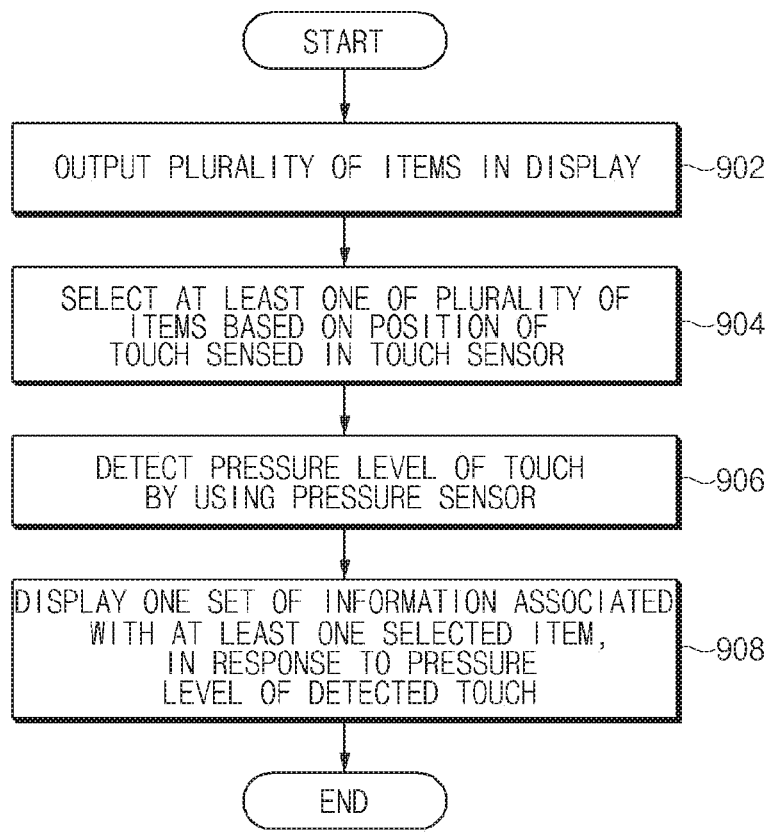

FIG. 9B illustrates an information providing method according to another embodiment.

Referring to FIG. 9B, the information providing method according to an embodiment may include operation 902 to operation 908. Operation 902 to operation 908 may be performed by, for example, the electronic device 801 illustrated in FIG. 8. Operation 902 to operation 908 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, like FIG. 9A, operation 902 to operation 908 will be described by using reference marks/numerals of FIG. 8.

In operation 902, the processor 860 of the electronic device 801 may output a plurality of items (e.g., an icon, an image (object), a text (object), and a functional object) in the display panel 810. For example, the plurality of items may be included in execution screens of various types of applications (e.g., a home application, an e-mail application, a Browser application, a search application, and the like).

In operation 904, the processor 860 may select one of the plurality of items based on a position of a touch sensed in the touch sensor 820.

In operation 906, the processor 860 may detect a pressure level of the touch by using the pressure sensor 830. According to various embodiments, operation 904 and operation 906 are illustrated as separate operations, but the processor 860 may perform the selection of at least one item and the detection of the pressure level substantially simultaneously.

In operation 908, the processor 860 may display at least one set of information associated with the at least one item selected in operation 906 in the display panel 810 in response to the pressure level of the touch detected in operation 906.

An operation of an electronic device according to an embodiment of the disclosure is described with reference to FIGS. 9A and 9B. Below, detailed examples of an operation of an electronic device according to various embodiments of the disclosure will be described with reference to FIGS. 10 to 28. Descriptions of FIGS. 10 to 28 that are the same as the descriptions given with reference to FIGS. 9A and 9B will be omitted.

Figure 10:
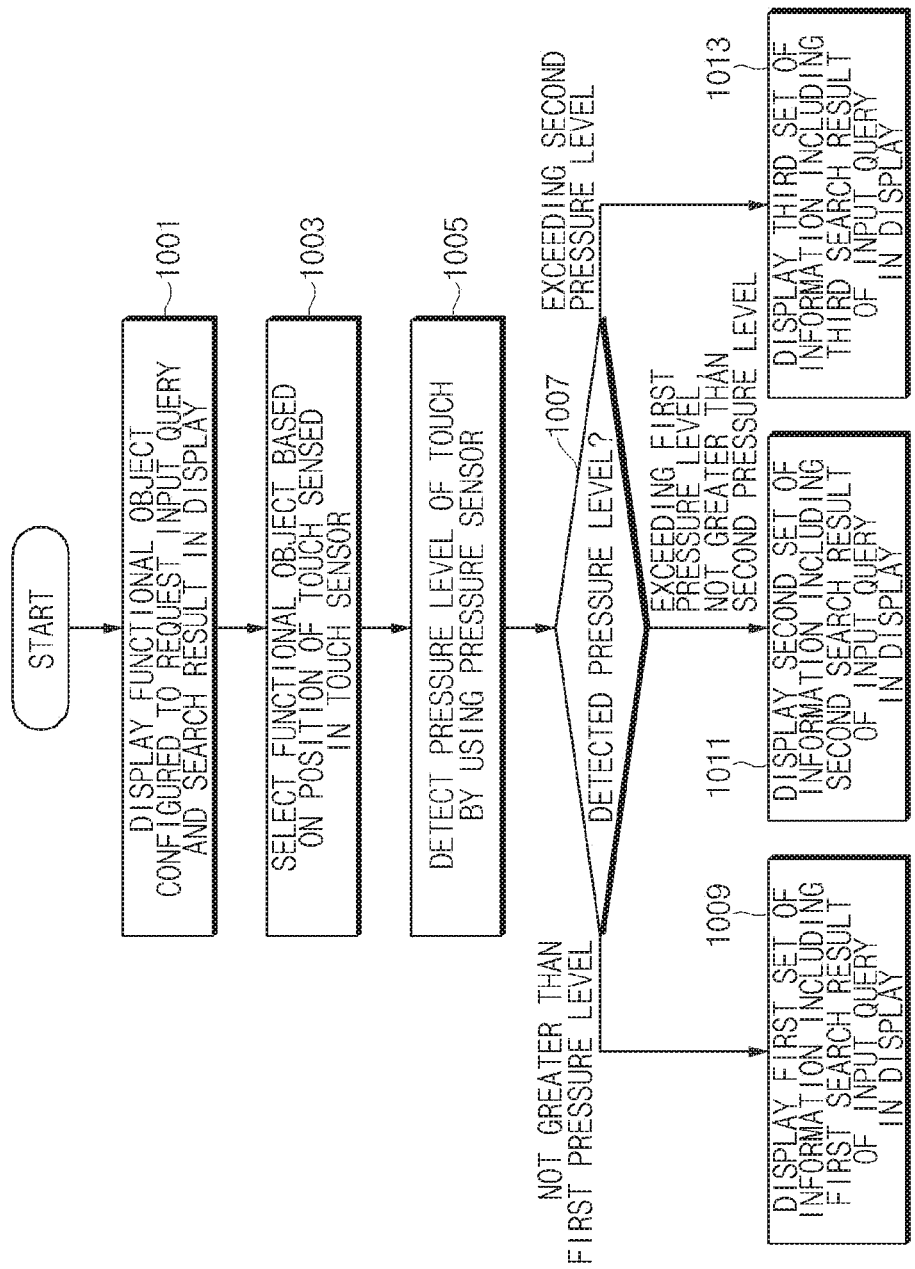
FIG. 10 illustrates a method for providing a search result of an input query, according to an embodiment.

FIG. 10 illustrates a method for providing a search result of an input query, according to an embodiment.

Referring to FIG. 10, according to an embodiment, a method for providing a search result of an input query (or a search query) may include operation 1001 to operation 1013. Operation 1001 to operation 1013 may be performed by, for example, the electronic device 801 illustrated in FIG. 8. Operation 1001 to operation 1013 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 1001 to operation 1013 will be described by using reference marks/numerals of FIG. 8.

In operation 1001, the processor 860 of the electronic device 801 may display a plurality of items in the display panel 810. For example, the plurality of items may include a functional object that is configured to request an input query and a search result (or a retrieve result) of the input query.

According to various embodiments of the disclosure, the input query may include a text, an image, a voice, or the like that the user inputs. For example, the functional object configured to request the search result may include a key (or a button) for confirming the search query. In addition, the functional object configured to request the search result may include, for example, a search key (or a search button) included in an execution screen of a search application in a device, an execution screen of a web search application, or an execution screen of a browser application displaying a web page of a search provider.

In operation 1003, the processor 860 may select the functional object configured to request the search result, based on a position of the touch sensed in the touch sensor 820.

In operation 1005, the processor 860 may detect a pressure level of the touch by using the pressure sensor 830. Operation 1003 and operation 1005 are illustrated in FIG. 10 as separate operations, but the processor 860 may perform operation 1003 and operation 1005 substantially simultaneously in response to the touch.

In operation 1007, the processor 860 may determine the pressure level detected in operation 1005. For example, when the detected pressure of the touch is not greater than (or smaller than) the first pressure level (e.g., P1 of FIG. 7), the processor 860 may proceed to operation 1009. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 1011. When the detected pressure of the touch is greater than (or not smaller than) the second pressure level (e.g., P2 of FIG. 7), the processor 860 may proceed to operation 1013.

In operation 1009, because the detected pressure of the touch is not greater than (or smaller than) the first pressure level, the processor 860 may display a first set of information including a first search result of the input query in the display panel 810. For example, in the case where the detected touch is a "tap", the processor 860 may display the first set of information including the first search result of the input query in the display panel 810.

The first search result may include, for example, a search result in which the input query is included with accuracy of a first level. Also, for example, the first search result of the input query may include a category list including at least one category (or domain).

In operation 1011, because the detected pressure of the touch is greater than (or equal to or greater than) the first pressure level and is not greater than (or smaller than) the second pressure level, the processor 860 may display a second set of information including a second search result of the input query in the display panel 810. For example, in the case where the detected touch is a "weak force touch", the processor 860 may display the second set of information including the second search result of the input query in the display panel 810.

The second search result may include, for example, a search result in which the input query is included with accuracy of a second level. In this case, the accuracy of the second level may be higher than the accuracy of the first level. Also, for example, the second search result may include at least one item that belongs to a category having the highest correlation with the input query. The category having the highest correlation with the input query may be, for example, a category included in a category list included in the first search result.

In operation 1013, because the detected pressure of the touch is greater than the second pressure level, the processor 860 may display a third set of information including a third search result of the input query in the display panel 810. For example, in the case where the detected touch is a "strong force touch", the processor 860 may display the third set of information including the third search result of the input query in the display panel 810.

The third search result may include, for example, a search result in which the input query is included with accuracy of a third level. In this case, the accuracy of the third level may be higher than the accuracy of the second level. For example, the third search result may include detailed information of one item, which has the highest correlation with the input query, from among the at least one item belonging to the category having the highest correlation with the input query. The item that has the highest correlation with the input query may be, for example, one of items that are included in the second search result and are included in the category having the highest correlation with the input query.

According to various embodiments of the disclosure, operation 1009, operation 1011, or operation 1013 may be switched in real time based on the fluctuations in the pressure of the touch determined in operation 1007. For example, when pressure of a touch from the user is smaller than the first pressure level, the processor 860 may perform operation 1009. When the pressure of the touch gradually increases (in a state where a touch release is not made) and is greater than the first pressure level, the processor 860 may perform operation 1011. When the pressure of the touch further increases and is greater than the second pressure level, the processor 860 may perform operation 1013. In the case where pressure of a touch decreases, as in the above description, a switch between operation 1009, operation 1011, and operation 1013 may be made in real time in response to a decrease in the pressure of the touch.

Figure 11:
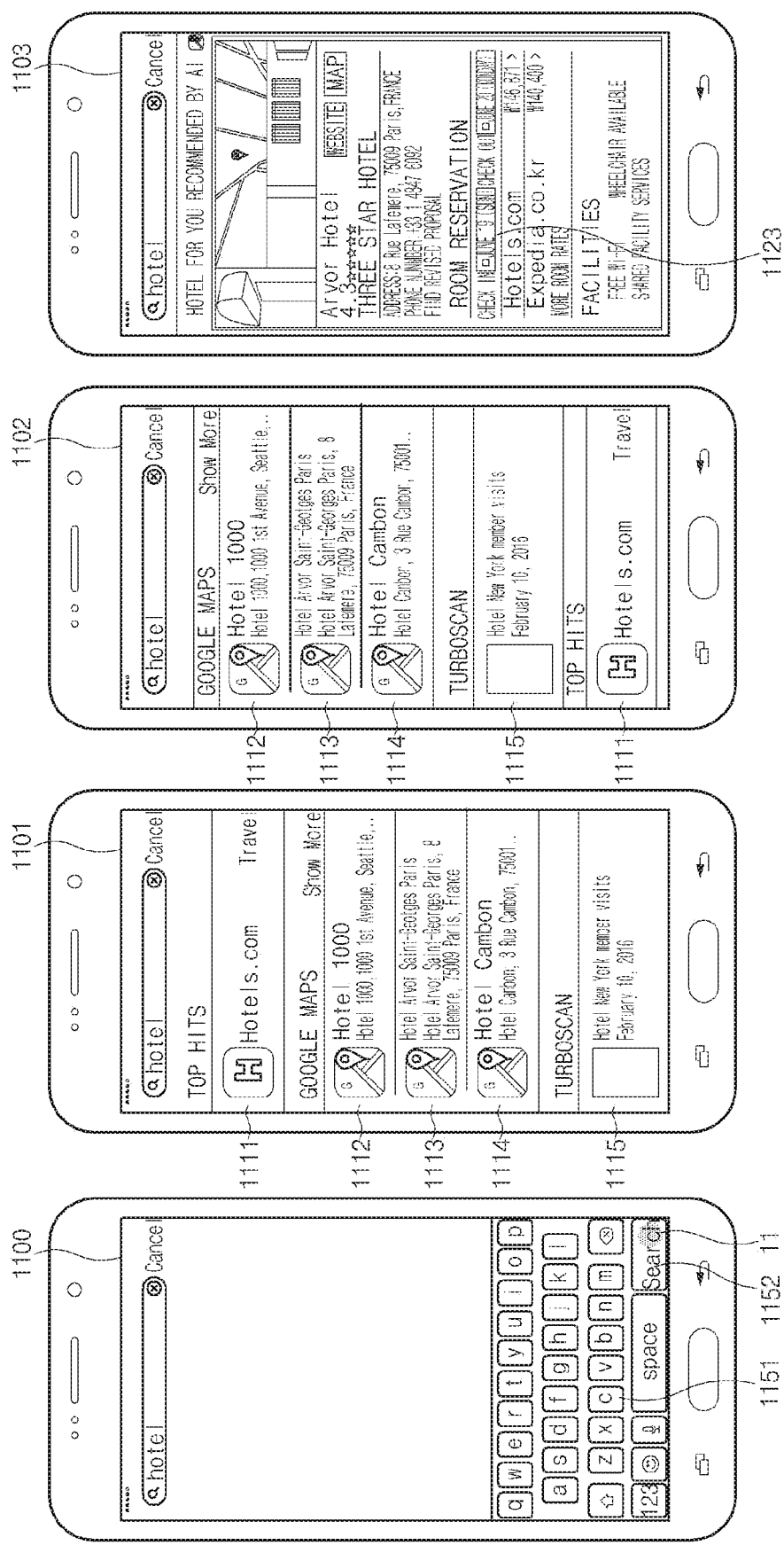
FIG. 11 is a diagram for describing a method for providing a search result of an input query, according to an embodiment.

FIG. 11 is a diagram for describing a method for providing a search result of an input query, according to an embodiment.

Referring to FIG. 11, according to an embodiment, an electronic device that performs a method for providing a search result of an input query is illustrated. According to an embodiment, the electronic device may execute a search application (or a browser application outputting a search engine web page). Screen 1100 may be displayed in a display of the electronic device by the execution. The user may input an input query (e.g., "hotel") by using a soft keyboard 1151 displayed in screen 1100. Afterwards, the user may perform a touch 11 on a functional object 1152 (e.g., a search key) configured to request a search result of the input query.

The electronic device may select the functional object 1152 based on a position of the touch 11 sensed in a touch sensor and may detect a pressure level of the touch 11 by using a pressure sensor.

For example, when the pressure level of the touch 11 is not greater than (or smaller than) the first pressure level, the electronic device may display a first search result screen 1101, in which the input query (e.g., "hotel") is found with accuracy of a first level, in the display. For example, the first search result may include a category list including a plurality of categories (e.g., "TOP HITS", "GOOGLE MAPS", and "TURBOSCAN"). For example, one item 1111 may be included in the "TOP HITS" category, three items 1112 to 1114 may be included in the "GOOGLE MAPS" category, and one item 1115 may be included in the "TURBOSCAN" category.

For another example, when the pressure level of the touch 11 is greater than (or not smaller than) the first pressure level and is not greater than (or smaller than) the second pressure level, the electronic device may display a second search result screen 1102, in which the input query is found with accuracy of a second level, in the display. For example, when the pressure of the touch 11 increases to the first pressure level or greater from the first pressure level or smaller, the second search result screen 1102 may be output in the display. In this case, the accuracy of the second level may be higher than the accuracy of the first level. For example, the items 1112 to 1114 belonging to the category (e.g., "GOOGLE MAPS") having the highest correlation with the input query may be displayed on top of the second search result. The item 1111 belonging to the "TOP HITS" category and the item 1115 belonging to the "TURBOSCAN" category are illustrated in the second search result screen 1102 of FIG. 11; however, according to various embodiments, the items 1111 and 1115 may be excluded from the second search result screen 1102.

For another example, when the pressure level of the touch 11 is greater than (or not smaller than) the second pressure level, the electronic device may display a third search result screen 1103, in which the input query is found with accuracy of a third level, in the display. For example, when the pressure of the touch 11 increases to the second pressure level or greater from the first pressure level or from the second pressure level or smaller, the third search result screen 1103 may be output in the display. In this case, the accuracy of the third level may be higher than the accuracy of the second level. For example, the third search result may include detailed information 1123 of the item 1113, which has the highest correlation with the input query (e.g., "hotel"), from among the items 1112 to 1114 belonging to the category (e.g., "GOOGLE MAPS") having the highest correlation with the input query (e.g., "hotel").

Figure 12:
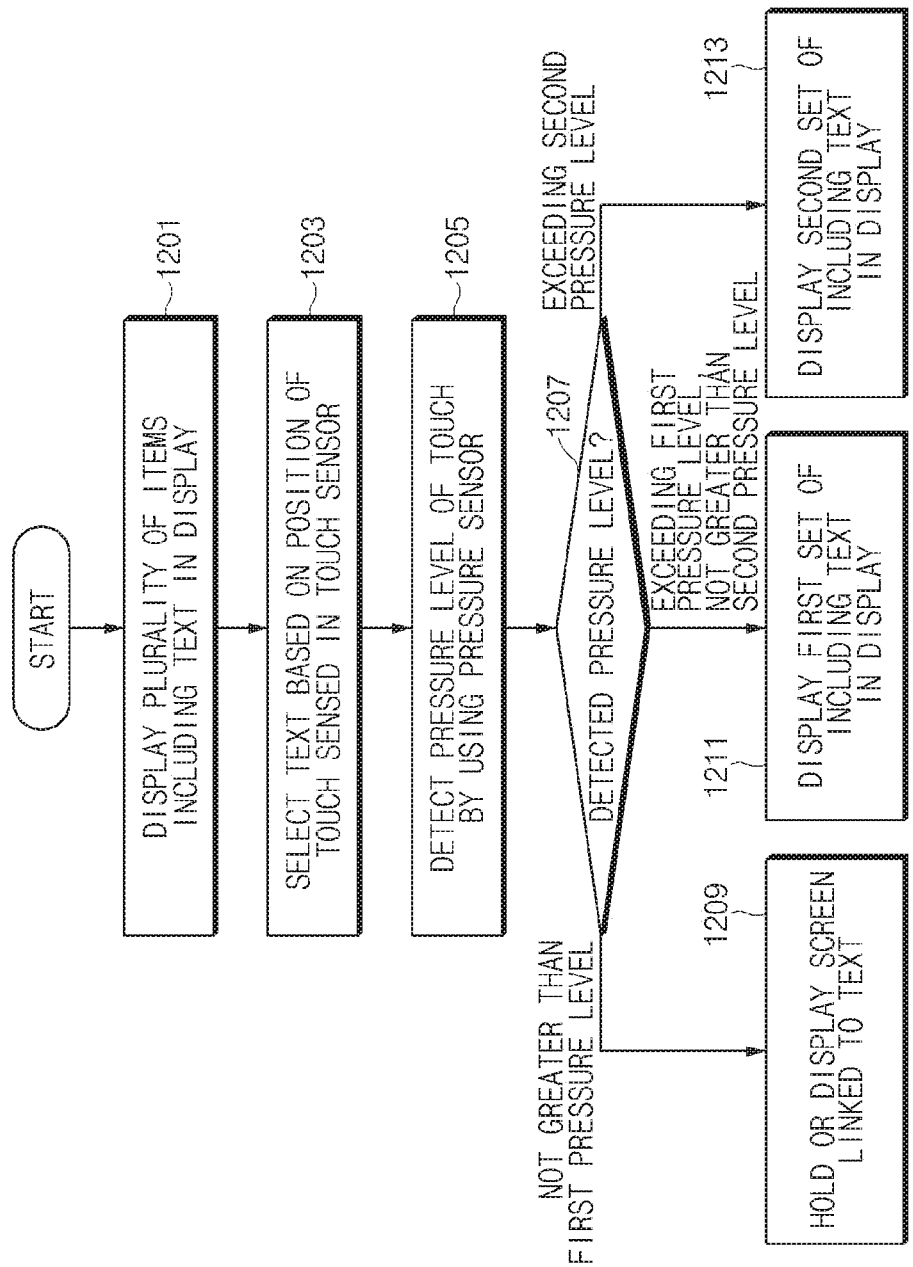
FIG. 12 illustrates a method for providing information based on a touch on a text, according to an embodiment.

FIG. 12 illustrates a method for providing information based on a touch on a text, according to an embodiment.

Referring to FIG. 12, a method for providing information based on a touch on a text may include operation 1201 to operation 1213. Operation 1201 to operation 1213 may be performed by, for example, the electronic device 801 illustrated in FIG. 8. Operation 1201 to operation 1213 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 1201 to operation 1213 will be described by using the reference numerals of FIG. 8.

In operation 1201, the processor 860 of the electronic device 801 may display a plurality of items in the display panel 810. For example, the plurality of items may include a text. For example, the text may include at least one alphabet, word, phrase, clause, sentence, or paragraph included in an execution screen of an application (e.g., an e-mail application, an e-book application, a browser application, or the like). Also, according to various embodiments, the text may include a hypertext to which a specified screen (or content) is linked.

In operation 1203, the processor 860 may select or specify the text based on a position of a touch sensed in the touch sensor 820. In this case, the processor 860 may highlight the text.

In operation 1205, the processor 860 may detect a pressure level of the touch by using the pressure sensor 830.

In operation 1207, the processor 860 may determine the pressure level detected in operation 1205. For example, when the detected pressure of the touch is not greater than (or smaller than) the first pressure level (e.g., P1 of FIG. 7), the processor 860 may proceed to operation 1209. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 1211. When the detected pressure of the touch is greater than (or not smaller than) the second pressure level (e.g., P2 of FIG. 7), the processor 860 may proceed to operation 1213.

In operation 1209, because the detected pressure of the touch is not greater than (or smaller than) the first pressure level, for example, the processor 860 may hold the selected text. For example, the hold may provide a start point of a touch scrolling operation capable of being followed by a touch of the first pressure level or smaller. Meanwhile, in the case where the text is a hypertext, the processor 860 may display a screen linked to the hypertext in the display panel 810 in response to the touch of the first pressure level or smaller.

In operation 1211, because the detected pressure of the touch is greater than (or equal to or greater than) the first pressure level and is not greater than (or smaller than) the second pressure level, the processor 860 may display a first set of information including the text in the display panel 810. For example, in the case where the detected touch is a "weak force touch", the processor 860 may display the first set of information in the display panel 810.

According to an embodiment, for example, in the case where the selected text is included in an execution screen of an e-mail application, the first set of information may include a list of mails where the text is included in a mail title. According to an embodiment, in the case where the selected text is included in an execution screen of a browser application or an e-book application, the first set of information may include a search result in which the text is included with accuracy of a (relatively low) first level. For another example, in the case where the selected text is included in an execution screen of a browser application or an e-book application, the first set of information may include a search result of the text obtained within a first search range (e.g., the memory 850 of the electronic device 801).

In operation 1213, because the detected pressure of the touch is greater than the second pressure level, the processor 860 may display a second set of information including the text in the display panel 810. For example, in the case where the detected touch is a "strong force touch", the processor 860 may display the second set of information including the text in the display panel 810.

According to an embodiment, for example, in the case where the selected text is included in an execution screen of an e-mail application, the second set of information may include a list of mails where the text is included in a mail title and/or a main body. According to an embodiment, in the case where the selected text is included in an execution screen of a browser application or an e-book application, the second set of information may include a search result in which the text is included with accuracy of a (relatively high) second level. In this case, the accuracy of the second level may be set to be higher than the accuracy of the first level. For another example, in the case where the selected text is included in an execution screen of a browser application or an e-book application, the second set of information may include a search result (a web search result) of the text obtained within a second search range (e.g., an Internet).

Figure 13A:
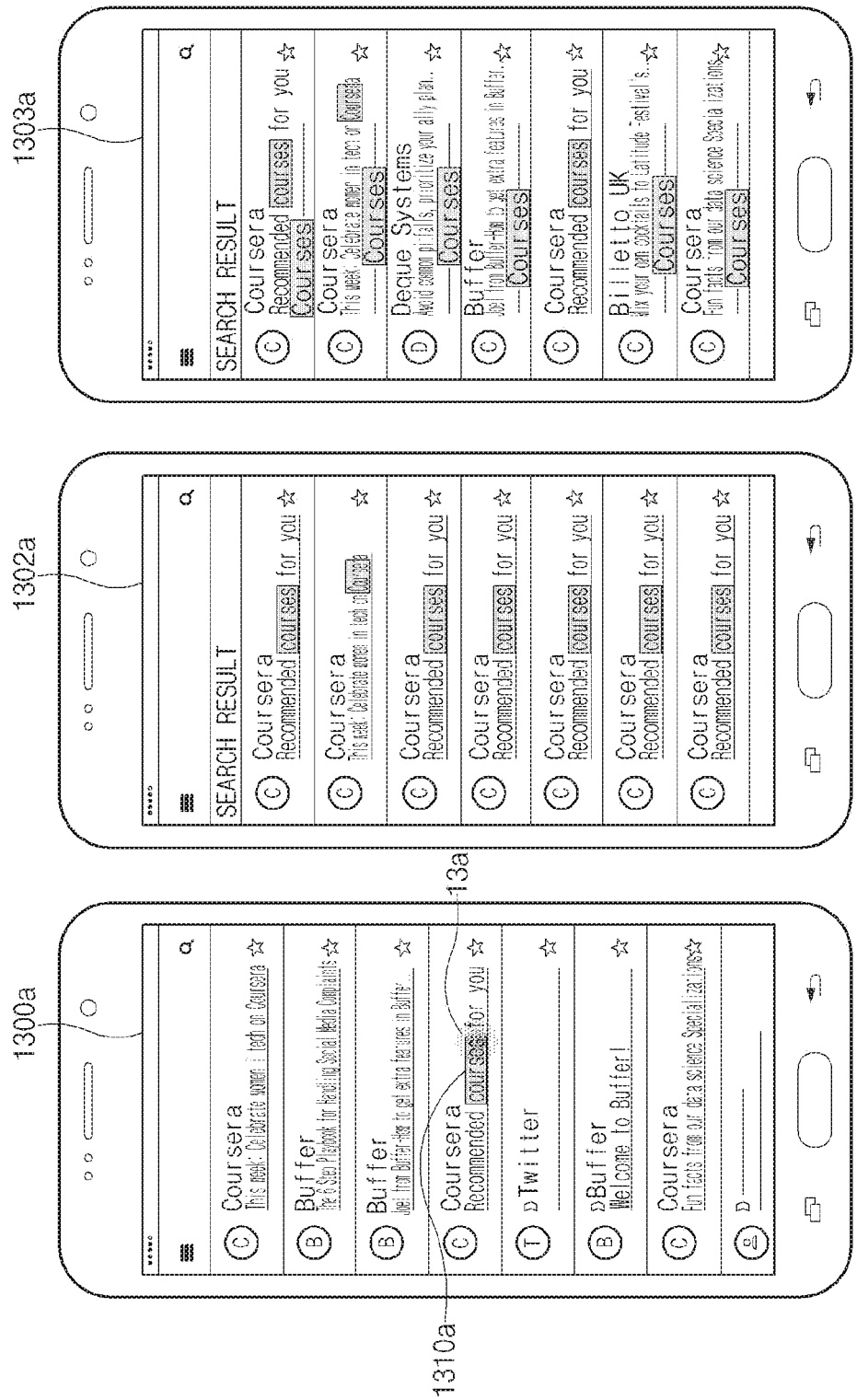
FIGS. 13A and 13B illustrate diagrams for describing a method for providing information based on a touch on a text, according to an embodiment.
Figure 13B:
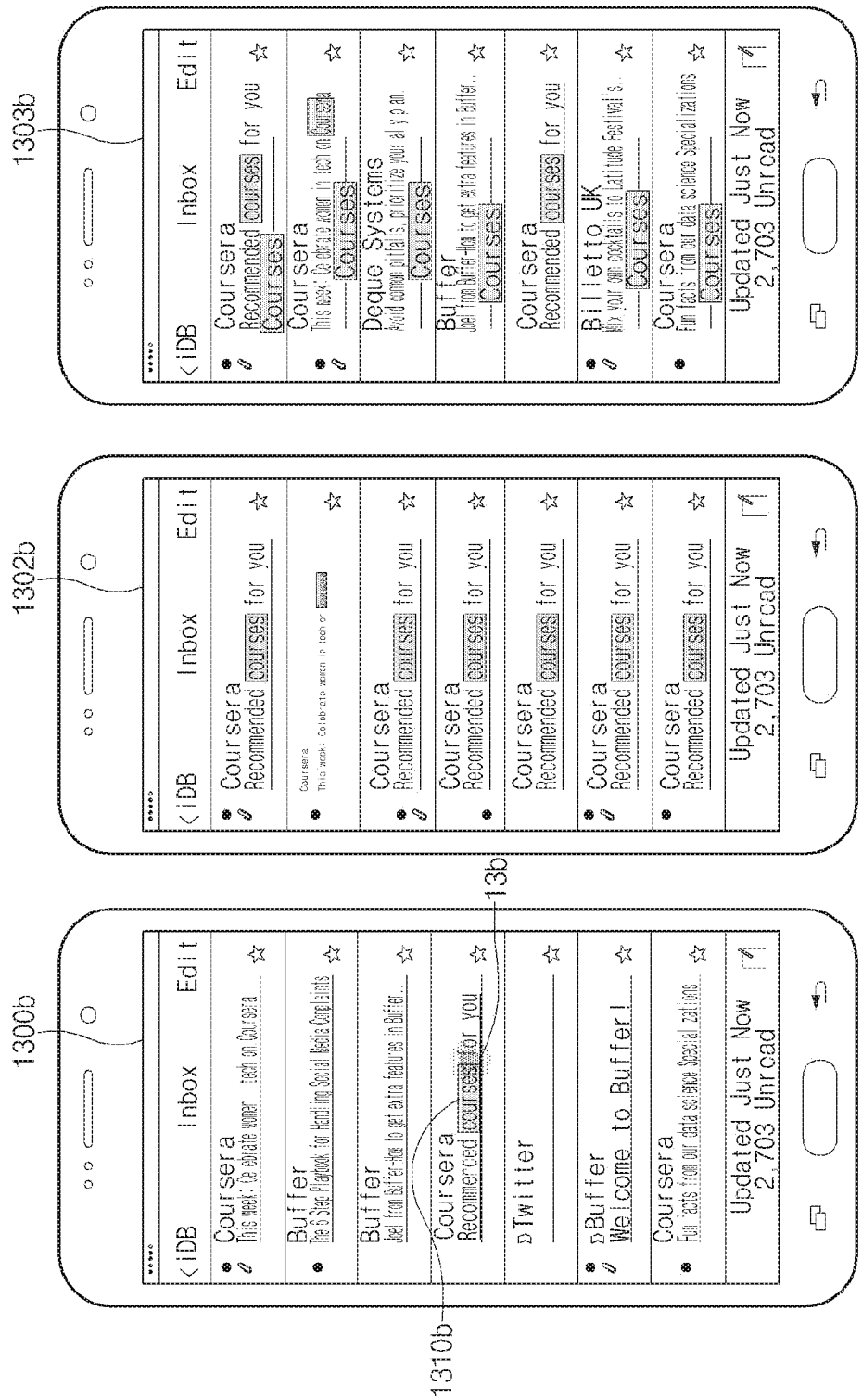

FIGS. 13A and 13B illustrate diagrams for describing a method for providing information based on a touch on a text, according to an embodiment.

Referring to FIG. 13A, according to an embodiment, an electronic device that performs a method for providing information based on a touch on a text is illustrated. According to an embodiment, the electronic device may execute an e-mail application. Screen 1300a including a mail list may be displayed in a display of the electronic device by the execution. For example, the user may perform a touch 13a on a specific text 1310a (e.g., courses) of a plurality of items displayed in screen 1300a. In this case, the specific text 1310a may be highlighted.

The electronic device may select the specific text 1310a (e.g., courses) based on a position of the touch 13a sensed in a touch sensor and may detect a pressure level of the touch 13a by using a pressure sensor.

For example, when a pressure level of the touch 13a is not greater than (or smaller than) the first pressure level, the electronic device may output details of a mail corresponding to the position, at which the touch 13a is made, by using a new screen (not illustrated).

For another example, when the pressure level of the touch 13a is greater than (or not smaller than) the first pressure level and is not greater than (or smaller than) the second pressure level, as illustrated in screen 1302a, the electronic device may display a list of mails each including the specific text 1310a (e.g., courses) in a mail title.

For another example, when the pressure level of the touch 13a is greater than (or not smaller than) the second pressure level, the electronic device may display mails each including the specific text 1310a (e.g., courses) in a mail title and/or a mail body in the form of a list (refer to screen 1303a).

Meanwhile, referring to FIG. 13B, according to an embodiment, an electronic device that performs a method for providing information based on a touch on a text is illustrated. According to an embodiment, the electronic device may execute an e-mail application. Screen 1300b including a mail list may be displayed in a display of the electronic device by the execution. For example, the user may perform a touch 13b on a specific text 1310b (e.g., courses) of a plurality of items displayed in screen 1300b. In this case, the specific text 1310b may be highlighted.

The electronic device may select the specific text 1310b (e.g., courses) based on the position of the touch 13b sensed in a touch sensor and may detect a pressure level of the touch 13b by using a pressure sensor.

For example, when the pressure level of the touch 13b is not greater than (or smaller than) the first pressure level, the electronic device may output details of a mail corresponding to the position, at which the touch 13b is made, by using a new screen (not illustrated).

For another example, when the pressure level of the touch 13b is greater than (or not smaller than) the first pressure level and is not greater than (or smaller than) the second pressure level, as illustrated in screen 1302b, the electronic device may display mails each including the specific text 1310b (e.g., courses) in a mail title in the form of a list.

For another example, when the pressure level of the touch 13b is greater than (or not smaller than) the second pressure level, the electronic device may display mails each including the specific text 1310b (e.g., courses) in a mail title and/or a mail body in the form of a list (refer to screen 1303b).

Figure 14:
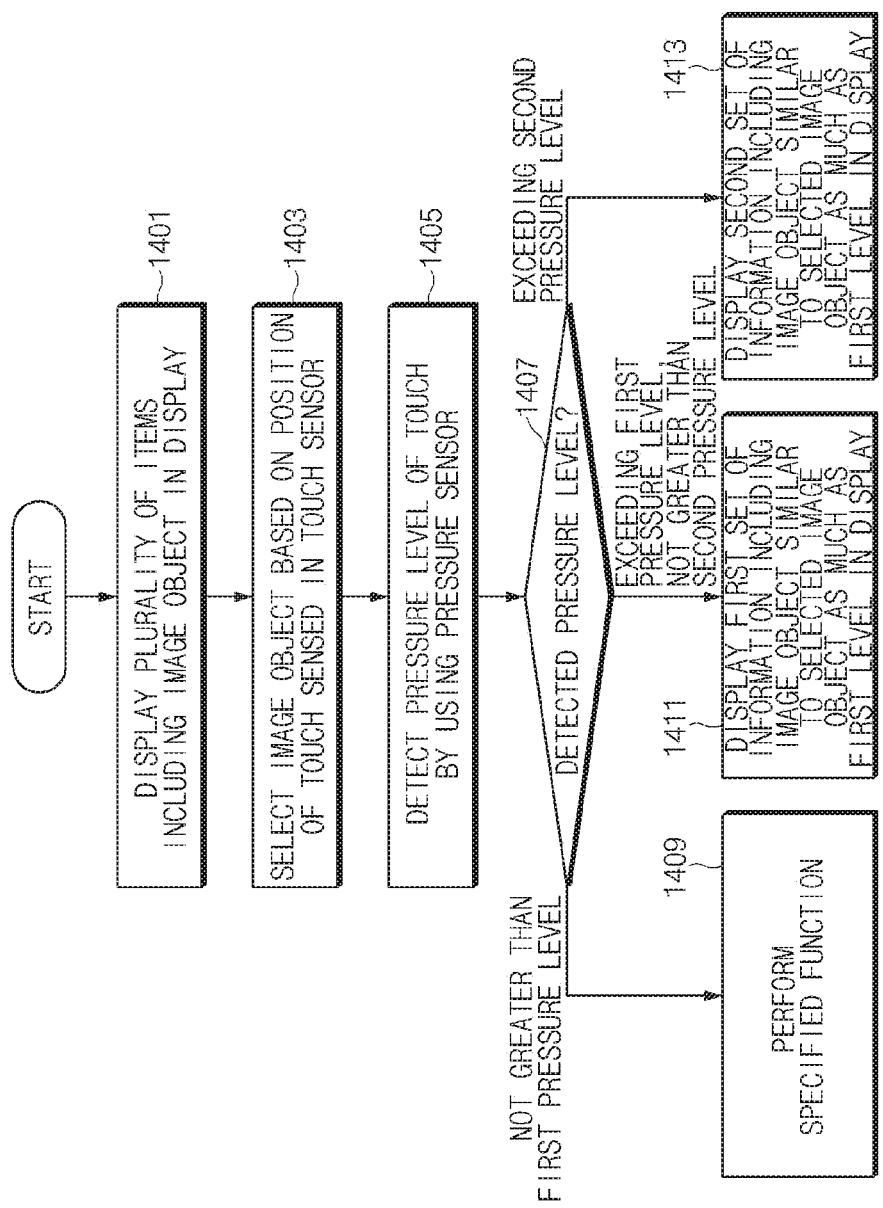
FIG. 14 illustrates a method for providing information based on a touch on an image object, according to an embodiment.

FIG. 14 illustrates a method for providing information based on a touch on an image object, according to an embodiment.

Referring to FIG. 14, a method for providing information based on a touch on an image may include operation 1401 to operation 1413. Operation 1401 to operation 1413 may be performed by, for example, the electronic device 801 illustrated in FIG. 8. Operation 1401 to operation 1413 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 1401 to operation 1413 will be described by using the reference numerals of FIG. 8.

In operation 1401, the processor 860 of the electronic device 801 may display a plurality of items in the display panel 810. For example, the plurality of items may include an image object. For example, at least one image object may be included in an image (or any one image frame of a video) displayed in the display panel 810 by the execution of a specified application (e.g., an image viewer application, a multimedia play application, a browser application, or an e-book application).

In operation 1403, the processor 860 may select or specify the image object based on a position of a touch sensed in the touch sensor 820. In this case, an outline of the image object may be highlighted.

In operation 1405, the processor 860 may detect a pressure level of the touch by using the pressure sensor 830.

In operation 1407, the processor 860 may determine the pressure level detected in operation 1405. For example, when the detected pressure of the touch is not greater than (or smaller than) the first pressure level (e.g., P1 of FIG. 7), the processor 860 may proceed to operation 1409. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 1411. When the detected pressure of the touch is greater than (or not smaller than) the second pressure level (e.g., P2 of FIG. 7), the processor 860 may proceed to operation 1413.

In operation 1409, because the detected pressure of the touch is not greater than (or smaller than) the first pressure level, the processor 860 may perform a function that is specified in advance. According to an embodiment, the processor 860 may display a page linked to the selected image object or may hold the selected image object. For example, the hold may provide a start point of a touch scrolling operation capable of being followed by a touch of the first pressure level or smaller. Also, for example, in the case where the image object is included in an execution screen of a multimedia play application, the processor 860 may perform a playback/pause of a video being played, in response to the touch of the first pressure level or smaller.

In operation 1411, because the detected pressure of the touch is greater than (or equal to or greater than) the first pressure level and is not greater than (or smaller than) the second pressure level, the processor 860 may display a first set of information including the selected image object in the display panel 810. For example, in the case where the detected touch is a "weak force touch", the processor 860 may display the first set of information in the display panel 810.

According to an embodiment, the first set of information may include an image object that is similar to the selected image object as much as a first level. According to an embodiment, the first set of information may include search results (search images) in which the selected image object is included with similarity of a (relatively low) first level. For example, the search results (search images) included in the first set of information may be obtained from a memory included in the electronic device or from a server or an Internet communicating with the electronic device.

In operation 1413, because the detected pressure of the touch is greater than the second pressure level, the processor 860 may display a second set of information including the selected image object in the display panel 810. For example, in the case where the detected touch is a "strong force touch", the processor 860 may display the second set of information in the display panel 810.

According to an embodiment, the second set of information may include an image object that is similar to the selected image object as much as a second level. In this case, the similarity of the second level may be set to be higher than the similarity of the first level. According to an embodiment, the second set of information may include search results (search images) in which the selected image object is included with similarity of a (relatively high) second level. For example, the search results (search images) included in the second set of information may be obtained from a memory included in the electronic device or from a server or an Internet communicating with the electronic device.

Figure 15A:
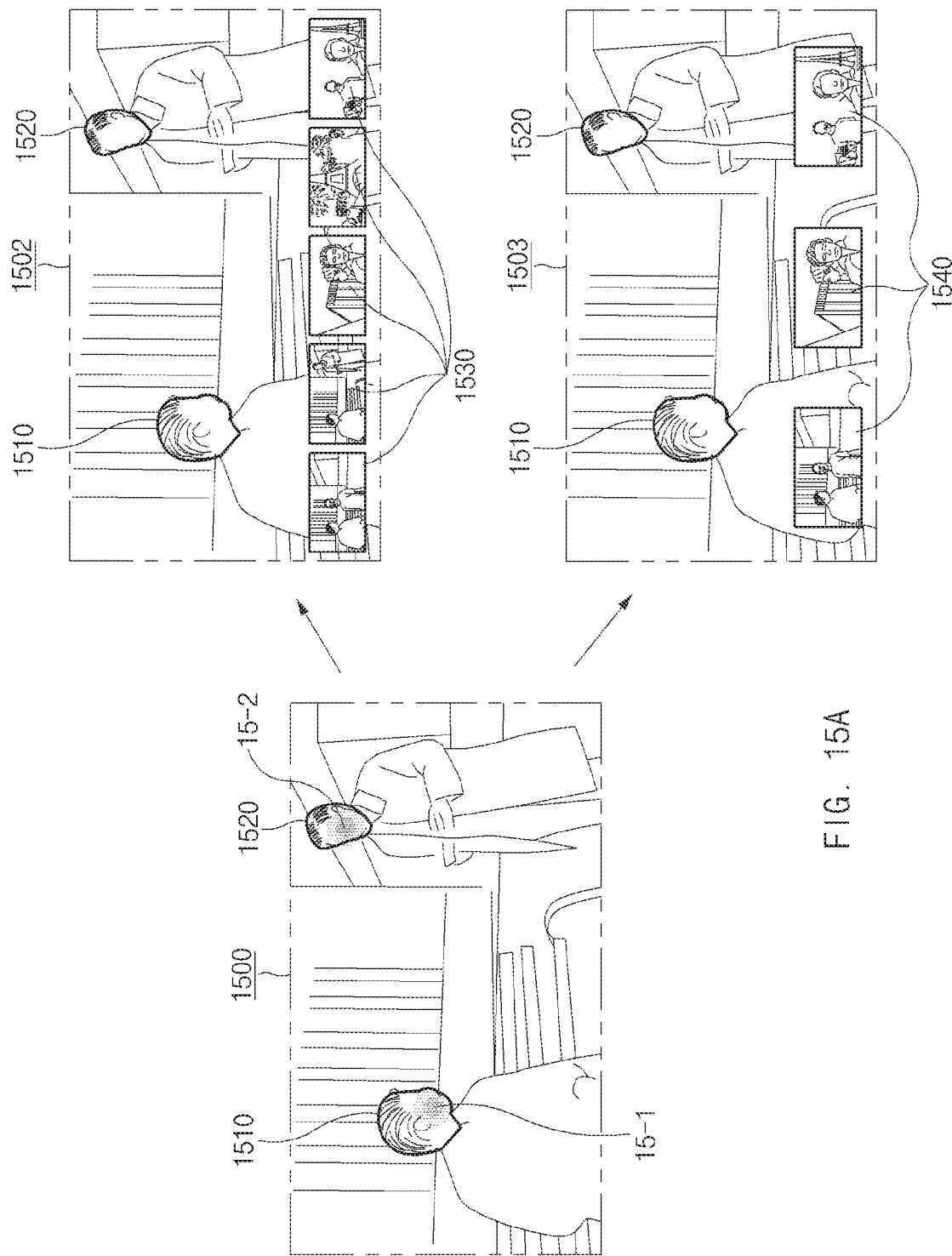
FIGS. 15A and 15B illustrate diagrams for describing a method for providing information based on a touch on an image object, according to an embodiment.

FIG. 15A illustrates a diagram for describing a method for providing information based on a touch on an image object, according to an embodiment.

Referring to FIG. 15A, according to an embodiment, an electronic device that performs a method for providing information based on a touch on an image object is illustrated. According to an embodiment, the electronic device may execute an image viewer application (or a multimedia play application). Any one image 1500 may be displayed in a display of the electronic device by the execution. The image 1500 may correspond to an image viewed by the image viewer application or any one image frame of video content being played by the multimedia play application.

For example, the user may simultaneously perform touches 15-1 and 15-2 on a plurality of image objects 1510 and 1520 (e.g., image objects set to face areas of characters) included in screen 1500.

The electronic device may select the image objects 1510 and 1520 based on positions of the touches 15-1 and 15-2 sensed in a touch sensor and may detect pressure levels of the touches 15-1 and 15-2 by using a pressure sensor.

For example, in the case where the image objects 1510 and 1520 are included in an image viewed by the image viewer application, when the pressure levels of the touches 15-1 and 15-2 are not greater than (or smaller than) the first pressure level, the electronic device may display a page linked to the image object 1510 and/or the image object 1520. Alternatively, when the pressure levels of the touches 15-1 and 15-2 are not greater than (or smaller than) the first pressure level, the electronic device may hold the image objects 1510 and 1520. For example, in the case where the image objects 1510 and 1520 are included in any one image frame of video content being played, the electronic device may perform a playback/pause of a video being played in response to a touch of the first pressure level or smaller.

For another example, when the pressure levels of the touches 15-1 and 15-2 are greater than (or not smaller than) the first pressure level and is not greater than (or smaller than) the second pressure level, as illustrated in screen 1502, the electronic device may display five search images 1530, in which the image objects 1510 and 1520 are included with similarity of a (relatively low) first level, on the lower side of screen 1502 in the form of a thumbnail.

For another example, when the pressure levels of the touches 15-1 and 15-2 are greater than (or not smaller than) the second pressure level, as illustrated in screen 1503, the electronic device may display three search images 1540, in which the image objects 1510 and 1520 are included with similarity of a (relatively high) second level, on the lower side of screen 1503 in the form of a thumbnail.

According to various embodiments, the five search images 1530 and/or the three search images 1540 may be obtained from a memory included in the electronic device. Alternatively, the five search images 1530 and/or the three search images 1540 may be obtained from a server or an Internet communicating with the electronic device. Also, for example, in the case where the image objects 1510 and 1520 are included in any one image frame of video content being played, the five search images 1530 and/or the three search images 1540 may be obtained from any other frames of the video content being played.

Figure 15B:
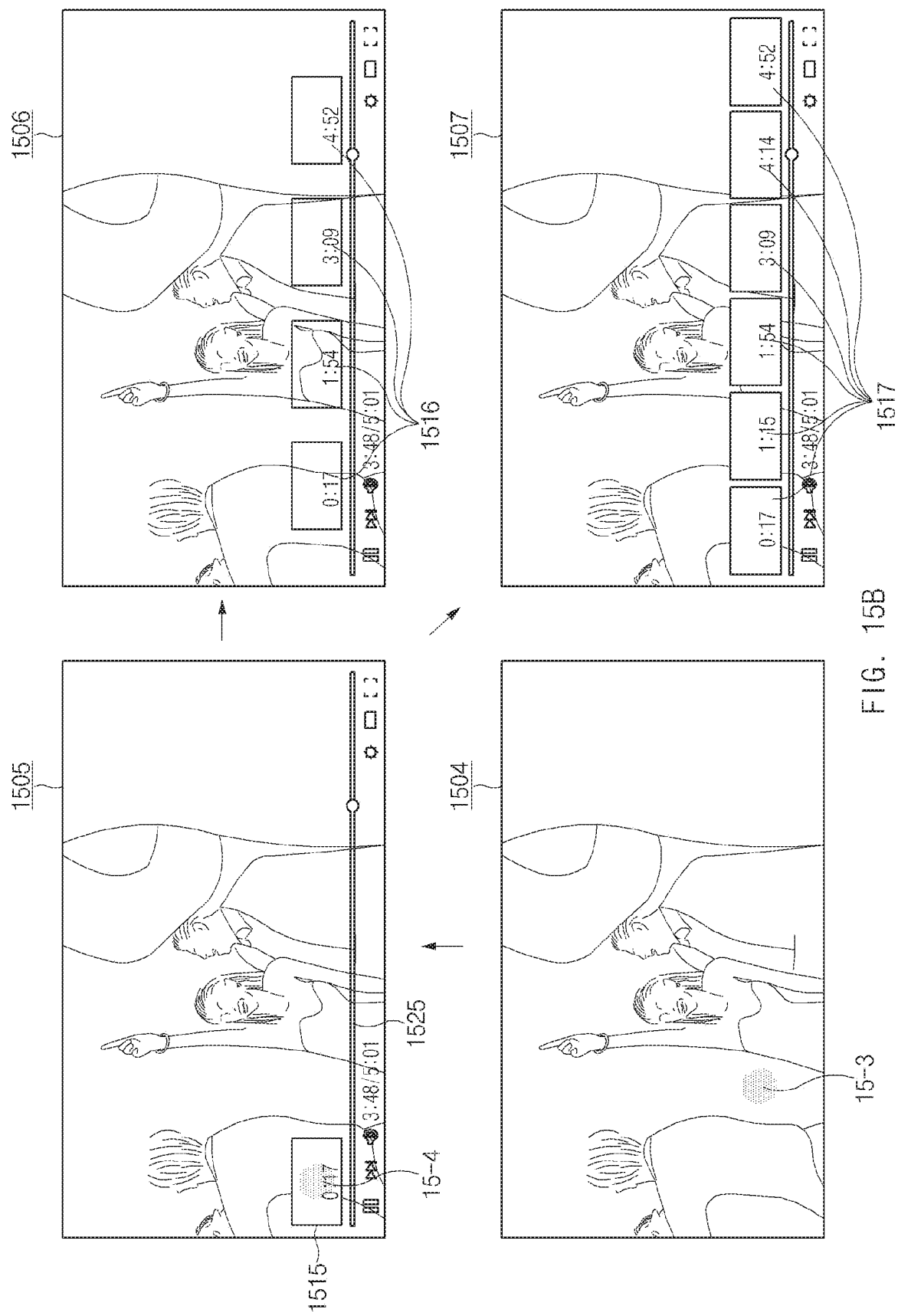

FIG. 15B illustrates a diagram for describing a method for providing information based on a touch on an image object (e.g., a thumbnail), according to an embodiment.

Referring to FIG. 15B, according to an embodiment, an electronic device that performs a method for providing information based on a touch on an image object is illustrated. According to an embodiment, the electronic device may execute a multimedia play application. Screen 1504 may be displayed in a display of the electronic device by the execution. Screen 1504 may include any one image frame of video content being played by the multimedia play application.

For example, the user may perform a touch 15-3 (e.g., a tap, a force touch, or the like) on the lower side of an image frame included in screen 1504. The electronic device may display screen 1505 in response to the touch 15-3 sensed in a touch sensor. A playback control bar 1525 of the multimedia play application and a thumbnail 1515 corresponding to any one image frame of the video content being played may be displayed on the lower side of screen 1505.

According to an embodiment, the user may perform a touch 15-4 on the thumbnail 1515. The electronic device may select the thumbnail 1515 based on a position of the touch 15-4 sensed in the touch sensor and may detect a pressure level of the touch 15-4 by using a pressure sensor.

For example, when the pressure of the touch 15-4 is greater than (or not smaller than) the first pressure level and is not greater than (or smaller than) the second pressure level, the electronic device may display screen 1506. Four thumbnails 1516 in which the video content being played is summarized with a first level may be displayed on screen 1506.

For another example, when the pressure of the touch 15-4 is greater than (or not smaller than) the second pressure level, the electronic device may display screen 1507. Six thumbnails 1517 in which the video content being played is summarized with a second level may be displayed on screen 1507.

In FIG. 15B, the number of thumbnails (or a summary level of the video content) may be determined according to the touch pressure against the thumbnail 1515; however, according to various embodiments, based on the pressure of the touch 15-3 on a lower area of screen 1504, it may be possible to display the thumbnails and determine the number of the displayed thumbnails and/or a summary level of the video content.

Figure 16:
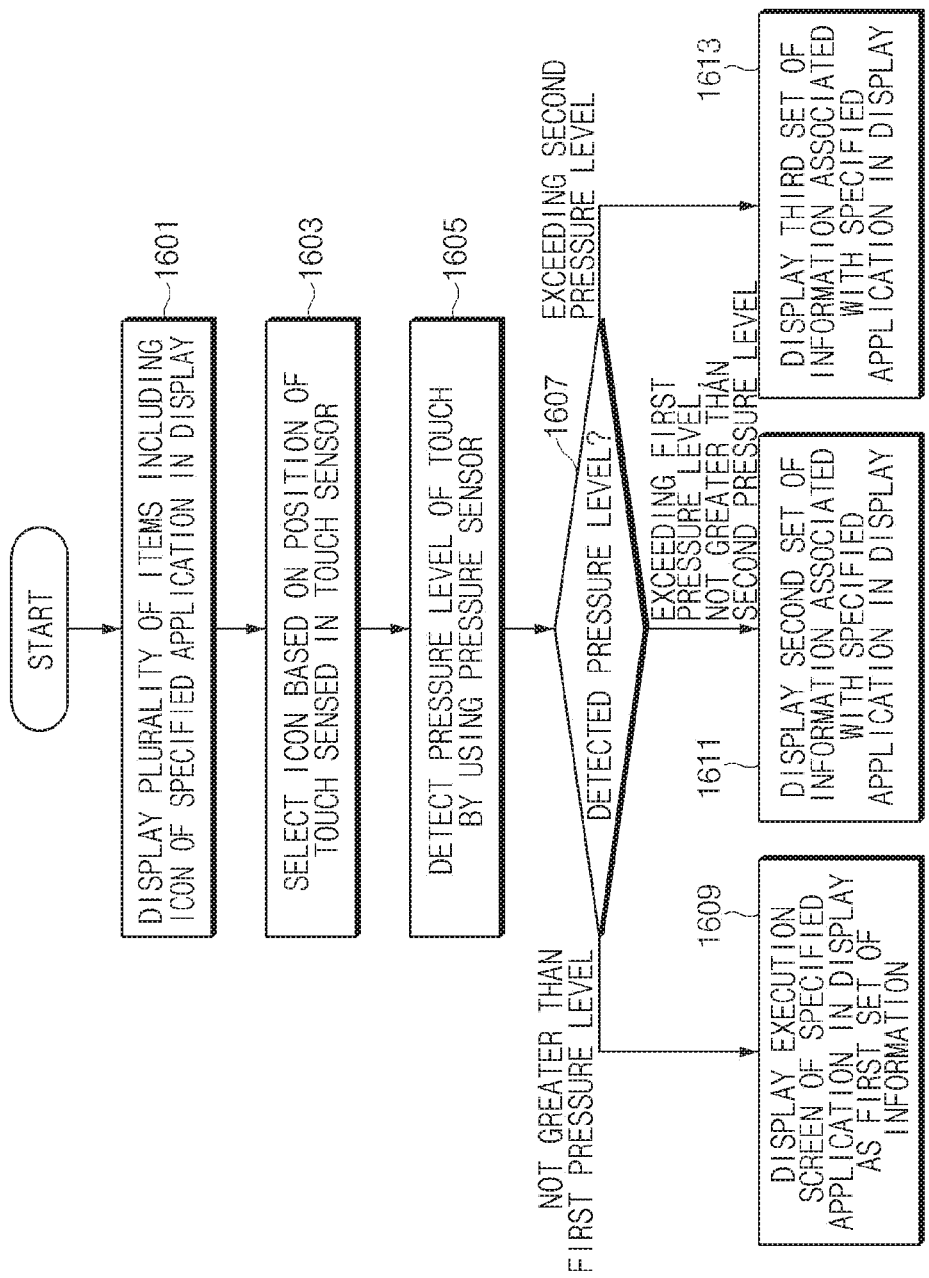
FIG. 16 illustrates a method for providing information based on a touch on an icon, according to an embodiment.

FIG. 16 illustrates a method for providing information based on a touch on an icon, according to an embodiment.

Referring to FIG. 16, according to an embodiment, a method for providing information based on a touch on an icon may include operation 1601 to operation 1613. Operation 1601 to operation 1613 may be performed by, for example, the electronic device 801 illustrated in FIG. 8. Operation 1601 to operation 1613 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 1601 to operation 1613 will be described by using the reference numerals of FIG. 8.

In operation 1601, the processor 860 of the electronic device 801 may display a plurality of items in the display panel 810. For example, the plurality of items may include an icon of at least one application. For example, the at least one icon may be displayed on a home screen by the execution of a home application.

In operation 1603, the processor 860 may select or specify the icon of the at least one application based on a position of a touch sensed in the touch sensor 820.

In operation 1605, the processor 860 may detect a pressure level of the touch by using the pressure sensor 830.

In operation 1607, the processor 860 may determine the pressure level detected in operation 1605. For example, when the detected pressure of the touch is not greater than (or smaller than) the first pressure level (e.g., P1 of FIG. 7), the processor 860 may proceed to operation 1609. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 1611. When the detected pressure of the touch is greater than (or not smaller than) the second pressure level (e.g., P2 of FIG. 7), the processor 860 may proceed to operation 1613.

In operation 1609, because the detected pressure of the touch is not greater than (or smaller than) the first pressure level, the processor 860 may display an execution screen of an application, which the selected icon indicates, in the display panel 810 as a first set of information. The execution screen may be displayed in the display panel 810 based on an activity included in the application.

In operation 1611, because the detected pressure of the touch is greater than (or equal to or greater than) the first pressure level and is not greater than (or smaller than) the second pressure level, the processor 860 may display a second set of information associated with an application, which the selected icon indicates, in the display panel 810. For example, in the case where the detected touch is a "weak force touch", the processor 860 may display the second set of information in the display panel 810.

According to an embodiment, the second set of information may include notification information of an application. In this case, the processor 860 may display the second set of information on a layer newly generated.

In operation 1613, because the pressure of the touch is greater than the second pressure level, the processor 860 may display a third set of information associated with the specified application, which the selected icon indicates, in the display panel 810. For example, in the case where the detected touch is a "strong force touch", the processor 860 may display the third set of information in the display panel 810.

According to an embodiment, the third set of information may include notification information of an application. In this case, the amount of the third set of information may be greater than the amount of the second set of information. Also, like the second set of information, the processor 860 may display the third set of information on a layer newly generated.

Figure 17:
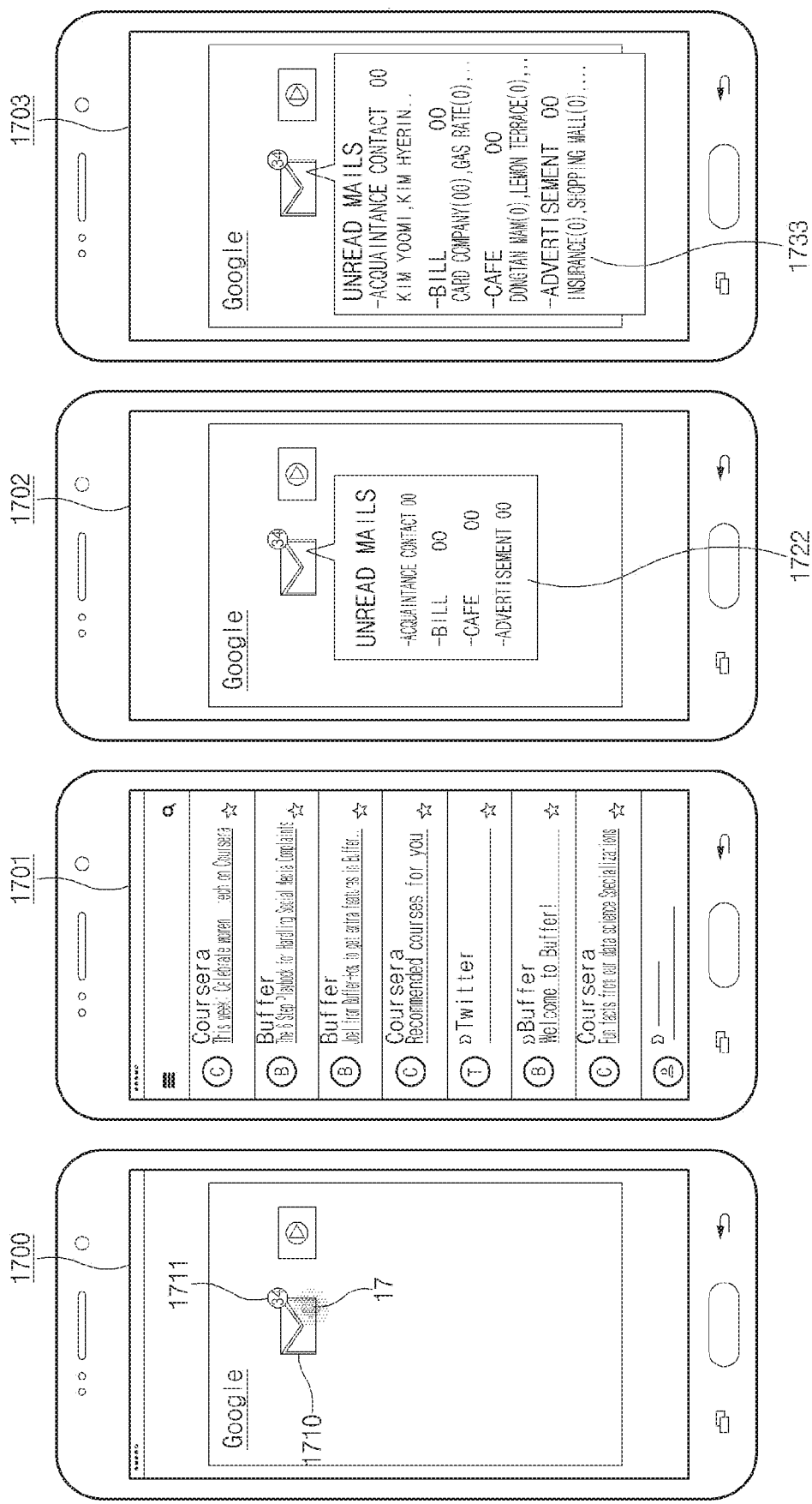
FIG. 17 is a diagram for describing a method for providing information based on a touch on an icon, according to an embodiment.

FIG. 17 is a diagram for describing a method for providing information based on a touch on an icon, according to an embodiment.

Referring to FIG. 17, according to an embodiment, an electronic device that performs a method for providing information based on a touch on an icon is illustrated. According to an embodiment, the electronic device may output a home screen 1700, and an icon of at least one application may be displayed in the home screen 1700. For example, the at least one icon may include an icon 1710 of an e-mail application. A badge 1711 indicating the number of unread mails may be attached to the icon 1710. For example, the user may perform a touch 17 on the icon 1710 included in the home screen 1700.

The electronic device may select the icon 1710 based on a position of the touch 17 sensed in a touch sensor and may detect a pressure level of the touch 17 by using a pressure sensor.

For example, when the pressure level of the touch 17 is not greater than (or smaller than) the first pressure level, the electronic device may output an execution screen 1701 of the e-mail application, which the selected icon 1710 indicates, as a first set of information.

For another example, when the pressure level of the touch 17 is greater than (or not smaller than) the first pressure level and is not greater than (or smaller than) the second pressure level, as illustrated in screen 1702, the electronic device may display a second set of information 1722 associated with the e-mail application, which the icon 1710 indicates, in screen 1702 by using a new layer. For example, the second set of information 1722 may include the number of unread mails for each category.

For another example, when the pressure level of the touch 17 is greater than (or not smaller than) the second pressure level, as illustrated in screen 1703, the electronic device may display a third set of information 1733 associated with the e-mail application, which the icon 1710 indicates, in screen 1703 by using a new layer. For example, the third set of information 1733 may include the number of unread mails and a summary of the unread mails, for each category. That is, the amount of the third set of information 1733 may be greater than the amount of the second set of information 1722.

Figure 18:
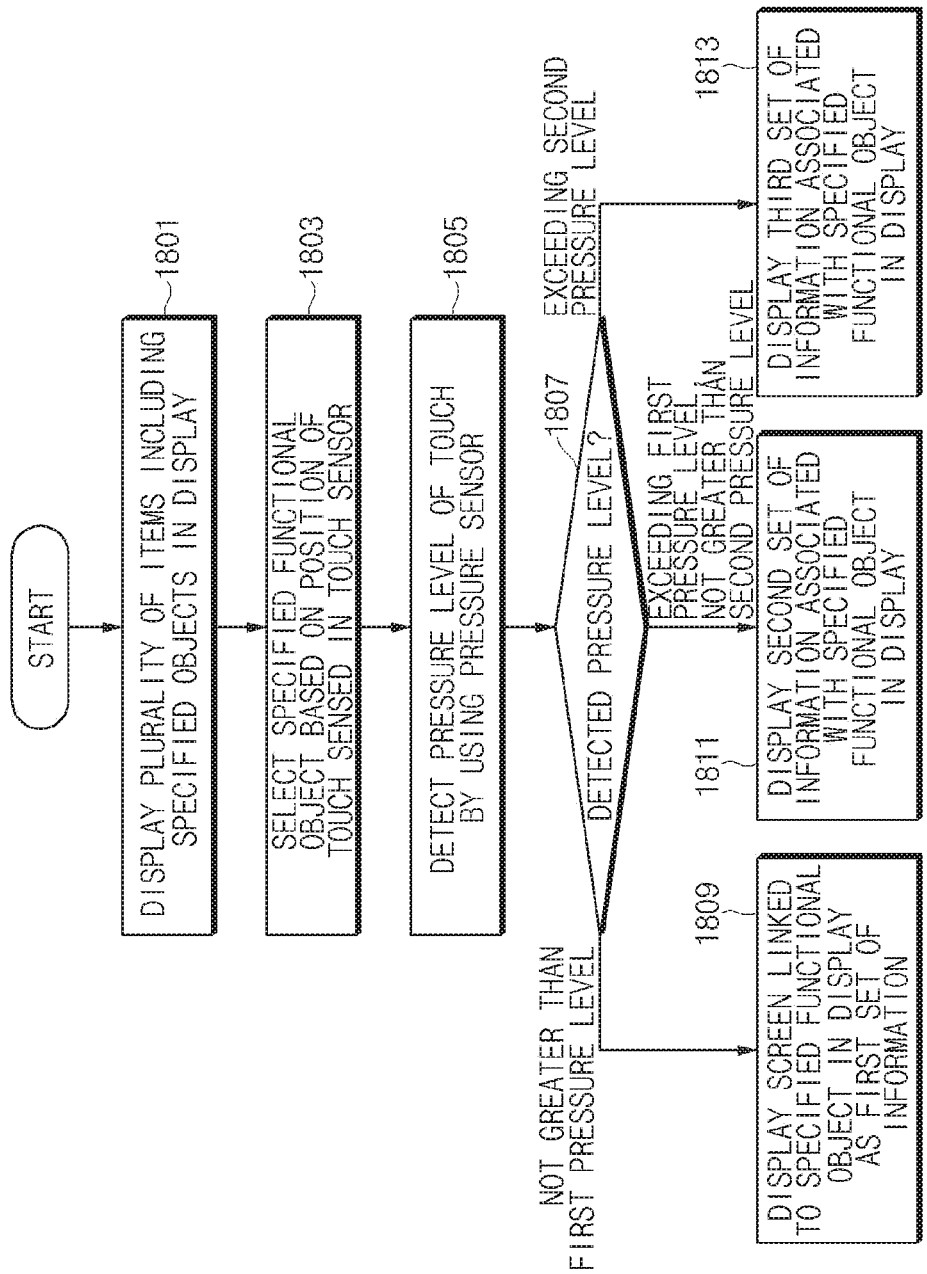
FIG. 18 illustrates a method for providing information based on a touch on a functional object, according to an embodiment.

FIG. 18 illustrates a method for providing information based on a touch on a functional object, according to an embodiment.

Referring to FIG. 18, according to an embodiment, a method for providing information based on a touch on a functional object may include operation 1801 to operation 1813. Operation 1801 to operation 1813 may be executed by, for example, the electronic device 801 illustrated in FIG. 8. Operation 1801 to operation 1813 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 1801 to operation 1813 will be described by using the reference numerals of FIG. 8.

In operation 1801, the processor 860 of the electronic device 801 may display a plurality of items in the display panel 810. According to an embodiment, the plurality of items may include at least one functional object. For example, at least one function may be assigned to the functional object, and the functional object may be implemented in the form of various buttons, soft-keys, or the like arranged on execution screens of various applications.

In operation 1803, the processor 860 may select or specify the at least one functional object based on a position of a touch sensed in the touch sensor 820.

In operation 1805, the processor 860 may detect a pressure level of the touch by using the pressure sensor 830.

In operation 1807, the processor 860 may determine the pressure level detected in operation 1805. For example, when the detected pressure of the touch is not greater than (or smaller than) the first pressure level (e.g., P1 of FIG. 7), the processor 860 may proceed to operation 1809. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 1811. When the detected pressure of the touch is greater than (or not smaller than) the second pressure level (e.g., P2 of FIG. 7), the processor 860 may proceed to operation 1813.

In operation 1809, because the detected pressure of the touch is not greater than (or smaller than) the first pressure level, the processor 860 may display a screen linked to the selected functional object in the display panel 810 as a first set of information.

In operation 1811, because the detected pressure of the touch is greater than (or equal to or greater than) the first pressure level and is not greater than (or smaller than) the second pressure level, the processor 860 may display a second set of information associated with the selected functional object in the display panel 810. For example, in the case where the detected touch is a "weak force touch", the processor 860 may display the second set of information in the display panel 810.

According to an embodiment, the second set of information may include information extracted from content included in the screen linked to the selected functional object. For example, the second set of information may include information in which the content included in the linked screen is summarized with a relatively high level based on a specified algorithm. In this case, the processor 860 may display the second set of information on a layer newly generated.

In operation 1813, because the detected pressure of the touch is greater than the second pressure level, the processor 860 may display a third set of information associated with the selected functional object in the display panel 810. For example, in the case where the detected touch is a "strong force touch", the processor 860 may display the third set of information in the display panel 810.

According to an embodiment, the third set of information may include information extracted from the content included in the screen linked to the selected functional object. For example, the third set of information may be extracted based on information included in the screen linked to the functional object, in a way different from the way (algorithm) to extract the second set of information. That is, the third set of information may include information in which the content included in the linked screen is summarized with a relatively low level based on any other specified algorithm. In this case, the amount of the third set of information may be greater than the amount of the second set of information. Also, like the second set of information, the processor 860 may display the third set of information on a layer newly generated.

Figure 19:
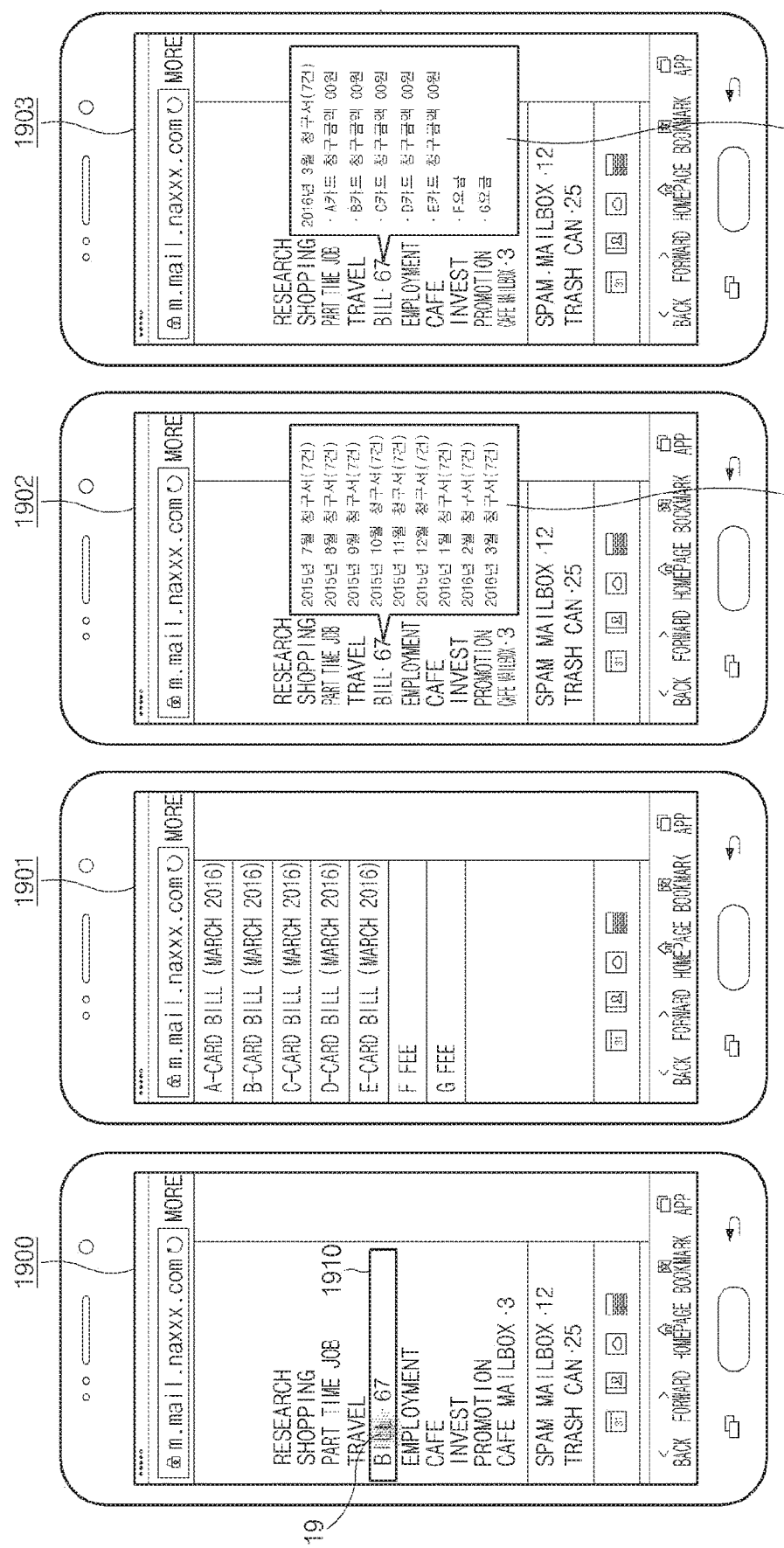
FIG. 19 is a diagram for describing a method for providing information based on a touch on a functional object, according to an embodiment.

FIG. 19 is a diagram for describing a method for providing information based on a touch on a functional object, according to an embodiment.

Referring to FIG. 19, according to an embodiment, an electronic device that performs a method for providing information based on a touch on a functional object is illustrated. According to an embodiment, the electronic device may execute a browser application to visit a web site of a web mail provider. Screen 1900 including a plurality of items may be displayed in a display of the electronic device by the execution. For example, the user may perform a touch 19 on a functional object 1910 for reading a bill among the plurality of items included in screen 1900.

The electronic device may select the functional object 1910 based on a position of the touch 19 sensed in a touch sensor and may detect a pressure level of the touch 19 by using a pressure sensor.

For example, when the pressure level of the touch 19 is not greater than (or smaller than) the first pressure level, the electronic device may output screen 1901 linked to the functional object 1910 as a first set of information. For example, in screen 1901, received bill mails may be aligned in the order of time.

For another example, when the pressure level of the touch 19 is greater than (or not smaller than) the first pressure level and is not greater than (or smaller than) the second pressure level, as illustrated in screen 1902, the electronic device may display a second set of information 1922 associated with the functional object 1910 by using a new layer. The second set of information 1922 may include information in which content included in screen 1901 is summarized based on a specified algorithm. For example, the number of received bills for each month in a recent nine-month period may be included in the second set of information 1922.

For another example, when the pressure level of the touch 19 is greater than (or not smaller than) the second pressure level, as illustrated in screen 1903, the electronic device may display a third set of information 1933 associated with the functional object 1910 in screen 1903 by using a new layer. The third set of information 1933 may include information in which content included in screen 1901 is summarized based on another algorithm. The second set of information 1922 and the third set of information 1933 may be extracted in different manners, based on information included in screen 1901 linked to the functional object 1910. For example, the number of bills received in the present month and a billing summary may be included in the third set of information 1933. According to various embodiments, at least one functional object (e.g., a hyperlink text) may be included in the third set of information 1933. In the case where a touch (e.g., a "tap") of the user is made on the at least one functional object, a screen linked to the functional object on which the touch is made may be output.

Figure 20A:
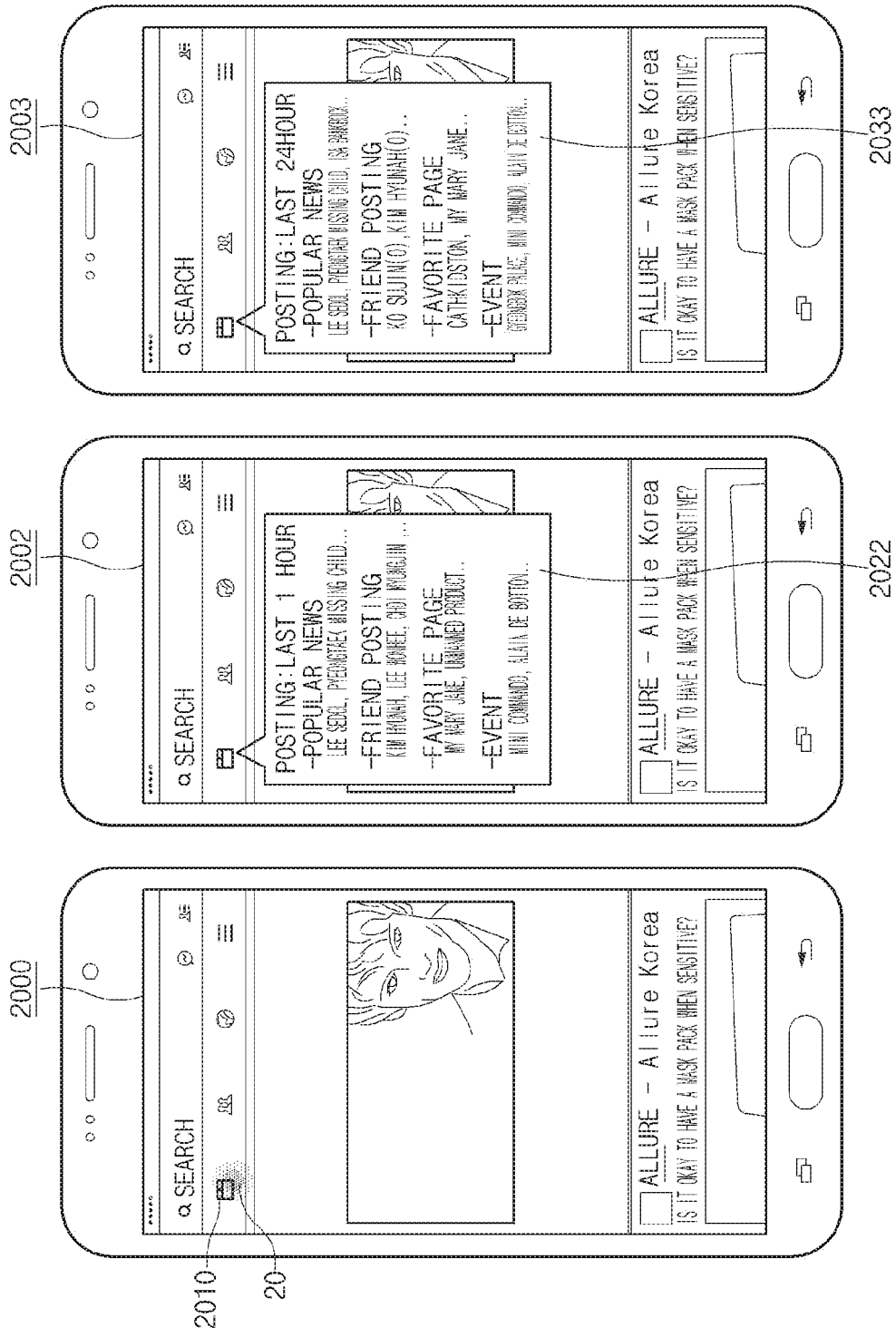
FIGS. 20A to 20C are diagrams for describing a method for providing information based on a touch on a functional object, according to another embodiment.

FIG. 20A is a diagram for describing a method for providing information based on a touch on a functional object, according to another embodiment.

Referring to FIG. 20A, according to an embodiment, an electronic device that performs a method for providing information based on a touch on a functional object is illustrated. According to an embodiment, the electronic device may execute a social network service application (e.g., Facebook™). Screen 2000 including a plurality of items may be displayed in a display of the electronic device by the execution. For example, the user may perform a touch 20 on a functional object 2010 for reading an updated news feed included in screen 2000.

The electronic device may select the functional object 2010 based on a position of the touch 20 sensed in a touch sensor and may detect a pressure level of the touch 20 by using a pressure sensor.

For example, when the pressure level of the touch 20 is not greater than (or smaller than) the first pressure level, the electronic device may output a screen (e.g., a screen in which the latest news feed is posted) linked to the functional object 1910 as a first set of information.

For another example, when the pressure level of the touch 20 is greater than (or not smaller than) the first pressure level and is not greater than (or smaller than) the second pressure level, as illustrated in screen 2002, the electronic device may display a second set of information 2022 associated with the functional object 2010 by using a new layer. For example, a summary of a posting updated in the last 1 hour may be included in the second set of information 2022 for each category.

For another example, when the pressure level of the touch 20 is greater than (or not smaller than) the second pressure level, as illustrated in screen 2003, the electronic device may display a third set of information 2033 associated with the functional object 2010 by using a new layer. For example, a summary of a posting updated in the last 24 hours may be included in the third set of information 2033 for each category.

Figure 20B:
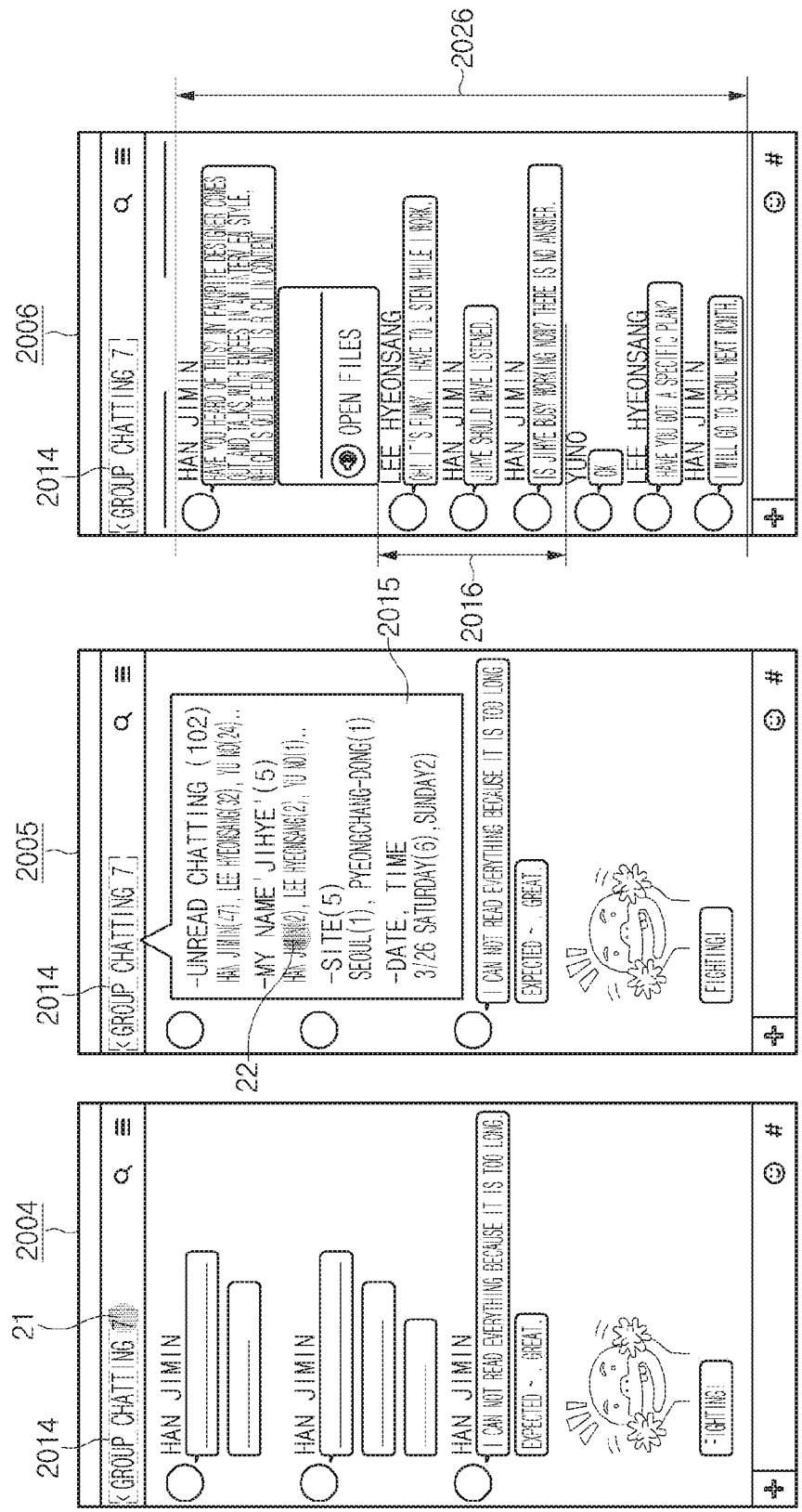

FIG. 20B is a diagram for describing a method for providing information based on a touch on a functional object, according to another embodiment.

Referring to FIG. 20B, according to an embodiment, an electronic device that performs a method for providing information based on a touch on a functional object is illustrated. According to an embodiment, the electronic device may execute an IM application. Screen 2004 in which conversation content between a plurality of users is included may be displayed in a display of the electronic device by the execution. For example, the user may perform a touch 21 (e.g., a force touch) on a functional object 2014 indicating a title of a chat room included in screen 2004.

The electronic device may select the functional object 2014 based on a position of the touch 21 (e.g., a force touch) sensed in a touch sensor. The electronic device may output, for example, screen 2005 in response to the touch 21.

According to screen 2005, the electronic device may display summary information of the chat room, with regard to the functional object 2014 indicating the title of the chat room. For example, the summary information 2015 may include, for example, an unread message, a conversation state of calling a user of the electronic device, a call count, a sentence in which a specific site or time is mentioned, a word mentioned the most for each conversation time, a photo shared in a chat room, information of persons participating in the conversation, a user that speaks the most, a time when a chat room is opened for the first time, a duration time, a conversation count, or the like. According to various embodiments, in the case where a force touch is made on an object indicating any one chat room of a chat room list, the summary information 2015 may also be output.

According to an embodiment, the user may perform a touch 22 on any one text (e.g., "Han Jimin") of various content included in the summary information 2015 of screen 2005. The electronic device may select the text (e.g., "Han Jimin") based on a position of the touch 22 sensed in a touch sensor and may detect a pressure level of the touch 22 by using a pressure sensor.

For example, when the pressure of the touch 1522 is greater than (or not smaller than) the first pressure level and is not greater than (or smaller than) the second pressure level, the electronic device may search for the text (e.g., "Han Jimin"), on which the touch 22 is made, within a first range and may output the found result in a display. For example, the search within the first range may include a first range 2016 illustrated in screen 2006.

For another example, when the pressure of the touch 22 is greater than (or not smaller than) the second pressure level, the electronic device may search for the text (e.g., "Han Jimin"), on which the touch 22 is made, within a second range wider than the first range and may output the found result in the display. For example, the search within the first range may include a second range 2026 illustrated in screen 2006. That is, as the pressure of the touch 22 increases, a search range that is output in the display may become wider.

Figure 20C:
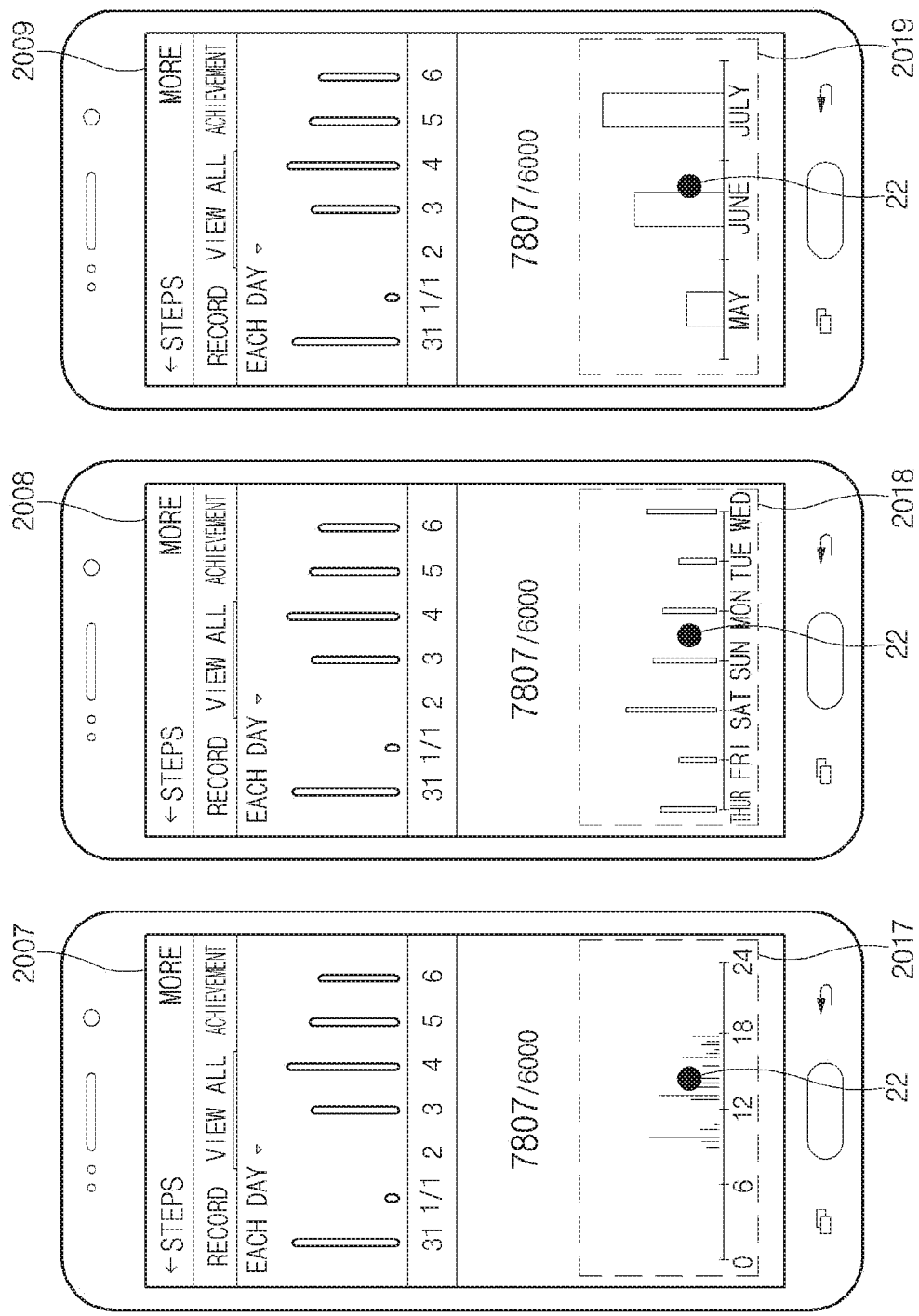

FIG. 20C is a diagram for describing a method for providing information based on a touch on a functional object, according to another embodiment.

Referring to FIG. 20C, according to an embodiment, an electronic device that performs a method for providing information based on a touch on a functional object is illustrated. According to an embodiment, the electronic device may execute a health care application (e.g., S-Health™). Screen 2007 in which a statistical graph associated with steps of a user is included may be displayed in a display of the electronic device by the execution. For example, the user may perform a touch 22 (e.g., a force touch) on a partial area 2017 included in screen 2007. For example, a histogram indicating steps of the day over time may be displayed in the area 2017.

The electronic device may sense the selection of the area 2017 based on a position of the touch 22 (e.g., a force touch) sensed in a touch sensor and may sense a pressure level of the touch 22. According to an embodiment, the electronic device may output screen 2008 or screen 2009 based on the pressure level of the touch 22 thus sensed.

According to an embodiment, when the pressure of the touch 22 is greater than (or not smaller than) the first pressure level and is not greater than (or smaller than) the second pressure level, the electronic device may display screen 2008. A histogram indicating steps of a recent oneweek period may be displayed in a partial area 2018 of screen 2008. That is, a time range indicating steps may be expanded.

According to an embodiment, when the pressure of the touch 22 is greater than (or not smaller than) the second pressure level, the electronic device may display screen 2009. A histogram indicating steps of a recent three-month period may be displayed in a partial area 2019 of screen 2009. That is, a time range indicating steps may be further expanded.

Figure 21A:
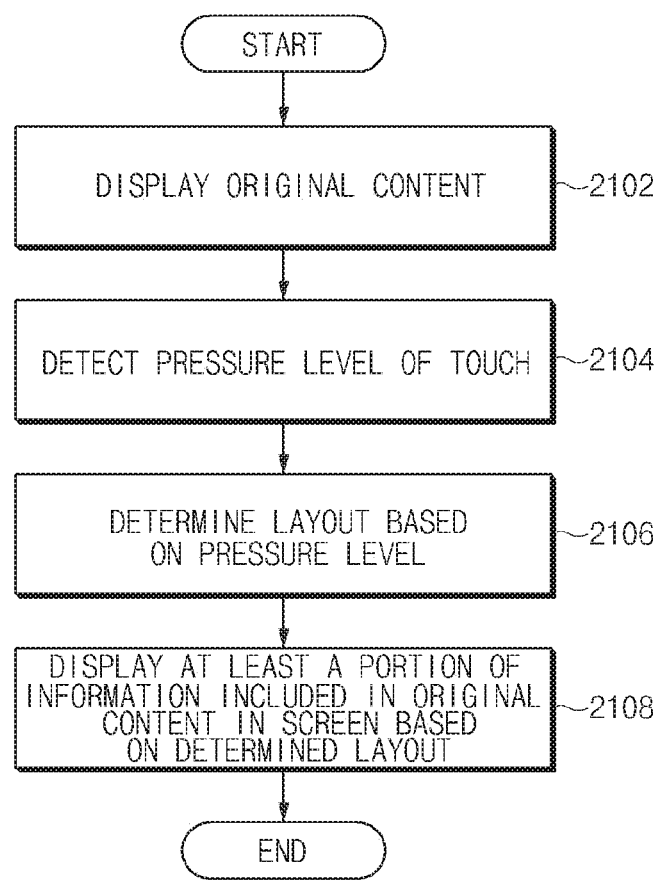
FIGS. 21A and 21B illustrate a touch-based information providing method according to an embodiment.

FIG. 21A illustrates a touch-based information providing method according to an embodiment.

Referring to FIG. 21A, the touch-based information providing method according to an embodiment may include operation 2102 to operation 2108. Operation 2102 to operation 2108 may be executed by, for example, the electronic device 801 illustrated in FIG. 8. Operation 2102 to operation 2108 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 2102 to operation 2108 will be described by using reference marks/numerals of FIG. 8.

In operation 2102, the processor 860 of the electronic device 801 may display original content in the display panel 810. For example, the original content may include a variety of information included in an execution screen of an application (e.g., an e-mail application, an e-book application, a browser application, or the like).

In operation 2104, the processor 860 may select at least one functional object based on a position of a touch sensed in the touch sensor 820 and may detect a pressure level of the touch by using the pressure sensor 830.

In operation 2106, the processor 860 may determine a layout for modifying, excluding, or rearranging the original content based on the pressure level detected in operation 2104.

In operation 2108, the processor 860 may display at least a portion of information included in the original content displayed in operation 2102 in the display panel 810 based on the layout determined in operation 2106.

Figure 21B:
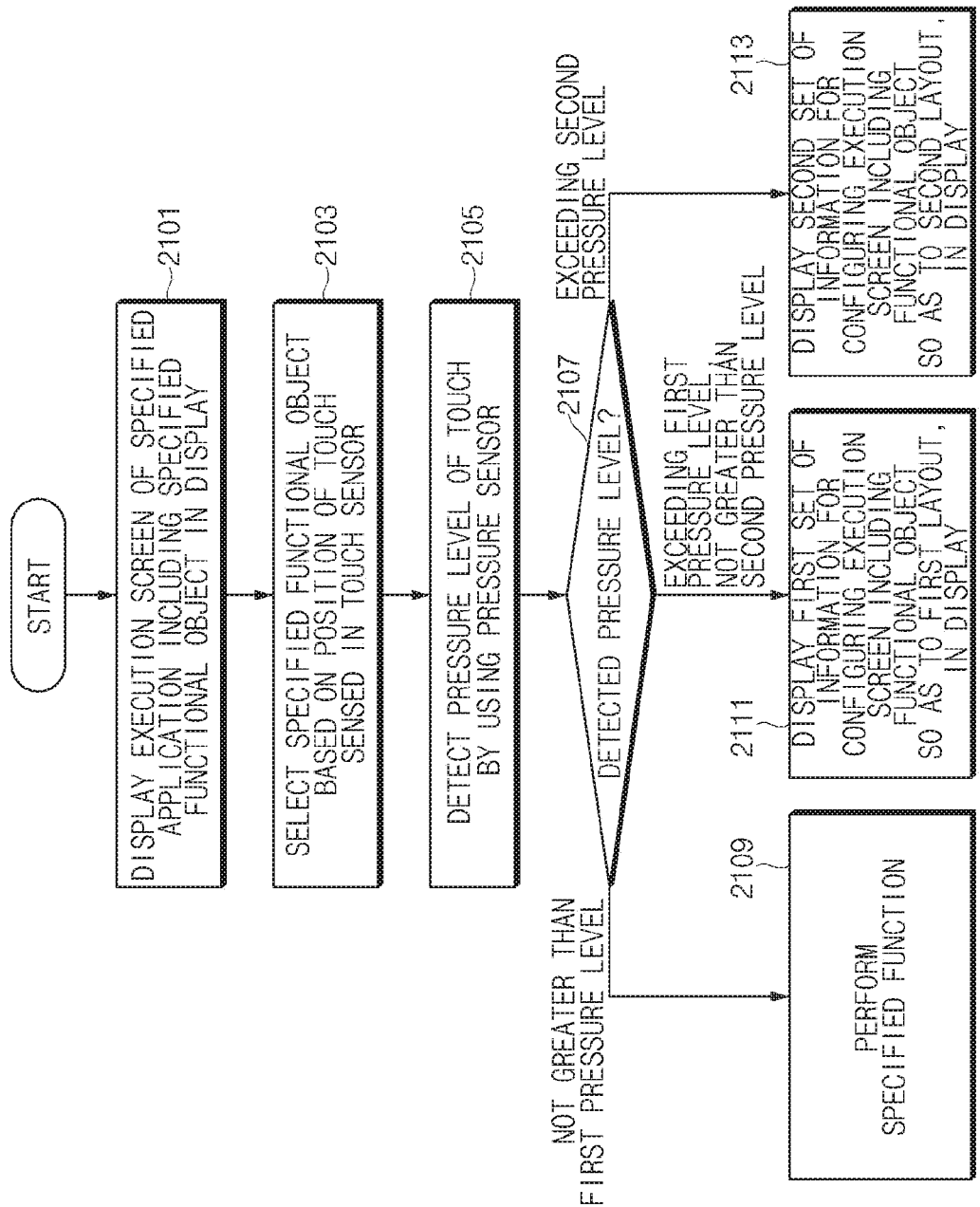
Figure 22:
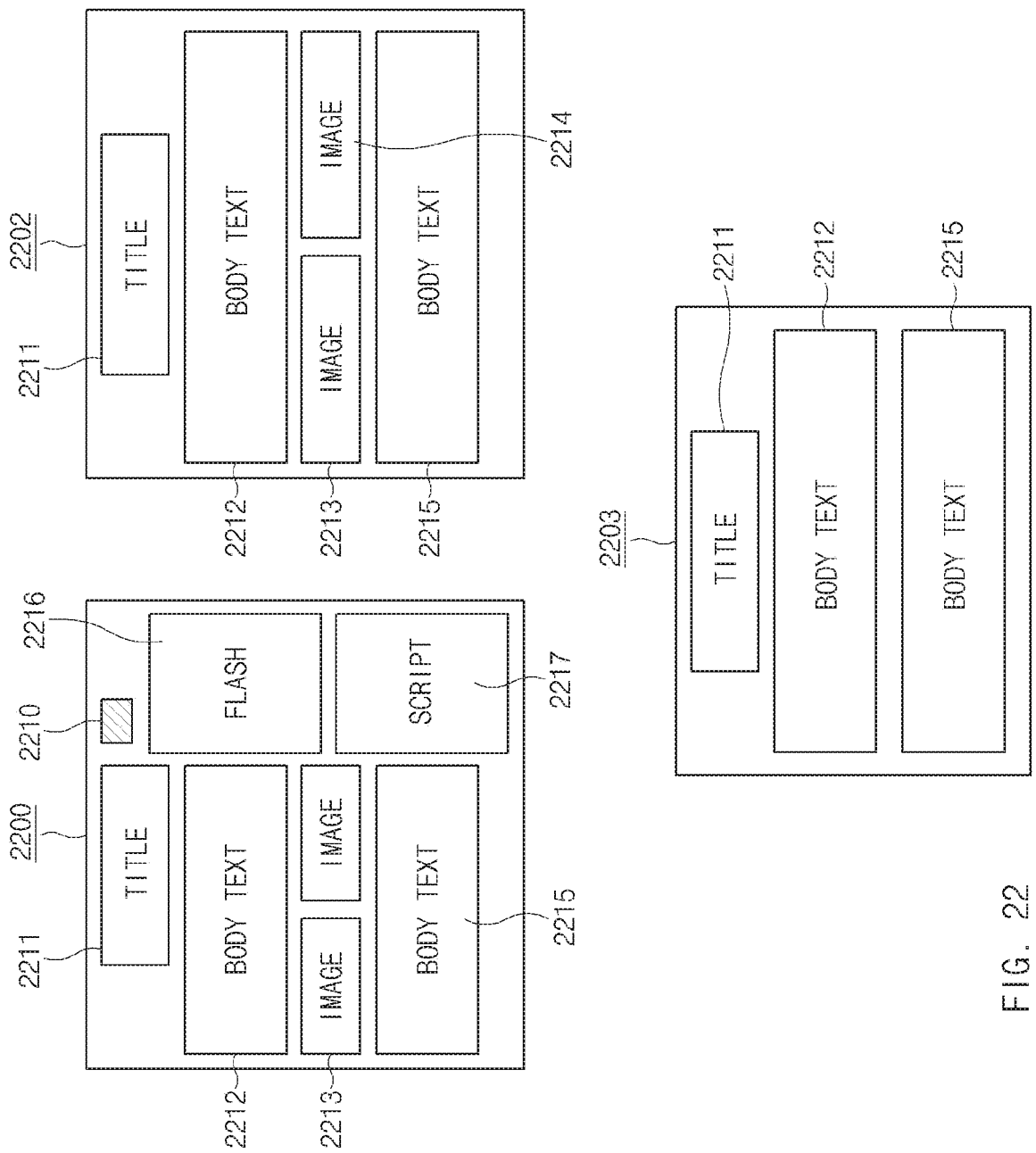
FIG. 22 is a diagram for describing a layout according to various embodiments.

FIG. 21B illustrates a touch-based information providing method according to an embodiment. Also, FIG. 22 is a diagram for describing a layout according to various embodiments.

Referring to FIG. 21B, the touch-based information providing method according to an embodiment may include operation 2101 to operation 2113. Operation 2101 to operation 2113 may be executed by, for example, the electronic device 801 illustrated in FIG. 8. Operation 2101 to operation 2113 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8.

Below, operation 2101 to operation 2113 will be described with reference to the reference numerals/marks of FIG. 8, and FIG. 21B and FIG. 22 may be alternately referenced in some operations to help the description.

In operation 2101, the processor 860 of the electronic device 801 may display an execution screen of an application in which a plurality of items are included. According to an embodiment, content and a specified functional object may be included in the execution screen.

For example, referring to FIG. 22, an execution screen 2200 of an application may be displayed in a display of the electronic device. For example, the execution screen 2200 may include a title 2211, a body text 2212, images 2213 and 2214, a body text 2215, a flash 2216, a script 2217, and a specified functional object 2210 with regard to content.

In operation 2103, the processor 860 may select or specify the specified functional object based on a position of a touch sensed in the touch sensor 820.

For example, referring to FIG. 22, the electronic device that displays the execution screen 2200 may select the specified functional object 2210 based on a position of a touch from the user.

In operation 2105, the processor 860 may detect a pressure level of the touch by using the pressure sensor 830.

For example, referring to FIG. 22, the electronic device that displays the execution screen 2200 may detect a pressure level of a touch selecting the specified functional object 2210 by using a pressure sensor.

In operation 2107, the processor 860 may determine the pressure level detected in operation 2105. For example, when the detected pressure of the touch is not greater than (or smaller than) the first pressure level (e.g., P1 of FIG. 7), the processor 860 may proceed to operation 2109. When the detected pressure of the touch is greater than (or not smaller than) the first pressure level (e.g., P1 of FIG. 7) and is not greater than (or smaller than) the second pressure level (e.g., P2 of FIG. 7), the processor 860 may proceed to operation 2111. When the detected pressure of the touch is greater than (or not smaller than) the second pressure level (e.g., P2 of FIG. 7), the processor 860 may proceed to operation 2113.

In operation 2109, because the detected pressure of the touch is not greater than (or smaller than) the first pressure level, the processor 860 may perform a specified function assigned to the specified functional object. For example, the specified function may correspond to a function of enlarging or reducing a size of a text included in the execution screen of the application.

In operation 2111, because the detected pressure of the touch is greater than (or equal to or greater than) the first pressure level and is not greater than (or smaller than) the second pressure level, the processor 860 may display a first set of information for configuring an execution screen including the functional object so as to correspond to a first layout, in the display panel 810. For example, in the case where the detected touch is a "weak force touch", the processor 860 may display the first set of information in the display panel 810.

For example, referring to FIG. 22, when the "weak force touch" is detected, the electronic device that displays the execution screen 2200 may reconfigure the execution screen 2200 so as to correspond to the first layout. For example, the electronic device may configure the execution screen 2200 so as to correspond to the first layout, by modifying a document object model (DOM) tree of the execution screen 2200. For example, the electronic device may remove the flash 2216 and the script 2217 from the DOM tree of the execution screen 2200 and may display the remaining items 2211 to 2215 in a display. As such, an execution screen 2202 may be output in the display.

In operation 2113, because the pressure of the touch is greater than the second pressure level, the processor 860 may display a second set of information for configuring an execution screen including the functional object so as to correspond to a second layout, in the display panel 810. For example, in the case where the detected touch is a "strong force touch", the processor 860 may display the second set of information in the display panel 810.

For example, referring to FIG. 22, when the "strong force touch" is detected, the electronic device that displays the execution screen 2200 may reconfigure the execution screen 2200 so as to correspond to the second layout. For example, the electronic device may configure the execution screen 2200 so as to correspond to the second layout, by modifying the DOM tree of the execution screen 2200. For example, the electronic device may remove the images 2213 and 2214, the flash 2216, and the script 2217 from the DOM tree of the execution screen 2200 and may only display the title 2211 and the body texts 2212 and 2215 in the display. As such, an execution screen 2203 may be output in the display.

Figure 23:
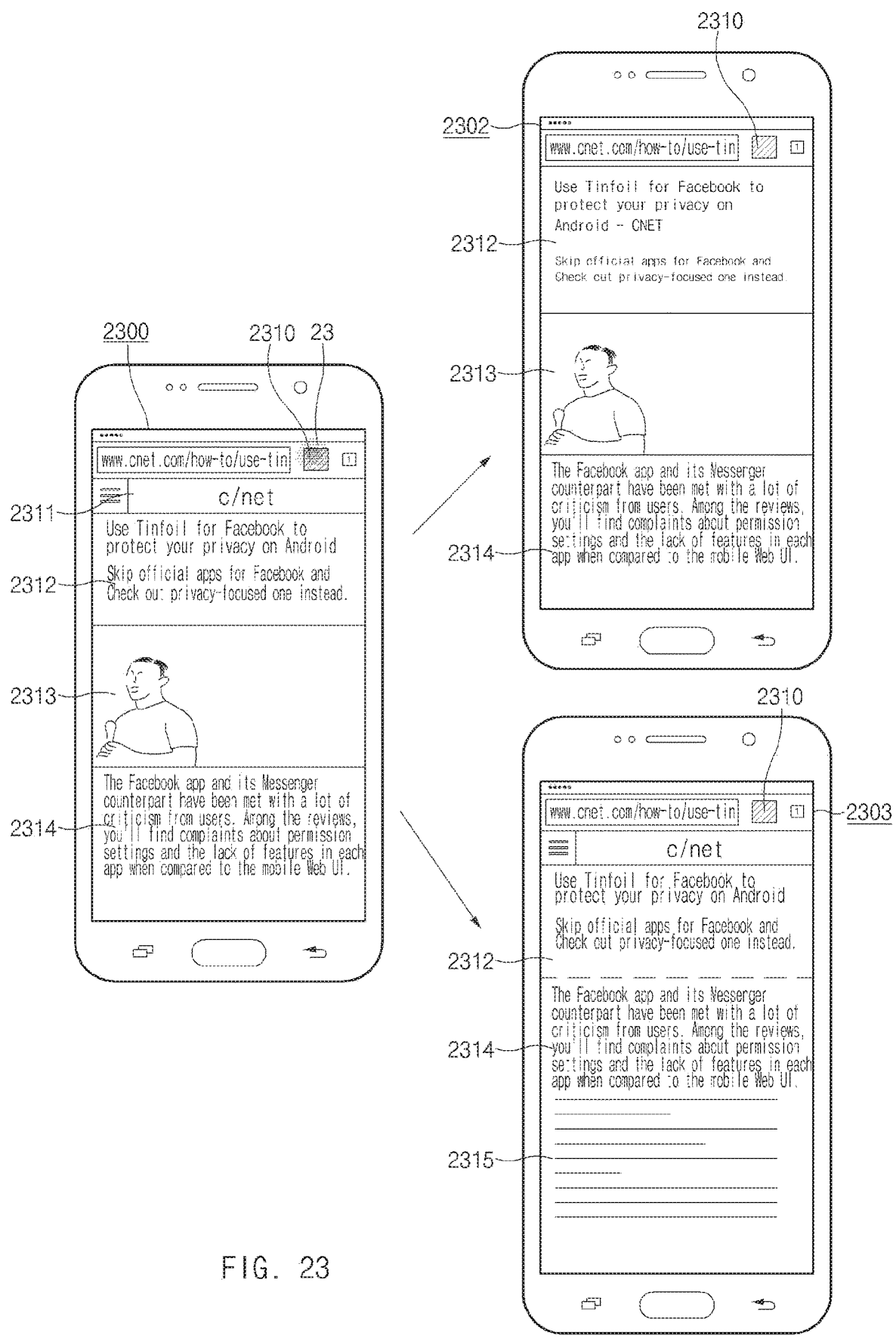
FIG. 23 is a diagram for describing a touch-based information providing method according to an embodiment.

FIG. 23 is a diagram for describing a touch-based information providing method according to an embodiment.

Referring to FIG. 23, according to an embodiment, an electronic device that performs the touch-based information providing method is illustrated. According to an embodiment, the electronic device may execute a browser application to visit a web page. According to an embodiment, a title 2311, a body text 2312, an image 2313, and a body text 2314 may be displayed in a web page screen 2300. For example, the user may perform a touch 23 on a specified functional object 2310 included on the upper side of the web page screen 2300.

The electronic device may select the functional object 2310 based on a position of the touch 23 sensed in a touch sensor and may detect a pressure level of the touch 23 by using a pressure sensor.

For example, when the pressure level of the touch 23 is not greater than (or smaller than) the first pressure level, the electronic device may perform a specified function assigned to the specified functional object 2310. For example, the specified function may correspond to a function of enlarging or reducing a size of a text included in the web page screen 2300 (not illustrated).

For another example, when the pressure level of the touch 23 is greater than (or not smaller than) the first pressure level and is not greater than (or smaller than) the second pressure level, the electronic device may display screen 2302 in which the web page screen 2300 is configured to correspond to the first layout. For example, the title 2311 may not be displayed in screen 2302, and the items 2312, 2313, and 2314 may be displayed in screen 2302.

For another example, when the pressure level of the touch 23 is greater than (or not smaller than) the second pressure level, the electronic device may display screen 2303 in which the web page screen 2300 including the functional object 2310 is configured to correspond to the second layout. For example, the title 2311 and the image 2313 may not be displayed in screen 2303, and the texts 2312 and 2314 and a next text 2305 may be displayed in screen 2302.

According to various embodiments, a layout may be reconfigured according to a type of an object applying a touch or a force touch. For example, the user may perform a touch or a force touch on the image 2313 included in the web page screen 2300 instead of the specified functional object 2310.

For example, when a pressure level of the touch selecting the image 2313 is not greater than (or smaller than) the first pressure level, the image 2313 may be displayed through a separate window (or tap). For another example, when the pressure level of the touch selecting the image 2313 is greater than (or not smaller than) the first pressure level and is not greater than (or smaller than) the second pressure level, the electronic device may enlarge or reduce the image 2313 within a range between the first pressure level and the second pressure level. For another example, when the pressure level of the touch selecting the image 2313 exceeds (or is not smaller than) the second pressure level, the electronic device may collect all images included in the web page screen 2300 and may display the collected images obviously.

For another example, as in the selection of the image 2313, when a pressure level of a touch applied to a text (e.g., the text 2312 or 2314 included in the web page screen 2300) exceeds (or is not smaller than) the second pressure level, the electronic device may only collect all texts included in the web page screen 2300 and may display the collected texts.

Figure 24:
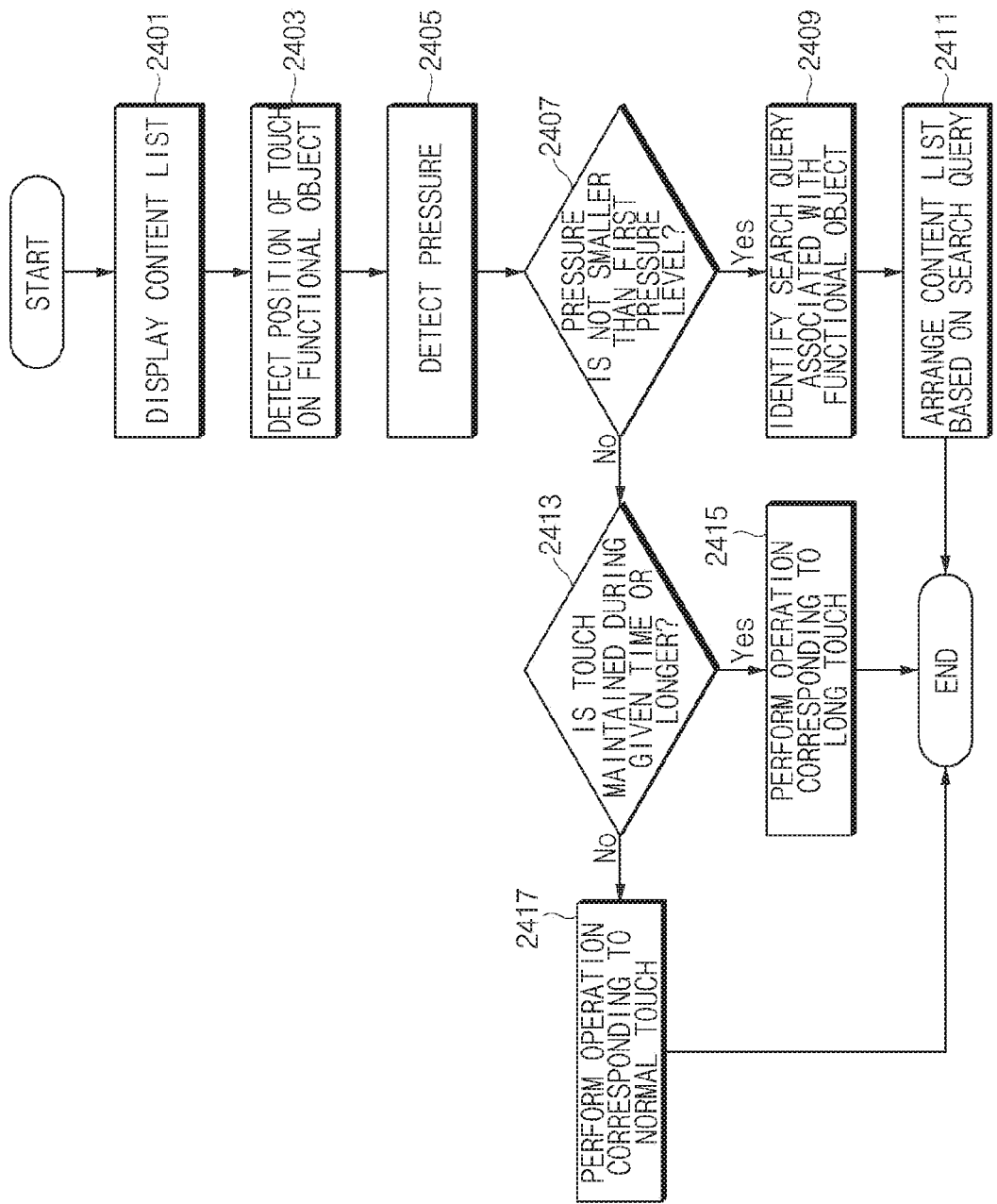
FIG. 24 illustrates a method for arranging content based on a force touch, according to an embodiment.

FIG. 24 illustrates a method for arranging content based on a force touch, according to an embodiment.

Referring to FIG. 24, according to an embodiment, a method for arranging content based on a force touch may include operation 2401 to operation 2417. Operation 2401 to operation 2417 may be executed by, for example, the electronic device 801 illustrated in FIG. 8. Operation 2401 to operation 2417 may be respectively implemented by, for example, instructions that are capable of being performed (or executed) by the processor 860 of the electronic device 801. The instructions may be stored in, for example, a computer-readable recording medium or the memory 850 of the electronic device 801 illustrated in FIG. 8. Below, operation 2401 to operation 2417 will be described by using reference marks/numerals of FIG. 8.

In operation 2401, the processor 860 of the electronic device 801 may display a content list and a specified functional object as an application is executed. The content list may be a list in which at least one content is arranged in one direction.

In operation 2403, the processor 860 of the electronic device 801 may detect an input position of a touch on the specified functional object.

In operation 2405, the processor 860 may detect a pressure level of the touch by using the pressure sensor 830.

In operation 2407, the processor 860 may determine whether the pressure level detected in operation 2405 is not smaller than (or exceeds) the first pressure level (e.g., P1 of FIG. 7). If the detected pressure level is not smaller than the first pressure level, the processor 860 may proceed to operation 2409; if not, the processor 860 may proceed to operation 2413.

In operation 2409, the processor 860 may identify a search query associated with the specified functional object in response to a touch, the pressure of which is not smaller than the first pressure level. For example, the search query may mean a reference for arrangement of a keyword (e.g., a word, a phase, a clause, or the like) or content list.

In operation 2411, the processor 860 may rearrange or arrange a content list based on the search query, in response to a touch, the pressure of which is not smaller than the first pressure level.

In operation 2413, the processor 860 may determine whether a touch, the pressure of which is smaller than (or not greater than) the first pressure level, is maintained during a given time or longer. When the touch is maintained during the given time or longer, the processor 860 may proceed to operation 2415; if not, the processor 860 may proceed to operation 2417.

Because the touch, the pressure of which is smaller than (or not greater than) the first pressure level, is maintained during the given time or longer, in operation 2415, the processor 860 may determine the touch as a "long touch"

(refer to 70-C of FIG. 7). Afterwards, the processor 860 may perform an operation corresponding to the "long touch", which is set in advance.

Because the touch, the pressure of which is smaller than (or not greater than) the first pressure level, is not maintained during the given time or longer, in operation 2417, the processor 860 may determine the touch as a "normal touch" ("tap") (refer to 70-A of FIG. 7). Afterwards, the processor 860 may perform an operation corresponding to the "normal touch", which is set in advance.

Figure 25:
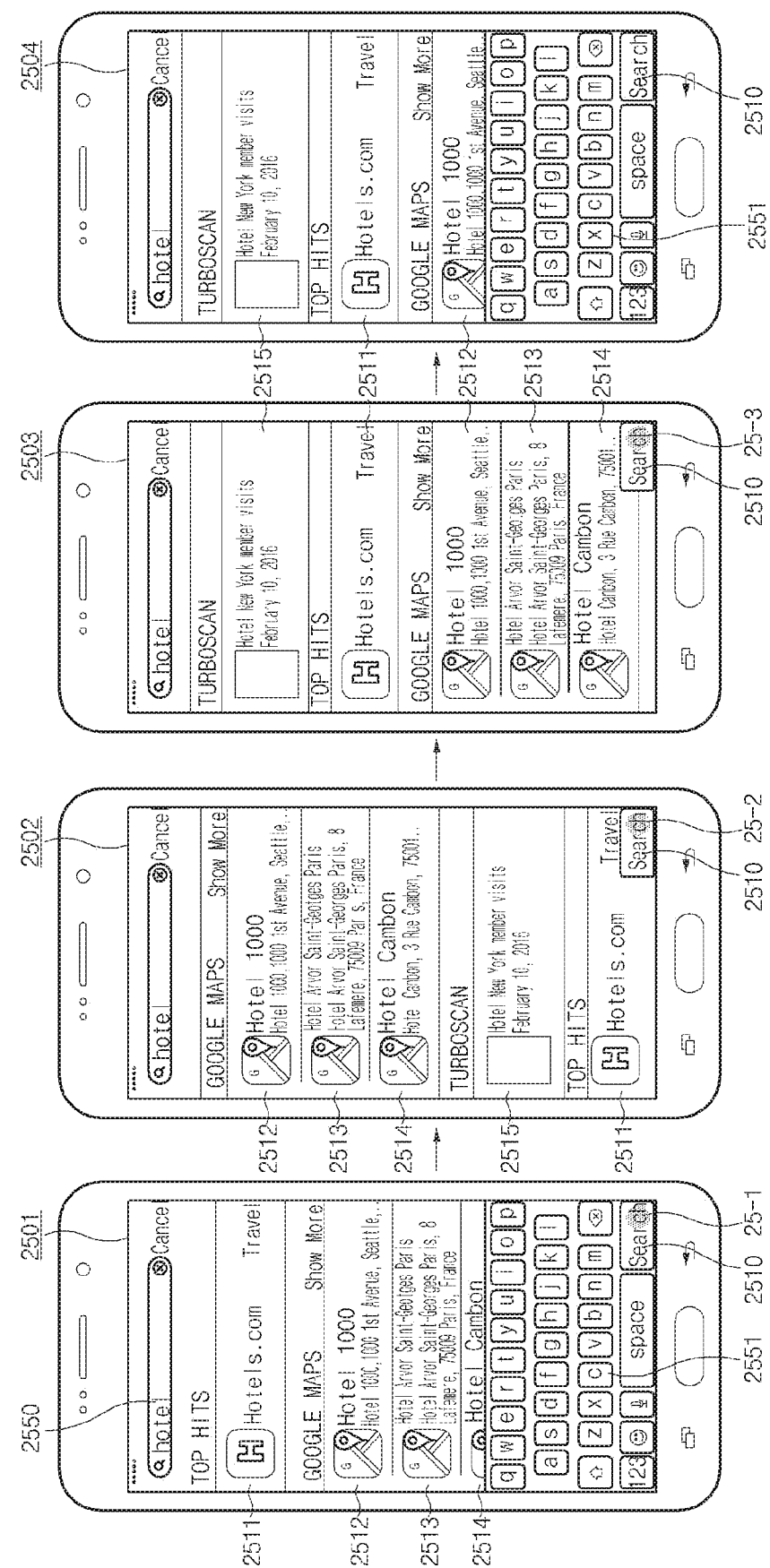
FIG. 25 is a diagram for describing a method for arranging content based on a force touch, according to an embodiment.

FIG. 25 is a diagram for describing a method for arranging content based on a force touch, according to an embodiment.

Referring to FIG. 25, according to an embodiment, an electronic device that performs a method for arranging content based on a force touch is illustrated. According to an embodiment, the electronic device may execute a search application (or a browser application outputting a search engine web page). Screen 2501 may be displayed in a display of the electronic device by the execution of the search application. For example, the user may input a search query (e.g., "hotel") to an input field 2550 by using a soft keyboard 2551 displayed in screen 2501.

According to an embodiment, the electronic device may automatically display a search result of the search query (e.g., "hotel") in response to the input search query (e.g., "hotel"). For example, as illustrated in screen 2501, the search result may include a category list in which a plurality of categories (e.g., "TOP HITS", "GOOGLE MAPS", and "TURBOSCAN") are included in order. One item 2511 may be included in the "TOP HITS" category, and three items 2512 to 2514 may be included in the "GOOGLE MAPS" category.

According to an embodiment, the user may perform a touch 25-1 (e.g., a "weak force touch" or a "strong force touch") on a functional object 2510 (e.g., a search key) included in screen 2501. In response to the touch 25-1, the electronic device may rearrange the search result of the input query (e.g., "hotel") and may display the rearranged result in a display. For example, categories are arranged in screen 2501 in the order of the "TOP HITS" category and the "GOOGLE MAPS" category; however, in response to the touch 25-1, the electronic device may reconfigure a category list in the order of the "GOOGLE MAPS" category, the "TURBOSCAN" category (including an item 2515), and the "TOP HITS" category, as illustrated in screen 2502.

As in the above description, the user may perform a touch 25-2 (e.g., a "weak force touch" or a "strong force touch") on the functional object 2510 (e.g., a search key) included in screen 2502. In response to the touch 25-2, the electronic device may again rearrange the search result of the input query (e.g., "hotel") and may display the rearranged result in the display. For example, categories are arranged in screen 2502 in the order of the "GOOGLE MAPS" category, the "TURBOSCAN" category, and the "TOP HITS" category; however, in response to the touch 25-2, the electronic device may reconfigure the category list in the order of the "TURBOSCAN" category, the "TOP HITS" category, and the "GOOGLE MAPS" category, as illustrated in screen 2503.

Meanwhile, according to an embodiment, the electronic device may detect a force touch 25-3 (e.g., 70-E or 70-G of FIG. 7) of a specified time or longer. For example, when the force touch 25-3 of the specified time or longer is detected, the electronic device may continuously rearrange (or shuffle) the category list included in screen 2501 or screen 2502. According to an example, when the force touch 25-3 of the specified time or longer is released, as illustrated in screen 2504, the electronic device may stop the rearrangement (or shuffling) and may again output the soft keyboard 2551.

Figure 26:
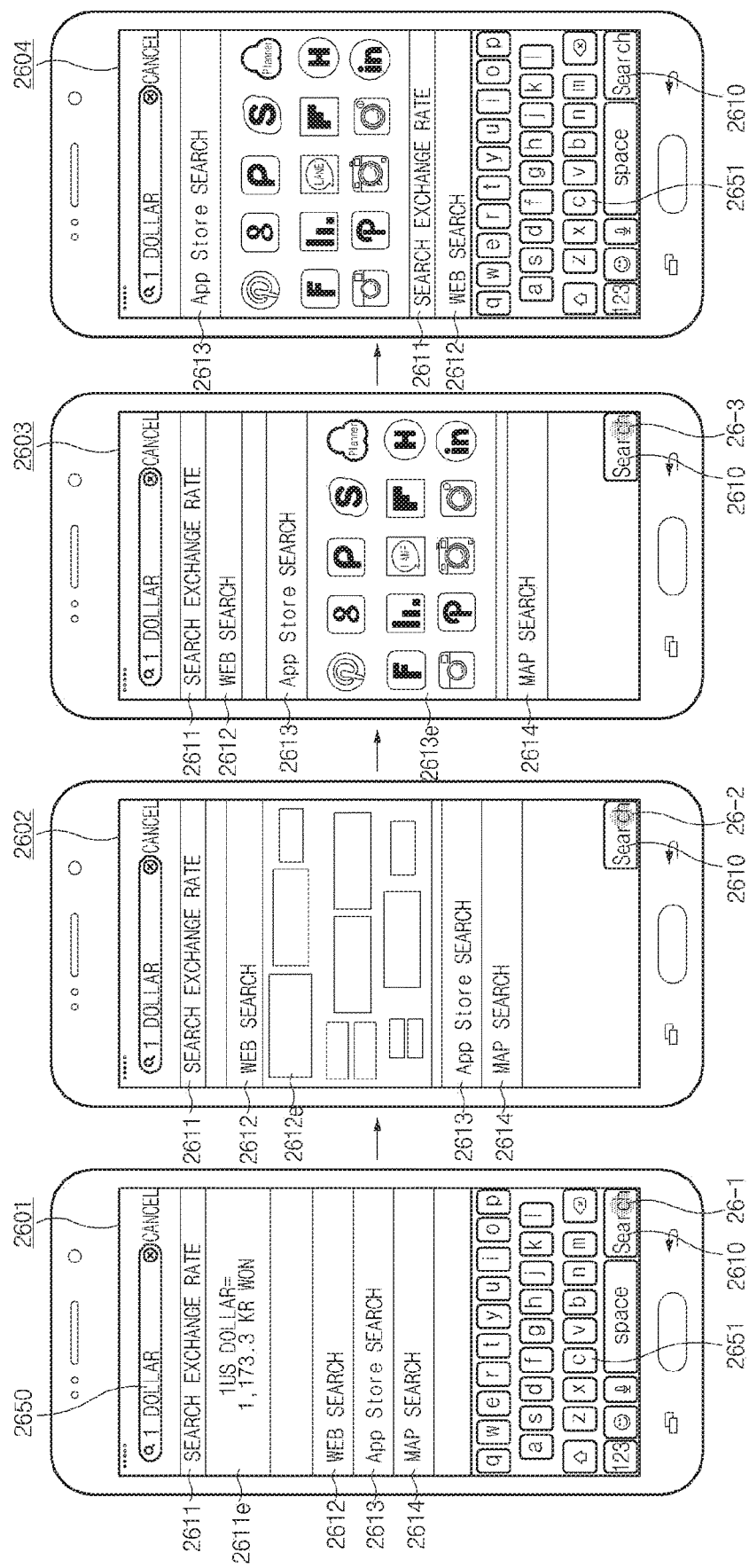
FIG. 26 is a diagram for describing a method for arranging content based on a force touch, according to another embodiment.

FIG. 26 is a diagram for describing a method for arranging content based on a force touch, according to another embodiment.

Referring to FIG. 26, according to an embodiment, an electronic device that performs a method for arranging content based on a force touch is illustrated. According to an embodiment, the electronic device may execute a search application (or a browser application outputting a search engine web page). Screen 2601 may be displayed in a display of the electronic device by the execution of the search application. For example, the user may input a search query (e.g., "1 dollar") to an input field 2650 by using a soft keyboard 2651 displayed in screen 2601.

According to an embodiment, the electronic device may automatically display a search result of the search query (e.g., "1 dollar") in response to the input search query (e.g., "1 dollar"). For example, as illustrated in screen 2601, the search result may include a category list in which a plurality of categories (e.g., an exchange rate search 2611, a web search 2612, an App Store search 2613, and a map search 2614) are included in order. In this case, an item 2611e including extended information may be included in the exchange rate search (2611) category.

According to an embodiment, the user may perform a touch 26-1 (e.g., a "weak force touch" or a "strong force touch") on a functional object 2610 (e.g., a search key) included in screen 2601. In response to the touch 26-1, the electronic device may reconfigure a search result of the input query (e.g., "1 dollar") and may display the reconfigured result in a display. For example, in response to the touch 26-1, the electronic device may display an item 2612e including extended information of the web search 2612, not the item 2611e including the extended information of the exchange rate search 2611, as illustrated in screen 2602.

As in the above description, the user may perform a touch 26-2 (e.g., a "weak force touch" or a "strong force touch") on the functional object 2610 (e.g., a search key) included in screen 2602. In response to the touch 26-2, the electronic device may reconfigure the search result of the input query (e.g., "1 dollar") and may display the reconfigured result in the display. For example, in response to the touch 26-2, the electronic device may display an item 2613e including extended information of the App Store search 2613, not the item 2612e including the extended information of the web search 2612, as illustrated in screen 2603.

Meanwhile, according to an embodiment, the electronic device may detect a force touch 26-3 (e.g., 70-E or 70-G of FIG. 7) of a specified time or longer. For example, when the force touch 26-3 of the specified time or longer is detected, the electronic device may sequentially display items including extended information of the categories 2611 to 2614 during the specific time. According to an example, when the force touch of the specified time or longer is released, as illustrated in screen 2604, the electronic device may stop the operation of sequentially displaying the items including the extended information of the categories 2611 to 2614 and may again output the soft keyboard 2651.

Meanwhile, according to various embodiments, the description is given with reference to FIGS. 25 and 26 as a search query is a text; however, the search query may include various queries such as an image, a video, and a voice input.

Figure 27:
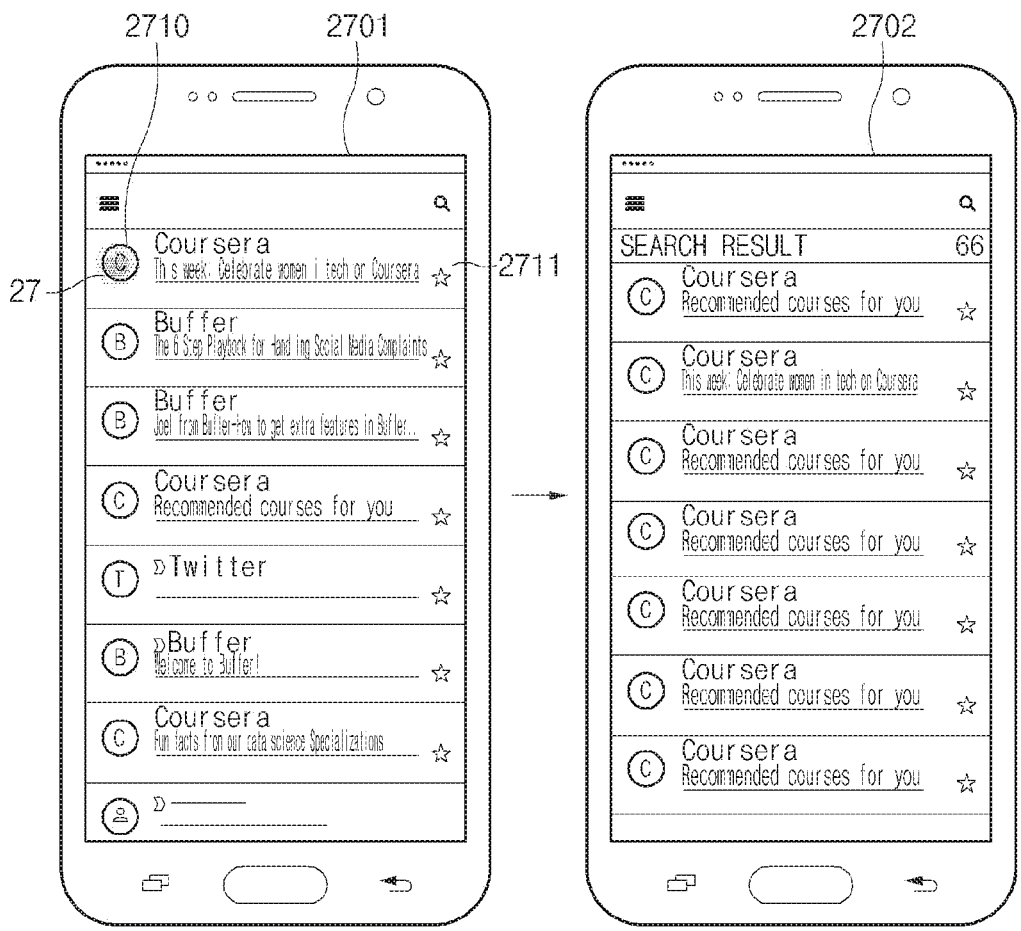
FIG. 27 is a diagram for describing a method for arranging a mail list based on a force touch, according to an embodiment.

FIG. 27 is a diagram for describing a method for arranging a mail list based on a force touch, according to an embodiment.

Referring to FIG. 27, according to an embodiment, an electronic device that performs a method for arranging a mail list based on a force touch is illustrated. According to an embodiment, the electronic device may execute an e-mail application (or a browser application outputting a web mail page). Screen 2701 may be displayed in a display of the electronic device by the execution of the e-mail application. For example, a mail list including a plurality of mails may be included in screen 2701.

According to an embodiment, the user may perform a touch 27 (e.g., a "weak force touch" or a "strong force touch") on an object 2710 included in any one mail 2711 of the mail list. For example, the object 2710 may indicate a sender (e.g., "Coursera") of the mail 2711. In response to the touch 27, the electronic device may display a list screen 2702 of mails, which the sender (e.g., "Coursera") indicated by the object 2710 sends, in a display.

According to various embodiments, the object 2710 may include both an icon indicating a sender of a mail and a text indicating a name and an e-mail address of the sender of the mail.

Figure 28:
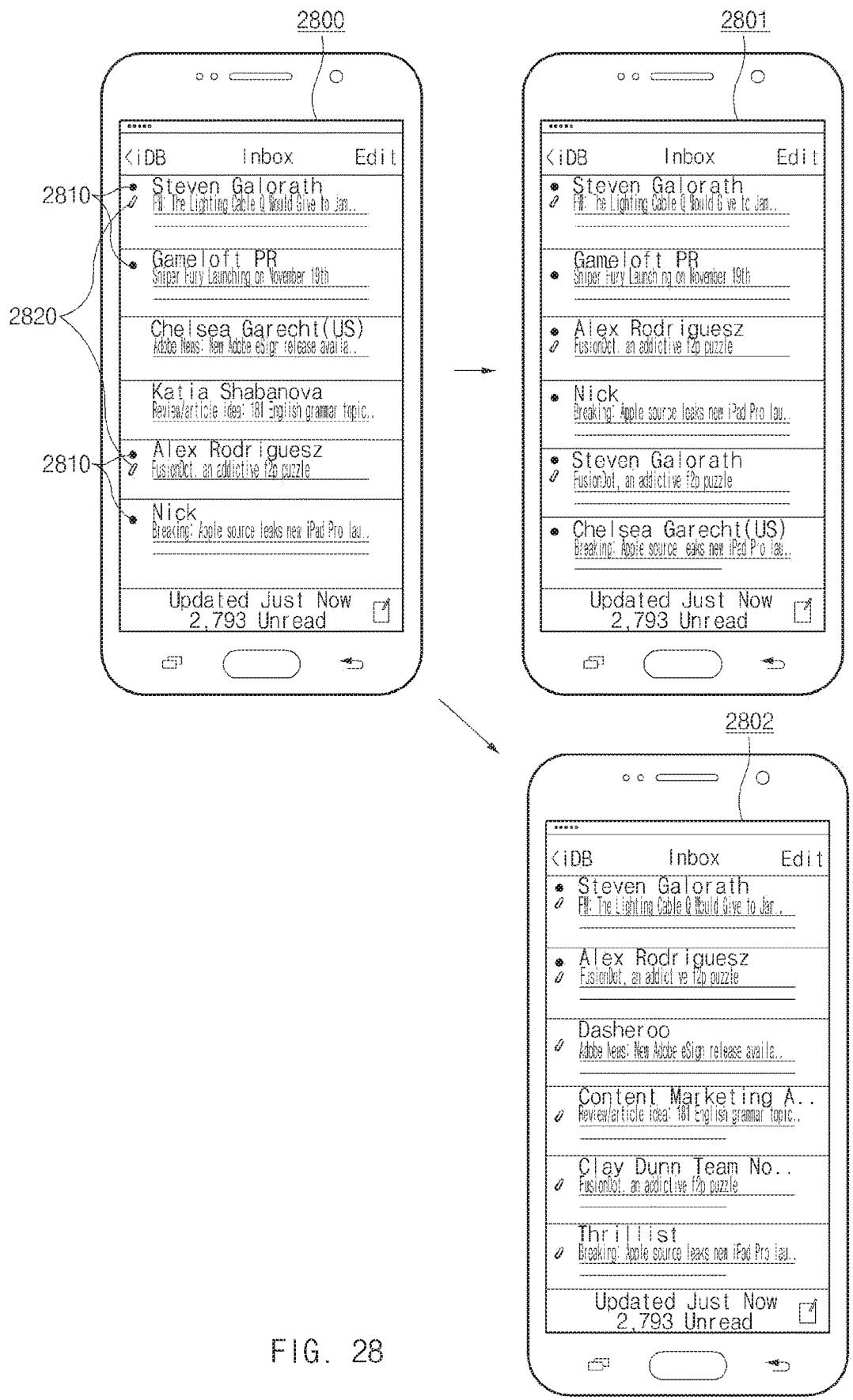
FIG. 28 is a diagram for describing a method for arranging a mail list based on a force touch, according to another embodiment.

FIG. 28 is a diagram for describing a method for arranging a mail list based on a force touch, according to another embodiment.

Referring to FIG. 28, according to an embodiment, an electronic device that performs a method for arranging a mail list based on a force touch is illustrated. According to an embodiment, the electronic device may execute an e-mail application (or a browser application outputting a web mail page). Screen 2800 may be displayed in a display of the electronic device by the execution of the e-mail application. For example, a mail list including a plurality of mails may be included in screen 2800.

According to an embodiment, an object 2810 indicating an unread mail and an object 2820 indicating a mail in which an attached filed is included may be included in at least some mails of the mail list.

For example, the user may perform a force touch (e.g., a "weak force touch" or a "strong force touch") on one of the objects 2810 included in some mails. When a force touch is made on the object 2810, as illustrated in screen 2801, the electronic device may display a list of unread mails of the whole mail list in a display.

For example, the user may perform a force touch (e.g., a "weak force touch" or a "strong force touch") on one of the objects 2820 included in some mails. When the force touch is made on the object 2820, as illustrated in screen 2802, the electronic device may display a list of mails, each of which includes an attached file, of the whole mail list in the display.

Figure 29:
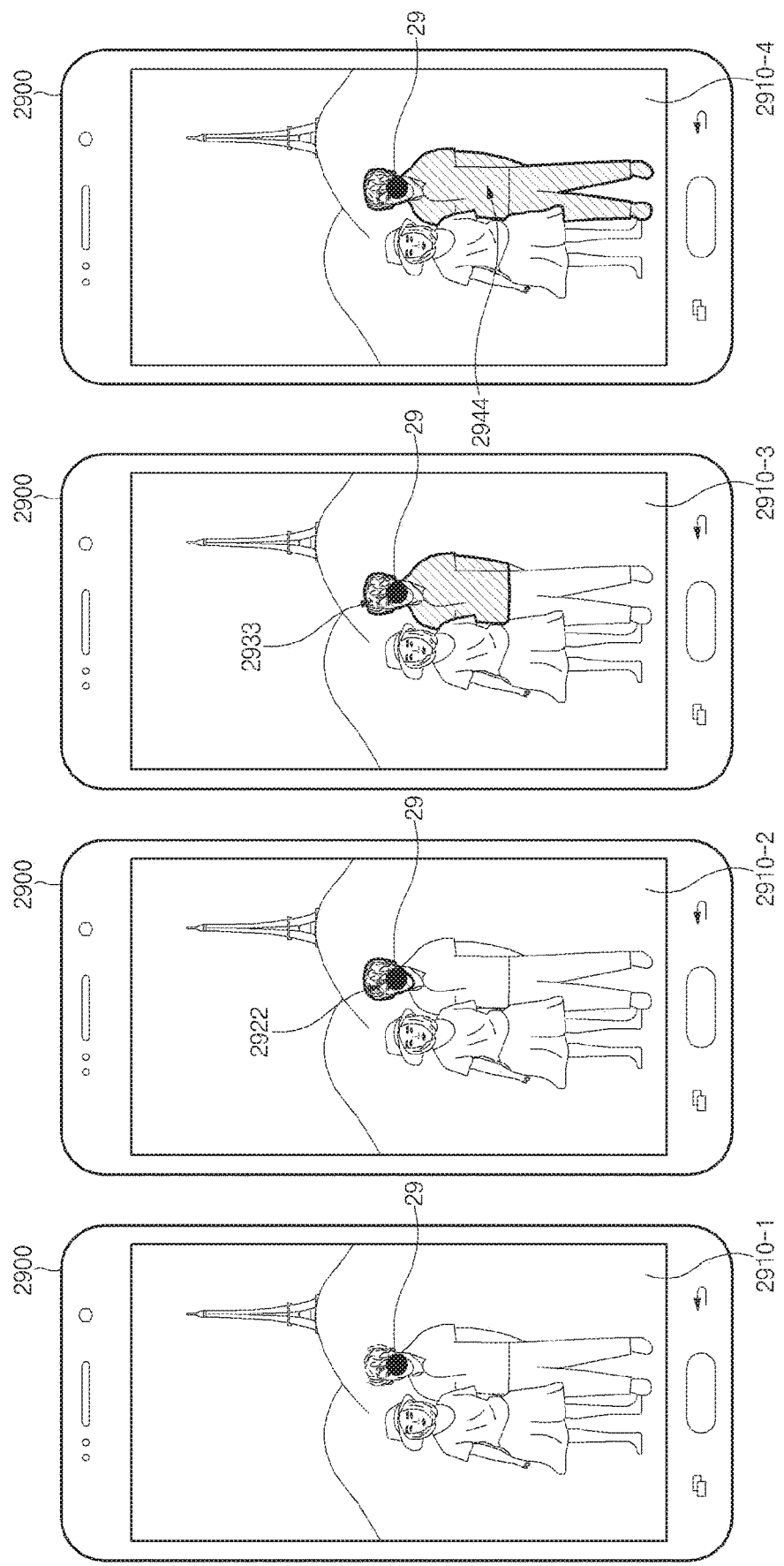
FIG. 29 is a diagram for describing how to select an image object in response to pressure of a touch, according to an embodiment.

FIG. 29 is a diagram for describing how to select an image object in response to pressure of a touch, according to an embodiment.

Referring to FIG. 29, according to an embodiment, an electronic device 2900 that performs a method for selecting an image object in response to pressure of a touch is illustrated. For example, the electronic device 2900 may execute an image viewer application. For example, the electronic device 2900 may display screen 2910-1 including a given image as the image viewer application is executed.

Referring to screen 2910-1, the user may perform a touch 29 on a display (or screen 2910-1). The electronic device 2900 may detect a position and pressure of the touch 29 in response to the touch 29. According to an embodiment, the electronic device may output screen 2910-2, screen 2910-3, or screen 2910-4 based on a pressure level of the touch 29 thus sensed.

According to an embodiment, in the case where the pressure of the touch 29 is not greater than or smaller than the first pressure level (in the case of a "tap"), the electronic device 2900 may output screen 2910-2 in a display. According to screen 2910-2, the electronic device 2900 may select an image object (e.g., a face object) 2922 corresponding to a position, at which the touch 29 is made, of the whole image based on an image object recognition algorithm (e.g., a face recognition algorithm).

According to an embodiment, when the pressure of the touch 29 made on screen 2910-1 is greater than (or not smaller than) the first pressure level and is smaller than (or smaller than) the second pressure level (in the case of a "weak force touch"), the electronic device 2900 may output screen 2910-3. According to screen 2910-3, the electronic device 2900 may select an image object 2933, in which the face and the upper half of the body of a character are included, based on the image object recognition algorithm That is, an image object that is selected may be expanded as the pressure of the touch 29 increases.

According to an embodiment, when the pressure of the touch 29 made on screen 2910-1 is greater than (or not smaller than) the second pressure level (in the case of a "strong force touch"), the electronic device 2900 may output screen 2910-4. According to screen 2910-4, the electronic device 2900 may select an image object 2944, in which the face, the upper half of the body, and the lower half of the body of a character are included, based on the image object recognition algorithm That is, an image object that is selected may be further expanded as the pressure of the touch 29 increases.

Screen 2910-4 is described as a range to select an image object is expanded with respect to a single character, but the disclosure is not limited thereto. For example, in the case where the pressure of the touch 29 made on screen 2910-1 is the weak force touch or the strong force touch, the electronic device 2900 may simultaneously select an image object including a face of a character corresponding to a position of the touch 29 and an image object including a face of an adjacent character. Also, the description is given with reference to FIG. 29 as an image object is selected and specified along a boundary of the image object, but an image object may be selected and specified in the form of a circle or a polygon.

The description is given with reference to FIG. 29 under assumption that the touch 29 of the user selecting an image object is a single touch; however, according to various embodiments, the electronic device 2900 may support a multi-touch including two or more touches. The description is given with reference to FIG. 29 under assumption that an image displayed in a screen of an electronic device is a still image, but the image may correspond to an image corresponding to any one frame of a video.

According to an embodiment, in the case where an image object is selected as described above, the electronic device 2900 may perform various operations based on the selected image object. For example, the electronic device 2900 may be provided with a similar image from a specified search engine by using the selected image object as a search query. In this case, a search result may vary with a selection range (e.g., a face, a "face+upper half of the body", a "face+upper half of the body+lower half of the body") of the selected image object. According to various embodiments, the specified search engine may provide information (e.g., in the case where a selected image is a building, a geographical position or floor information of the building) about the selected image object, as well as a similar image.

For another example, the electronic device 2900 may search for and sort images including an image object similar to the selected image object from a memory of the electronic device 2900 and may provide a list of search results to the user. Likewise, the search result list may vary with a selection range of a selected image object.

For another example, the electronic device 2900 may take a close-up of a selected image object with respect to the selected image object and may output the close-up result in a display. For another example, the electronic device 2900 may store a selected image object in a clip board, and may use the selected image object stored in the clip board for the purpose of an operation of any other application (e.g., an image edit application or the like) later.

Figure 30:
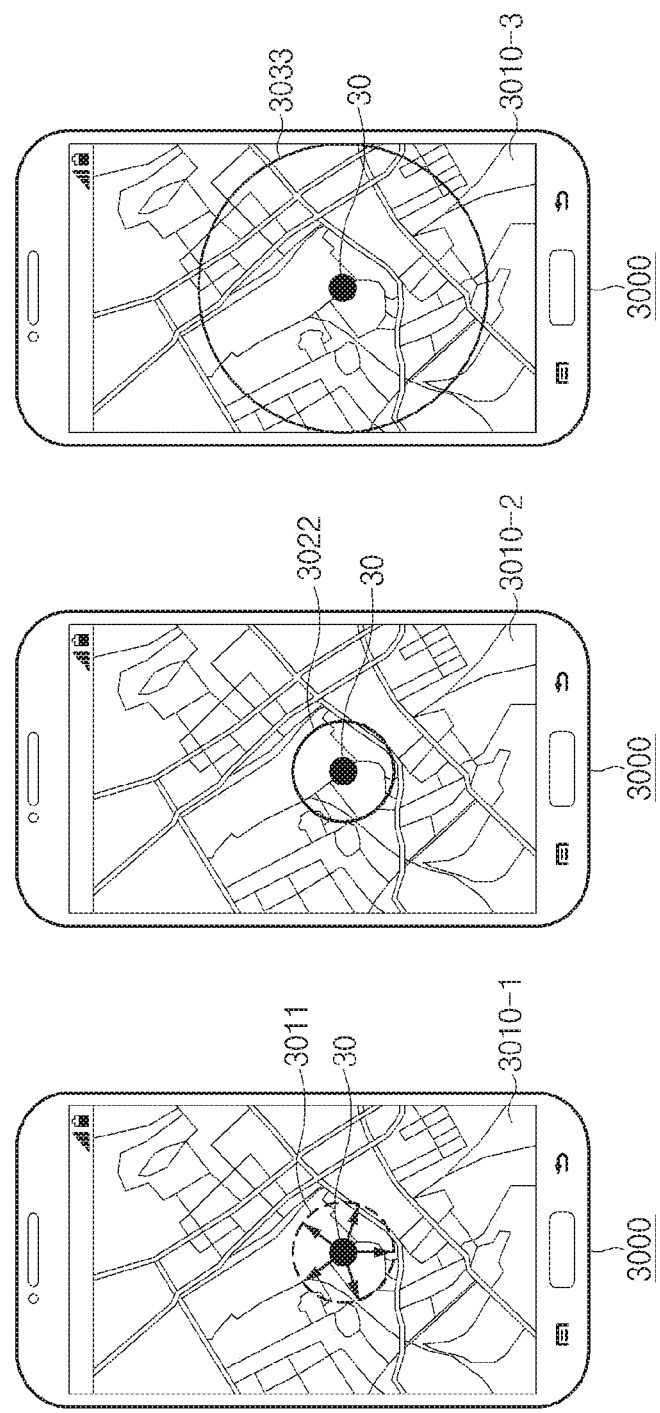
FIG. 30 is a diagram for describing how to specify a selection area in response to pressure of a touch, according to another embodiment.

FIG. 30 is a diagram for describing how to specify a selection area in response to pressure of a touch, according to another embodiment.

Referring to FIG. 30, according to an embodiment, an electronic device 3000 that performs a method for specifying a selection area in response to pressure of a touch is illustrated. For example, the electronic device 3000 may execute a map application. For example, the electronic device 3000 may execute the map application to display a user interface and/or map content (e.g., a map included in screen 3010-1) of the map application in a display.

Referring to screen 3010-1, the user may perform a touch 30 on a display (or screen 3010-1). The electronic device 3000 may detect a position and pressure of the touch 30 in response to the touch 30. In the case where the pressure of the touch 30 is greater than the first pressure level, the electronic device 3000 may recognize the touch 30 as a "force touch".

Because the electronic device 3000 recognizes the "force touch", the electronic device 3000 may display a guide 3011, in which a position where the touch 30 is made is centered, in the display. The size of the guide 3011 may increase or decrease according to the pressure of the touch 30. According to an embodiment, the electronic device 3000 may output screen 3010-2 or screen 3010-3 based on a pressure level of the touch 30 thus sensed.

According to an embodiment, when the pressure of the touch 30 made on screen 3010-1 is greater than (or not smaller than) the first pressure level and is smaller than (or smaller than) the second pressure level (in the case of a "weak force touch"), the electronic device 3000 may output screen 3010-2. According to screen 3010-2, when the weak force touch is sensed, the electronic device 3000 may select a circular area 3022 having a first distance (e.g., 500 m) as a radius around a position where the touch 30 is made.

According to an embodiment, when the pressure of the touch 30 made on screen 3010-1 is greater than (or not smaller than) the second pressure level (in the case of a "strong force touch"), the electronic device 3000 may output screen 3010-3. According to screen 3010-3, when the strong force touch is sensed, the electronic device 3000 may select a circular area 3033 having a first distance (e.g., 1000 m) as a radius around the position where the touch 30 is made. That is, as the pressure of the touch 30 increases, the electronic device may expand an area that is selected.

The description is given with reference to FIG. 30 as a selection area is specified by using the single touch 30, but the disclosure is not limited thereto. According to various embodiments, the selection area may support a multi-touch including two or more touches. For example, the selection area may be specified by setting positions where two touches are made, to a diameter or radius of a circle.

According to various embodiments of the disclosure, a different function may be provided according to a pressure level of a touch received from the user. As such, various user experiences may be provided to the user.

According to an embodiment, a computer-readable recording medium may store instructions that, when executed by at least one processor, cause the processor to launch an application program displaying a user interface in a display, to display an array of the plurality of items in the user interface, to receive first data generated from a touch sensor, to receive second data received from a pressure sensor, to select one of the plurality of items based at least on the first data, to select one of a plurality of pressure levels based at least on the second data, and to display one of a plurality of sets of information associated with the selected one of the plurality of items in the display, based at least on the selected one of the plurality of pressure levels.

According to another embodiment, the plurality of pressure levels may include a discrete first level and a discrete second level higher than the first level. The instructions may include an instruction that causes the processor to display a first set of information of the plurality of sets of information in the display when the first level is selected, and to display a second set of information of the plurality of sets of information in the display when the second level is selected, and the amount of the second set of information may be greater than the amount of the first set of information.

An electronic device according to an embodiment may include a display, a touch sensor, a pressure sensor, at least one processor electrically connected with the display, the touch sensor, and the pressure sensor, and a memory electrically connected with the at least one processor. The memory may store instructions that, when executed, cause the processor to display a plurality of items in the display, to select at least one of the plurality of items based on a position of a touch sensed in the touch sensor, to detect a pressure level of the touch by using the pressure sensor, and to display at least one set of information associated with the selected at least one item in the display in response to the detected pressure level of the touch.

According to another embodiment, the plurality of items may include a functional object configured to request an input query and a search result of the input query. The memory may store instructions that cause the processor to select the functional object based on a position of a touch sensed in the touch sensor, to display a first set of information including a first search result of the input query in the display when the detected pressure level of the touch is not greater than a first pressure level, to display a second set of information including a second search result of the input query in the display when the detected pressure level of the touch exceeds the first pressure level, and to display a third set of information including a third search result of the input query in the display when the detected pressure level of the touch exceeds a second pressure level greater than the first pressure level.

For example, the first search result may include a category list including at least one category. For another example, the second search result may include at least one item that belongs to a category having the highest correlation with the input query. For another example, the third search result may include detailed information of one item, which has the highest correlation with the input query, from among at least one item belonging to a category having the highest correlation with the input query.

For example, the first search result may include a search result in which the input query is included with an accuracy of a first level. For another example, the second search result may include a search result in which the input query is included with an accuracy of a second level. For another example, the third search result may include a search result in which the input query is included with an accuracy of a third level. In this case, the accuracy of the second level may be set to be higher than the accuracy of the first level and to be lower than the accuracy of the third level.

According to another embodiment, the plurality of items may include a text. The memory may store instructions that cause the processor to select the text based on a position of a touch sensed in the touch sensor, to display a first set of information including the text in the display when the detected pressure level of the touch exceeds a first pressure level, and to display second set of information including the text in the display when the detected pressure level of the touch exceeds a second pressure level greater than the first pressure level.

For example, the text may be included in an execution screen of an e-mail application. In this case, the first set of information may include a mail list in which the text is included in a mail title. The second set of information may include a mail list in which the text is included in the mail title or a mail body.

For another example, the text may be included in an execution screen by a specified application. In this case, the first set of information may include a search result in which the text is included with an accuracy of a first level. The second set of information may include a search result in which the text is included with an accuracy of a second level. The accuracy of the second level may be higher than the accuracy of the first level.

For another example, the text may be included in an execution screen by a specified application. The first set of information may include a search result of the text obtained in the electronic device. The second set of information may include a web search result of the text.

According to another embodiment, the plurality of items may include an image object. The memory may store instructions that cause the processor to select the image object based on a position of a touch sensed in the touch sensor, to display a first set of information including an image object similar to the selected image object as much as a first level in the display when the detected pressure level of the touch exceeds a first pressure level, and to display a second set of information including an image object similar to the selected image object as much as a second level in the display when the detected pressure level of the touch exceeds a second pressure level greater than the first pressure level. In this case, a similarity of the second level may be set to be higher than a similarity of the first level.

According to another embodiment, the plurality of items may include an icon of a specified application. The memory may store instructions that cause the processor to select the icon based on a position of a touch sensed in the touch sensor, to display an execution screen of the specified application as a first set of information in the display when the detected pressure level of the touch is not greater than a first pressure level, to display a second set of information associated with the specified application in the display when the detected pressure level of the touch exceeds the first pressure level, and to display a third set of information associated with the specified application in the display when the detected pressure level of the touch exceeds a second pressure level greater than the first pressure level. In this case, the amount of the third set of information may be greater than the amount of the second set of information.

Also, for example, the second set of information or the third set of information may include notification information of the specified application.

According to another embodiment, the plurality of items may include a specified functional object. The memory may store instructions that cause the processor to select the specified functional object based on a position of a touch sensed in the touch sensor, to display a screen linked to the specified functional object as a first set of information in the display when the detected pressure level of the touch is not greater than a first pressure level, to display a second set of information associated with the specified functional object in the display when the detected pressure level of the touch exceeds the first pressure level, and to display a third set of information associated with the specified functional object in the display when the detected pressure level of the touch exceeds a second pressure level greater than the first pressure level.

According to another embodiment, the plurality of items may include a functional object included in an execution screen of a specified application. The memory may store instructions that cause the processor to select the functional object based on a position of a touch sensed in the touch sensor, to display a first set of information for configuring the execution screen including the functional object so as to correspond to a first layout, in the display, when the detected pressure level of the touch exceeds a first pressure level, and to display a second set of information for configuring the execution screen including the functional object so as to correspond to a second layout, in the display, when the detected pressure level of the touch exceeds a second pressure level greater than the first pressure level.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a touch sensor;
a pressure sensor;
at least one processor electrically connected with the display, the touch sensor, and the pressure sensor; and
a memory electrically connected with the at least one processor,
wherein the memory stores instructions that, when executed, cause the processor to:
display a plurality of items in the display;
select at least one of the plurality of items based on a position of a touch sensed in the touch sensor;
detect a pressure level of the touch by using the pressure sensor; and
display at least one set of information associated with the selected at least one item in the display in response to the detected pressure level of the touch,
wherein the plurality of items include an object configured to receive an input query and a functional object configured to request a search result of the input query, and
wherein the memory stores instructions that cause the processor to:
receive a first touch input for the input query;
receive a second touch input for selecting the functional object;
display a first set of information including a first search result of the input query in the display, in response to the detected pressure level of the second touch input exceeding a first pressure level; and
display a second set of information including a second search result of the input query in the display, in response to the detected pressure level of the second touch input exceeding a second pressure level that is greater than the first pressure level.

2. The electronic device of claim 1, wherein the memory stores instructions that cause the processor to:
display a third set of information including a third search result of the input query in the display, in response to the detected pressure level of the second touch input not being greater than the first pressure level.

3. The electronic device of claim 2, wherein the third search result includes a category list including at least one category.

4. The electronic device of claim 2, wherein the first search result includes at least one item that belongs to a category having a highest correlation with the input query.

5. The electronic device of claim 2, wherein the second search result includes detailed information of one item, which has a highest correlation with the input query, from among at least one item belonging to a category having a highest correlation with the input query.

6. The electronic device of claim 1, wherein the plurality of items further include a text, and
wherein the memory stores instructions that cause the processor to:
select the text based on the position of the touch sensed in the touch sensor;
display a third set of information including the text in the display, response to the detected pressure level of the touch exceeding the first pressure level; and
display a fourth set of information including the text in the display, response to the detected pressure level of the touch not exceeding the second pressure level that is greater than the first pressure level.

7. The electronic device of claim 6, wherein the text is included in an execution screen of an e-mail application,
wherein the third set of information includes a mail list in which the text is included in a mail title, and
wherein the fourth set of information includes a mail list in which the text is included in the mail title or a mail body.

8. The electronic device of claim 6, wherein the text is included in an execution screen by a specified application,
wherein the third set of information includes a search result in which the text is included with an accuracy of a first level,
wherein the fourth set of information includes a search result in which the text is included with an accuracy of a second level, and
wherein the accuracy of the second level is higher than the accuracy of the first level.

9. The electronic device of claim 6, wherein the text is included in an execution screen by a specified application,
wherein the third set of information includes a search result of the text obtained in the electronic device, and
wherein the fourth set of information includes a web search result of the text.

10. The electronic device of claim 1, wherein the plurality of items further include an image object, and
wherein the memory stores instructions that cause the processor to:
select the image object based on the position of the touch sensed in the touch sensor;
display a third set of information including an image object similar to the selected image object as much as a first level in the display, in response to the detected pressure level of the touch exceeding the first pressure level; and
display a fourth set of information including an image object similar to the selected image object as much as a second level in the display, in response to the detected pressure level of the touch exceeding the second pressure level that is greater than the first pressure level.

11. The electronic device of claim 10, wherein a similarity of the second level is set to be higher than a similarity of the first level.

12. The electronic device of claim 1, wherein the plurality of items further include an icon of a specified application, and
wherein the memory stores instructions that cause the processor to:
select the icon based on the position of the touch sensed in the touch sensor;

display an execution screen of the specified application in the display as a third set of information, in response to the detected pressure level of the touch not being greater than the first pressure level;

display a fourth set of information associated with the specified application in the display, in response to the detected pressure level of the touch exceeding the first pressure level; and display a fifth set of information associated with the specified application in the display, in response to the detected pressure level of the touch exceeding the second pressure level that is greater than the first pressure level.

13. The electronic device of claim 12, wherein the amount of the fifth set of information is greater than the amount of the fourth set of information.

14. The electronic device of claim 1, wherein the plurality of items further include a specified functional object, and wherein the memory stores instructions that cause the processor to:

select the specified functional object based on the position of the touch sensed in the touch sensor;

display a screen linked to the specified functional object in the display as a third set of information, in response to the detected pressure level of the touch not being greater than the first pressure level;

display a fourth set of information associated with the specified functional object in the display, in response to the detected pressure level of the touch exceeding the first pressure level; and display a fifth set of information associated with the specified functional object in the display in response to the detected pressure level of the touch exceeding the second pressure level that is greater than the first pressure level.

15. The electronic device of claim 1, wherein the plurality of items further include a functional object included in an execution screen of a specified application, and wherein the memory stores instructions that cause the processor to:

select the functional object based on the position of the touch sensed in the touch sensor;

display a third set of information for configuring the execution screen including the functional object so as to correspond to a first layout, in the display, in response to the detected pressure level of the touch exceeding the first pressure level; and display a fourth set of information for configuring the execution screen including the functional object so as to correspond to a second layout, in the display, in response to the detected pressure level of the touch exceeding the second pressure level that is greater than the first pressure level.

* * * * *